US010838574B2

(12) United States Patent
Agarawala et al.

(10) Patent No.: US 10,838,574 B2
(45) Date of Patent: Nov. 17, 2020

(54) AUGMENTED REALITY COMPUTING ENVIRONMENTS—WORKSPACE SAVE AND LOAD

(71) Applicant: Spatial Systems Inc., New York, NY (US)

(72) Inventors: Anand Agarawala, New York, NY (US); Jinha Lee, New York, NY (US); Peter Ng, San Francisco, CA (US); Roman Revzin, New York, NY (US)

(73) Assignee: SPATIAL SYSTEMS INC., New York, NY (US)

( * ) Notice: Subject to any disclaimer, the term of this patent is extended or adjusted under 35 U.S.C. 154(b) by 0 days.

(21) Appl. No.: 16/399,137

(22) Filed: Apr. 30, 2019

(65) Prior Publication Data
US 2019/0310761 A1  Oct. 10, 2019

Related U.S. Application Data

(63) Continuation of application No. 16/374,442, filed on Apr. 3, 2019.
(60) Provisional application No. 62/654,962, filed on Apr. 9, 2018.

(51) Int. Cl.
G06T 19/20 (2011.01)
G06F 3/0481 (2013.01)
G06T 19/00 (2011.01)
G06F 3/0484 (2013.01)

(52) U.S. Cl.
CPC ...... *G06F 3/04815* (2013.01); *G06F 3/04817* (2013.01); *G06T 19/006* (2013.01); *G06T 19/20* (2013.01); *G06F 3/04842* (2013.01); *G06F 2203/04803* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| 7,444,599 B1* | 10/2008 | Chaudhri | G06F 3/0485 715/815 |
| 2012/0216129 A1* | 8/2012 | Ng | G06Q 10/00 715/753 |
| 2012/0249741 A1* | 10/2012 | Maciocci | G06F 3/017 348/46 |

* cited by examiner

*Primary Examiner* — Yanna Wu
(74) *Attorney, Agent, or Firm* — Sterne, Kessler, Goldstein & Fox P.L.L.C.

(57) ABSTRACT

Disclosed herein are system, method, and computer program product embodiments for saving and loading workspaces in augmented reality (AR) environments. An embodiment operates by receiving a selection of an AR meeting space to open in a current physical location, wherein AR meeting space was previously configured for a remote physical location different from the current physical location. A selection of an AR meeting space to open in a current physical location is received. An arrangement of one or more digital objects of the selected AR meeting space is determined. A current anchor area within the current physical location that corresponds to a remote anchor area of the remote physical location is identified. The arrangement of the one or more digital objects of the AR meeting space is modified in the current physical location based on an alignment of the current anchor area with the remote anchor area.

20 Claims, 68 Drawing Sheets

Search Results, results are bundled into topic clusters:

Toss a cluster to the side to have it expand open, conceptually equivalent to "new tab":

- Bundles, clusters of visual info to explore.
- Other sites, Amazon, YouTube, RSS re-visualized.
- Good for exploration/ research.
- Explore: Learn new stuff, aka wikipedia

---

- Research: multi tabs. Best mini-van to buy.
- Auto complete
- Drill down
- Fluid layout Clicking on a bundle expands it over top the search like in AR home, pushing existing view back. Conceptual equivalent to client on a link in a browser.

Browser: Multiple pages open

- What would it look like when multiple web-pages (of different representation) are open.
- Core idea: Web experience can be a "composition" of different content clusters that take various forms Air BNB List AR environment Conference Room Office

D

AUGMENTED REALITY COMPUTING ENVIRONMENTS—WORKSPACE SAVE AND LOAD

CROSS-REFERENCE TO RELATED APPLICATIONS

This application is a continuation of U.S. patent application Ser. No. 16/374,442 titled "Augmented Reality Computing Environments—Collaborative Workspaces," filed Apr. 3, 2019 which claims priority to U.S. Provisional Patent Application No. 62/654,962 titled "Augmented Reality Computing Environments," filed on Apr. 9, 2018, which are herein incorporated by reference in their entireties.

BACKGROUND

Augmented reality is widely considered the future of computing. Augmented reality (AR) is a direct or indirect live view of a physical, real-world environment whose elements are 'augmented' by computer-generated perceptual information, ideally across one or more sensory modalities, including visual, auditory, haptic, somatosensory, and olfactory. The overload sensory AR information can be constructive (adding to the physical environment) or destructive (masking portions of the physical environment). AR may alter or augment a user's current perception of a real-world environment, whereas virtual reality (VR) replaces the real-world environment with a simulated one.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

One application of AR is to bring components of the digital world in a person's perception of the real-world, expanding the interface or digital canvas on which a user can interact with data elements. So that rather than simply viewing a display screen (such as on a monitor, or mobile phone), a user experiences a more immersive experience, as if the data was a natural part of the physical, real-world environment using one or more of the AR and/or VR embodiments described herein. AR may be used to both enhance a current user's physical environment, and to expand a digital environment to take advantage or encompass a user's physical surroundings. VR replaces the real-world environment with a simulated one. The systems and embodiments described herein may support, generate, and synchronize both AR and VR usages the system by different users.

The system described herein may include many different embodiments. Though the system may be referred to as an AR system, a VR system, or an AR/VR system, it is understood that the AR system may be applied to VR embodiments, and vice versa, and these terms are used interchangeably. In an embodiment, the AR/VR system may be used by a single person to extend a viewing area from a 2D screen to encompassing or using the entire or a portion of the physical space or room in which the user may be using the system. In another embodiment, the AR/VR system may be used to generate a shared experience or interface between multiple users, spanning one or more geographic areas, allowing each user access to the same data regardless of on which device the data may be stored, operating, or from which device the data is retrieved.

In an embodiment, this system may be used to augment meetings between users. The system may manage data from various devices operating on different networks, data manipulated in and from various physical spaces, and users who may be co-located or separated by geographical distance. In an embodiment, an augmented meeting space may provide the users, regardless of their physical location, access to at least some of the same data, arranged relatively similarly (to the extent possible given their physical surroundings when used in AR mode), regardless of on which device(s) the underlying files or data may be hosted or stored. In an embodiment, the system described herein may take advantage of cloud computing to provide a consistent view or experience to different users who may be accessing the system from different devices or from different physical locations or networks. The system described herein may augment and/or virtualize space, people, data or computer screens, and manage varying and ever changing physical and digital relationships between these objects.

Figure 1A:
FIGS. 1A-1B, 2A-2B, 3-5, 6A-6B, 7A-7B, 8A-8B, 9, 10A-10B, 11, 12A-12B, 13, 14A-14B, 15A-15B, 16, 17A-17B, 18, 19A-19B, 20, 21A-21B, 22-29, 30A-30D, 31-35, 36A-36G, 37, 38A-38B, 39, 40A-40B, 41-48, 49A-49B, 50A-50C, 51-53, 54A-54E, 55A-55C, 56-58, 59A-59B, 60, 61-64, 65A-65C, and 66-69 illustrate example usages, operations, structures, methods, systems, combinations and sub-combinations related to providing an augmented reality (AR) and/or virtual reality (VR) computing environments, according to some example embodiments.
Figure 1B:

FIGS. 1A and 1B illustrate an example embodiment directed to how AR may be used to improve the interaction with data, bringing data from a normal 2D screen into a 3D, physical environment. In FIG. 1A, a user may be viewing a video or image on their smartphone or smartwatch. However, the user may want to see a larger version of the image (or other data), or otherwise interact with it in a manner that is not enabled on the small, 2D screen of their mobile phone or smartwatch.

With a simple swipe-up gesture with their thumb or other finger, the user may move the image from the context of the 2D mobile phone screen or watch screen, into the physical environment. In an embodiment, a user may be in an AR enabled environment, or may be wearing AR enabled glasses or a headset that allows the user to see digital objects that overlay or augment their real-world physical environment.

As may be seen in FIG. 1B, the result of the swipe up gesture (or other preconfigured hand, voice, or other commands), may be that the selected image(s) that was previously displayed in the mobile phone or other device, is now displayed in the 3 dimensional, physical environment in which the user is located. In an embodiment, the computing device (with the 2D screen) may include a share button or feature which may be embedded with an app, web browser, photo browser, or web-based application may include a 3D share feature that is selectable by the user. The selection of this feature may enable the user to then view (selected) files on their 2D screen, in the augmented/virtual 3D environment, or seamlessly transition between both the 2D screen and the augmented 3D environment. Using various hand, voice, or other gestures, the user may then interact with the display of the image in the 3D or AR environment, making it bigger, or smaller, changing its location, and/or flipping it upside-down, to name just some examples.

In an embodiment, these motions (including the motion or other command to move the image from the 2D screen to the AR environment) may be recorded or captured by the AR glasses and processed by an operating system on the glasses or by one or more backend AR devices that are communicatively coupled to the glasses and mobile device. Upon detection of the thumb swipe or other gesture, the AR system may communicate with the mobile device, retrieve the image file or an image of whatever data the user is accessing, store or buffer on the cloud and communicate this data to the headset of the user, who may then see the 2D image become a 3D image through the AR glasses.

In an embodiment, another user who may be physically or virtually present in the AR-enabled room, or who may otherwise have access to an AR-enabled device (e.g., glasses, headset, mobile phone, monitor, etc.) may also see now see the image as it has been moved into the AR space. The AR system may track which users are in the same virtual or physical environment, and communicate this image to a headset or glasses of the second user. This second user may also interact with the image, or see how the first user is moving or manipulating the image.

In an embodiment, the first and second user may each have their own set of AR glasses that make the sharing of the data, such as the image, possible between the users. For example, the AR glasses may be registered to user accounts, which are logged into the same meeting 'room' or physical environment. As such, both users may have equal access to interact with and manipulate the data, as if it was a real-world, physical object. And while a first user is changing the size of the image, the second user may experience or see the first user changing the size of the image. The image may also be given or tossed back and forth between the users using various hand, voice, or other gestures.

Figure 2A:

FIG. 2A is an example usage of the AR system, according to an embodiment. As may be seen in the example of FIG. 2, different data may be 'floating' in the real-world physical environment at different height and depth levels. The data may include any 2D data, such as images, word processing documents, HTML or other web pages, videos, etc. In an embodiment, this data may be retrieved or received from a computing device associated with a user. The computing device may be mobile phone, laptop, smart television, or cloud-based account data that may be communicatively coupled to an AR system or device that can read or access the data from the local device.

In an embodiment, the user may be wearing AR-enabled glasses and may gesture or otherwise select an option on the computing device that launches the data into the physical environment of the user and is made visible via the glasses. In an embodiment, the user may walk into the physical environment, wearing the glasses, and using an AR interface may request previously stored data or a previously configured AR environment, and the AR system may display the images around or across the room or other physical space as shown.

In an embodiment, the user may save this session, which may include saving a relative position of the images or other data. The relative positioning may include relative positioning of data to other data (the relative sizes and distances between images and data). The relative positioning may also include the relative positioning of the data to the physical structure or shape of the room.

For example, the room may be mapped to a generic room model, relative to a user's position. The room, for example, may include a front wall, back wall, right wall, and left wall. The room may also include a ceiling, a floor, and other surfaces which may be mapped in the AR environment (such as table tops). In an embodiment, the AR system may track and save the relative positioning information of the data to one or more of these different physical room variables or features. Then, for example, if the user wants to bring up the session or data in a different physical room or environment, the AR system may scan the physical structure of the room and map the new room to the previous room and arrange the data in similar positions to whatever extent possible or using various mapping algorithms.

In another embodiment, the AR system may track the relative position of the data to the user. For example, the AR system may track angles, gradients, vectors, axis, curves, and relative distances between different pieces of data and a relative user location when the session is saved. Then, for example, if the user brings up the session in a new physical environment, the data may be placed in the same or similar relative locations (i.e., relative to where the user is standing or another user indicated spot in the room) when the session is retrieved.

For example, a user may be facing in a particular direction. From that direction, the AR system may track where the data is positioned relative to the last saved direction in which the user was facing (using a 360 degree circle). A first piece of data may be at a 45 degree angle from the user in a first environment and is at a first depth and a first height, and a second piece of data may be at a 245 degree angle from the user at a second depth and a second height. Then, as the user pulls up the data in different environments, the data may be arranged similarly relative to the user. In an embodiment, the data positioning relative to each other may also be tracked and used to position the data in the room.

Figure 2B:
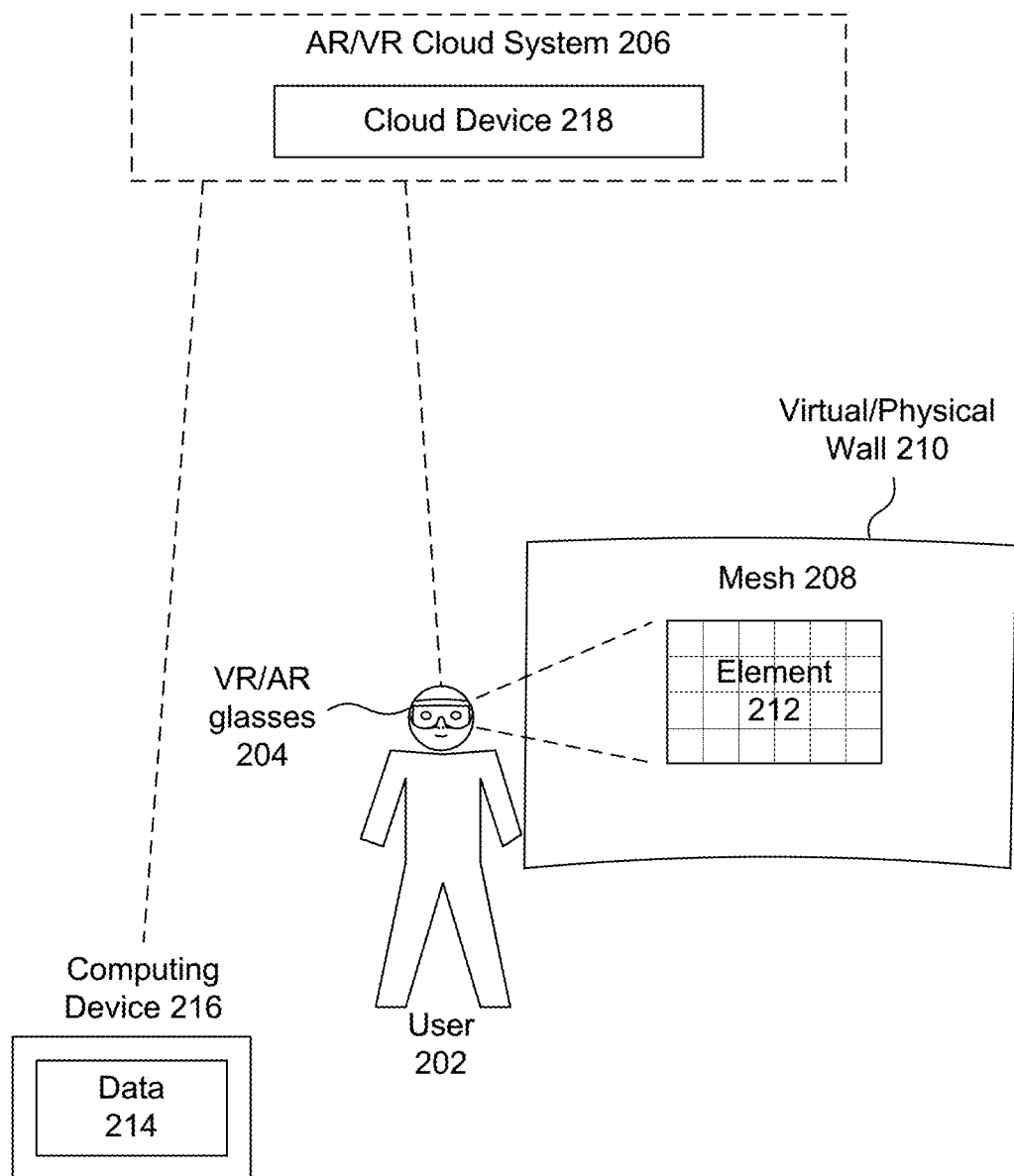

FIG. 2B is a block diagram illustrating an AR/VR system, according to some embodiments. In the example shown, a user 202 may be wearing AR/VR glasses 204 through which the AR/VR cloud system 206 makes visible either in augmented or virtual environment of data with which the user 202 may interact. Though the example shows glasses 204, in other embodiments, users may interact with the AR/VR cloud system using laptops, phones, wearables, glasses, or other devices.

The example of FIG. 2B illustrates through glasses 204 the system 206 may generate an augmented environment in which a virtual mesh 208 overlays a physical wall 210 of a room in which the user is using the AR glasses 204. However, system 206 may also be used to generate or display the virtual mesh 208 may be displayed on any surface, or no surface at all if being used in a virtual environment or may lay upon or overly a virtual wall 210.

In an embodiment, while one user may be viewing element 212 through an AR usage of system 206, another user may be viewing element 212 through a VR usage of system 206 and both users may interact with or otherwise manipulate the same element 212 when they are participating in the same AR/VR workspace or session. Changes made by one user may be made visible to the other user.

In an embodiment, the element 212 may be a representation of data 214 from a computing device 216. Computing device 216 may be a computing device local to user 202, or may be a remote, including a cloud computing device 218. In an embodiment, the data 214 may include an image file stored locally on computing device 216. User 202 may make a swipe gesture or other motion (or button press on computing device 216) indicating an intent to move data 214 to mesh 208. Computing device 216 may be communicatively coupled (via a network) to AR/VR cloud system 206.

In receiving the intent, system 206 may retrieve a copy or image of data 214 from computing device 216, and store the data in a memory or buffer in a cloud device 218. System 206 may communicate the data 214 and default or other positioning information to VR/AR glasses 204. Glasses 204 may then generate a representation of data 214 as element 212 on mesh 208 based on the positioning information received from system 206.

Then, for example, an interaction or movement of element 212 around the room by user 202 may be captured or detected by glasses 204 which may communicate this information to cloud system 206, which may then communicate this new position or size information to any other users who are participating in the same workspace or session as user 202, such that all the users who are participating in the session see the same element 212 movement and have a shared experience.

Figure 3:

FIG. 3 is an example usage of the AR system, according to another example embodiment. As may be seen in the example of FIG. 3, the AR system may map a grid or mesh to the various surfaces or at various depths or positions within or relative to the physical environment of a user. In an embodiment, a scan of a room may be performed. As part of the scan, the various surfaces of the room or other physical area may be identified. The various surfaces may include walls, ceilings, floors, screens, table tops, etc. In an embodiment, the AR system may superimpose a mesh, grid, or screen on each of these surfaces. These meshes may indicate a default or initial starting point for where data may be positioned.

However, during a usage, when a user is grabbing, pinching, expanding, shrinking, or performing other AR-designated gestures for moving data (or images of data) around the room, the user may not be limited to placing data along or on the initial meshes. New meshes or mirror meshes may be created at any depth level from the user. In an embodiment, the initial or default meshes may constitute a boundary or maximum depth for data or images. For example, in accordance with the real world, in an AR environment, the AR system may not allow a user to push data objects (3D depictions of data) through a physical wall in a room (where a mesh boundary has been set). However, in a VR application the room may be reconfigured or the dimensions of the rooms may be changed to accommodate the new depth levels the user desires.

By providing the ability to place objects anywhere within the room, using meshes at various depth levels, the AR system provides a user with a fully immersive way of experiencing or viewing the data. Each of these meshes at the various depth levels may be utilized by the users in an AR/VR environment as a virtual wall. For example, if a first piece of data is moved from a first depth level from an initial mesh, to a second depth level onto a second mesh, the AR system may track the depth level of this second mesh. Then for example, in tracking the user's gestures, the AR system may determine whether a user who may be moving a second object or data element to approximately the same area, may be placed on the same, second depth level mesh.

In an embodiment, the user may move the entire second virtual wall or mesh to a different location (e.g., to the ceiling) or to a different depth level or to a different surface or plane (such as to a table top—a vertical mesh may be laid horizontal, and a horizontal mesh may be made vertical).

Then, for example, any virtual objects or data elements 'stuck' to the wall may all move when the wall or mesh is moved.

In an embodiment, a first user may share a particular virtual wall or mesh with a second user without sharing all of the virtual walls of a particular room. For example, the first user may have a security clearance higher than the second user and may place only data that meets the clearance level of the second user on a second virtual wall or mesh within the room. The two users may then, regardless of whether they are located on the same or different geographic areas, may view the same virtual or augmented wall information. However the second user may be prevented from seeing the other data on the other walls, which may not appear in the second user's view, or may be blacked out, blurred, or otherwise hidden. The first user may then create third wall for a third user at a third security clearance, and so on.

Figure 4:
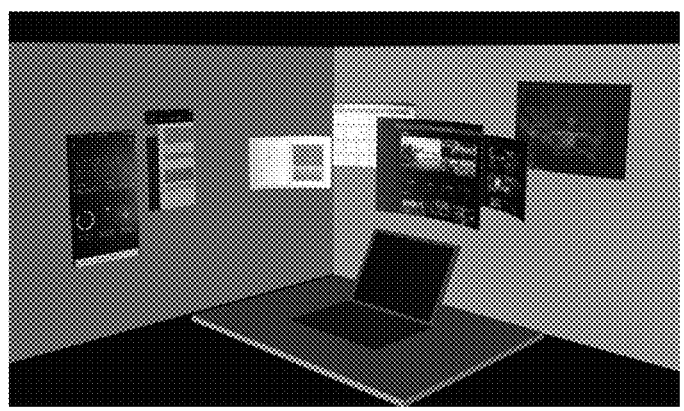

FIG. 4 is an example usage of the system in a VR environment, according to an embodiment. In the example of FIG. 4, the VR representation of the laptop may correspond to a real-world laptop or other computing device on which various data is located or operating. The user, in the VR environment, may pull the data off of the screen of the laptop and arrange the data around the room as shown. The data my include webpages, documents, images, videos, media files, or any other data.

In an embodiment, a first user may be accessing a similarly arranged room using an AR embodiment of the system, while another remote user accesses the room in a corresponding or mapped VR embodiment of the system. During this session, both users may have access to the same data object or display elements as described herein and may interact with one another using the AR/VR system.

Figure 5:

FIG. 5 is an example usage of an AR system, according to another example embodiment. In the example of FIG. 5, a user may have an app or application, such as Instagram® operating in their web browser or mobile device and displaying data in a two dimensional scroll view. In an embodiment, the AR system may receive the rich site summary (RSS) feed or other data stream associated with the app. Using the feed and the user's account information, AR system may extract and display new or other data in a three dimensional floating preview (also called 3D flow view) in the real-world environment of the user.

In an embodiment, the AR system may receive piped data from a content provider for display in the AR environment. In an embodiment, the AR system may read JSON (JavaScript® Object Notation) or other metadata or another markup language associated with the data to determine how to lay out or arrange the data in the AR, VR, or 3D space.

For example, Instagram® may be operating as a background application. Rather than having to activate the app, the user may quickly see a preview of the new images that have been uploaded to the user's feed. This may be an example of how a user may use the AR system to generate a new interactive view of their home screen on their mobile phone, laptop, or other computing device.

In an embodiment, the AR system may generate a preview that may include other data or images, such as most 'liked' images, or images associated with particular user accounts the user is following or has indicated to be of particular interest. In another embodiment, or visual indicators may be provided, such as a changing of a color of the floating Instagram® icon and/or an audible signal indicating new or unread data is available. Or, for example, the images may include a most recently or previously accessed or liked set of images, or images upon which the user has commented or received comments or likes. If the user then activates Instagram®, the set of images may be expanded and/or more data may be displayed or made available for interaction/access.

In an embodiment, the Instagram® application may have been activated and may take on greater visual prominence relative to other inactive or background apps. For example, the image shows a New York Times® app that appears in the background and is less visible or at a greater depth than the Instagram® app.

In other embodiments, with different applications, the preview, new, followed, or most recently accessed, data may vary. For example, on a shopping site, the user may see sale items, or items that were recently accessed/viewed, recently purchased items, or items and/or prices of items in a user's shopping cart.

In an embodiment, the Instagram® or other app may be moved from a 2D computing device into the 3D environment. Then for example, interactions, such as likes, comments, purchases, etc. performed in the AR environment, may be communicated back to the device on which the app is operating or otherwise communicated to the Instagram® service or content provider (by another device, such as a cloud computing device or an AR device that is logged into the user's account), and made live in the environment. For example, a user may like an image in the AR environment through a physical gesture (e.g., selecting a like button, or giving a thumbs up signal). This indication may be received by the AR device (headset) and communicated over a network to the device on which Instagram® is operating. The like indication may then be communicated to Instagram® which may then indicate the image as being liked. This new liked image may then be relayed back into the 3D AR environment over the network and made visible to the user.

Figure 6A:
Figure 6B:
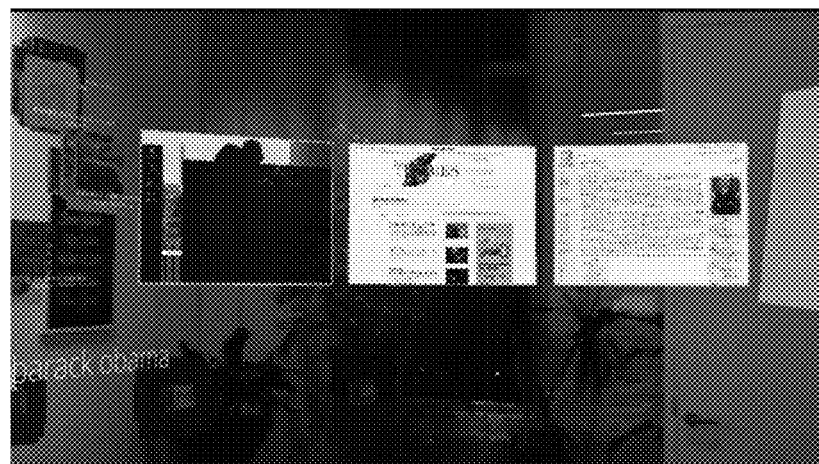

FIGS. 6A and 6B are example usages of the AR system, according to example embodiments. In the examples of FIGS. 6A and 6B, windows or tabs may be 'moved' from a mobile phone or computing device monitor into the physical environment for display or sharing. This may allow the user to see or access more information in the AR environment than would otherwise be available through the constraints of a 2D display. For example, accessing the same information on a 2D display may require a user to switch back and forth between tabs, may require the information to be reduced in a size that makes is difficult to read/access, or may otherwise not be possible due to physical display constraints and limitations of a conventional 2D display or device. This may also enable the user to share documents or data from their mobile device with other users (including remote users) who may be participating in the same AR/VR session or workspace as the user.

Figure 7A:
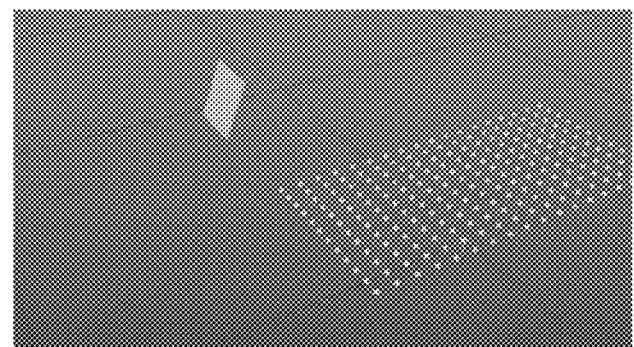
Figure 7B:

FIGS. 7A and 7B illustrate example operations of an AR system, according to some embodiments. FIG. 7A illustrates an example mesh that may initially be placed on a table, floor, or other horizontal surface. The data element may have initially been arranged or displayed on the horizontal mesh. However, a user, through interacting with the AR data element, may pick the data element off the horizontal mesh and place it on a vertical mesh/wall (not shown). In another embodiment, an environment may include vertical meshes, or a combination of horizontal and vertical meshes.

FIG. 7B illustrates an example of how different images may be arranged on either a horizontal or vertical mesh at varying depths. Furthermore, through allowing a user to arrange the AR data elements around a room or physical space, rather than a 2D physical screen, the AR system can display or make available more information at the same time than would otherwise be available using a traditional 2D display.

Figure 8A:
Figure 8B:

FIGS. 8A and 8B illustrate examples of how different images may be arranged around any physical environment, including an outdoor environment. In an embodiment, the display elements may be arranged on a variety of intersecting or interacting meshes that may be managed by a cloud-based AR system. In the example shown, the user may be outside, or in a space with a limited number of walls and no ceiling.

In an embodiment, in such an environment, the AR system may allow the user to place objects around a near infinite number of meshes (as may be possible in a VR display system), limited only by the buildings or other physical structures or the user's ability to use or see the AR element. In an embodiment, the AR system may generate an initial, default set of meshes, however these may not be constraints on the depth as the user's physical environment does not have any walls. The user may arrange the AR data elements anywhere within the 360 degrees of space around the user, allowing for a fully immersive experience. In an embodiment, the AR system could generate a mesh-based room or wall system (which may be made visible to the user through their AR glasses) in the physical environment on which display elements may be anchored or placed.

In an embodiment, the meshes may either lay flat (horizontal or vertical) or may be curved spherically around a user. As described above, a user may select a particular mesh (which may have various elements arranged around the user, and may manipulate them all together. For example, the user may delete or hide the elements, or arrange them in a more confined area, or share them with another user.

The user may perform any number of interactions with the data elements within the AR environment. Example interactions include summon (bring an element spatially closer, reduce its depth), push (move or toss an element spatially further, increase its depth), zoom (make an element bigger or smaller), merge (managing multiple elements or objects together as one element, or multiple meshes onto the same mesh or place them in the same area), pan (scrolling through various elements or meshes), stack/fan-out (stack elements together like playing cards, or fan out the elements of a stack so that one or more of the elements is more or fully visible), blur (reduce the visibility of a particular elements such the that element remains within the view area, but is not or is less readable), and hide/delete (removing an element from the AR display area). Users may also import or add new data elements into an existing workspace or environment. In an embodiment, a user may import data elements from a different room or workspace and merge them together with another workspace to create a new workspace of data elements which may or may not be anchored to a particular room or physical environment.

In an embodiment, the AR system may allow a user to interact with various AR display elements in a similar manner that a person may interact with a deck of cards in an anti-gravity or weightless environment. However, the AR system may provide a user with greater control in determining wherein within the AR space an element is placed (and remains) until physically moved again through AR-based gesturing.

FIG. 8B illustrates an example of how a user may begin with a consolidated set of objects and then may expand into the stadium-like, immersive experience illustrated in FIG. 8A. FIG. 8B also illustrates an example of how a user may condense a spread out number of objects into a smaller area or limited number of objects, relative to the expanded view of FIG. 8A.

Figure 9:

FIG. 9 illustrates an example of an AR collaboration environment between users that may be provided by the AR system, according to an example embodiment. As shown in the example, multiple users who may be co-located in the same room or other geographic area/AR space may see the various display elements (from one or more devices) from their own unique perspectives and positioning within the room as if they were viewing actual physical objects in the room.

As shown in the example of FIG. 9, a first user (on the left) may pass or toss one of the AR display elements to the second user (on the right). For example, the user may be using a pinching motion to select the AR display elements and then move his hand to point to the other user (or a mesh or other location near the other user) and let go of the pinching motion and the AR system may move or relocate the AR display element from its original location to the new selected location or mesh.

Both users may simultaneously see the display element move from the first location to the second location from their own physical perspectives within the AR and physical environment. For example, the first user may see the display element move further away (and get smaller relative to the first user's perspective) while the second user sees the display element move physically closer (as it gets bigger from the second user's perspective), however the actual size of the display element may remain the same, unless either user expands or contracts it size through another gesture.

The AR system allows multiple users who may be co-located in the same room to share and interact with the same display elements within the virtual or augmented reality. For example, the first user may have a mobile phone with a number of images. The user may pull those images out of the phone into the AR environment so that both users may simultaneously view or share the pictures (or other data).

In an embodiment, other remote users (who may not be co-located) who may be participating in the AR workspace or session may also have access to data elements that are brought from a 2D computing device into the AR environment. These remote users may similarly drag and drop their own data files and elements from their own computing devices into the AR environment, which would then be made visible to the other users in the same AR session or workspace.

Figure 10A:
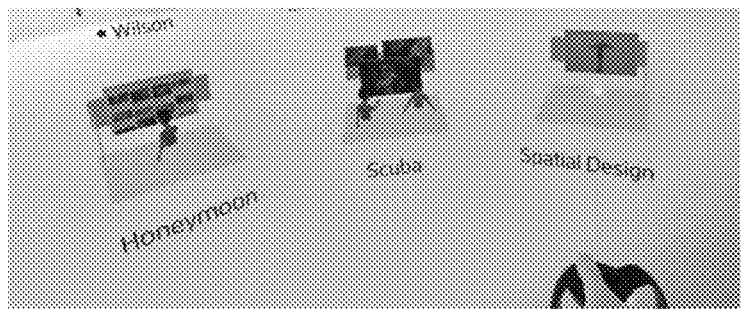

FIG. 10A illustrates an example of various AR workspaces which have been saved, or that may be in progress. For example, a user may be able to select one of the workspaces (honeymoon, scuba, or spatial design) to work in or on, and the AR system will arrange the AR display elements in the same or similar manner as they were previously arranged when they were saved (or as they may be in progress). Because of the differences in a user's current room and the room or area in which the user (or another user) was previously working, the display may not be exact. However, the AR system may map the elements as close as possible based on relative location around the room, relative location to each other, and/or relative location to one or more users.

In an embodiment, rather than working with the display elements in an AR workspace, the user may select or choose to work with the display elements in a VR workspace instead. In this manner, a more precise and/or location agnostic layout of the display elements may be maintained. In an embodiment, this may beneficial if a user is accessing the data or display elements from various locations, or if multiple people in various locations and/or various room sizes may be accessing the same data, simultaneously or asynchronously. In an embodiment, the changes or manipulations made by one user may be saved and asynchronously accessed by another user who accesses the same workspace at the same or later time. Or, for example, the changes may be user specific, such that a particular user only sees the data as it was left by the same user, and any data changes made by another user may not be visible. Or, for example, the AR system may provide a notification of an outdated state of the data, if changes had been made by another user. In an embodiment, the AR system may periodically save the state of data, so that a user may rewind, replay, or undo changes that were previously made by one or more users.

Figure 10B:
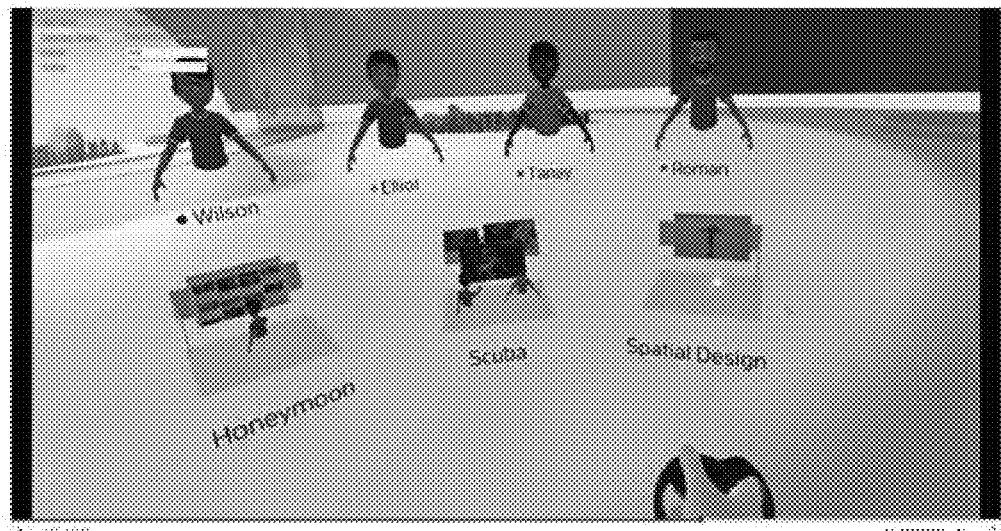

FIG. 10B illustrates an example in which the various workspaces may be other workspaces that are in progress by other users. For example, a user may have logged into the system and may want to join a meeting in progress. The various workspaces may be those meetings or workspaces to which the user has been invited, is authorized to join, or that is associated with a user account. Then, for example, the user may join any of the AR and/or VR sessions in progress and see and interact with the other users and data of the sessions that are already in progress. Or, for example, a user may select any active user and create a new workspace.

Figure 11:
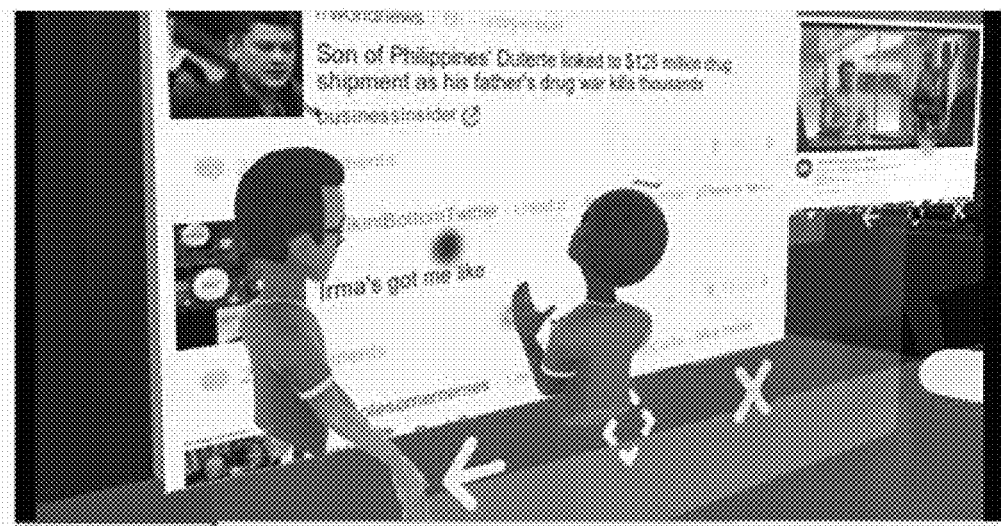

FIG. 11 is an example of the operation of the system in an AR or VR environment. In an embodiment, users may be represented by avatars in either AR or VR environments. As shown in the example of FIG. 11, both users (who are represented by their avatars) may view an enlarged display element which may be placed against a wall in the room. As shown in the example, each user's gaze may be indicated by a pointer, dot, laser, or other indicator within the environment. The indicator may enable a user to more accurately select various objects for movement or manipulation within the AR/VR environment.

In an embodiment, each user may only see his own indicator in the AR/VR environment. In another embodiment, any given user may make visible his indicator to other users, which may enable better or more accurate communication between the users. For example, it may be seen that both users are looking in the same location or at the same display element.

Figure 12A:
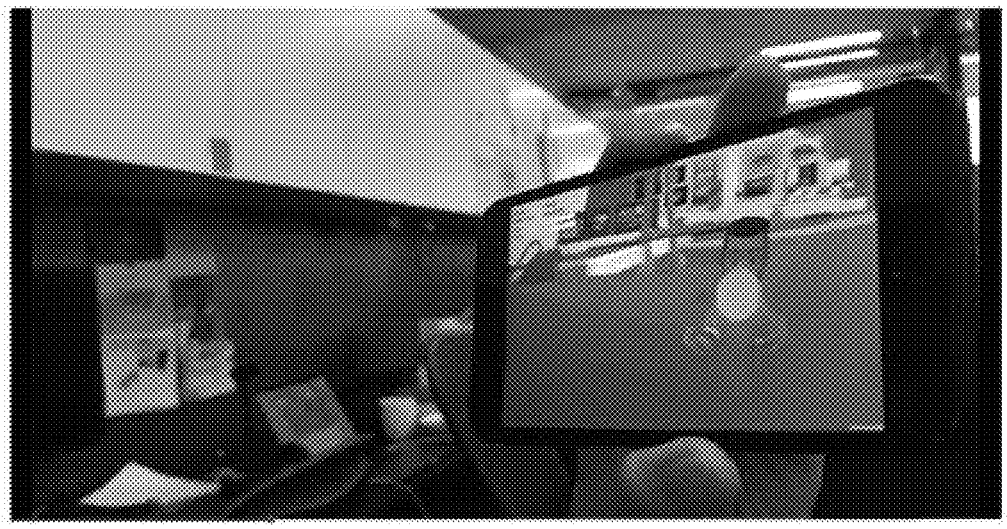

FIG. 12A illustrates an example of how a user who is operating an AR/VR enabled device, such as a smartphone or mobile phone, may have access to the same environment as one or more users who may be operating AR devices within the system. Using their smart phone, a user may interact with the user in the AR environment. For example, a smartphone user may speak through the microphone of the smartphone and the voice may be heard by the users in the AR system.

In an embodiment, the AR system may include perspective sound for the various participants in a workspace. For example, if a user is participating in a meeting or workspace over the telephone, the AR system may nonetheless position an avatar or other graphic representing the remote user within the AR room or workspace for other users to see. Then, for example, when the remote user speaks, the participants who may be wearing AR headsets will hear the sound as if it is coming from the direction of the avatar or graphic, as if they were physically present in the same room as the other participants.

Figure 12B:

In an embodiment, the camera of the smartphone may be used to provide an image or avatar in the AR environment of one or more other users. In an embodiment, using the smartphone's touch screen, the smartphone user may interact with AR display elements that are visible on the smart phone. FIG. 12B illustrates an example of how a user who on an AR/VR enabled device, such as a laptop, may have access to the same environment. In either scenario, the mobile device or laptop user may also drag and drop files from their local machines into the AR workspace so that other users in the AR workspace have access to or can see the files.

Figure 13:

FIG. 13 illustrates another example of how the AR system may enable collaboration between multiple different users in a VR environment.

Figure 14A:
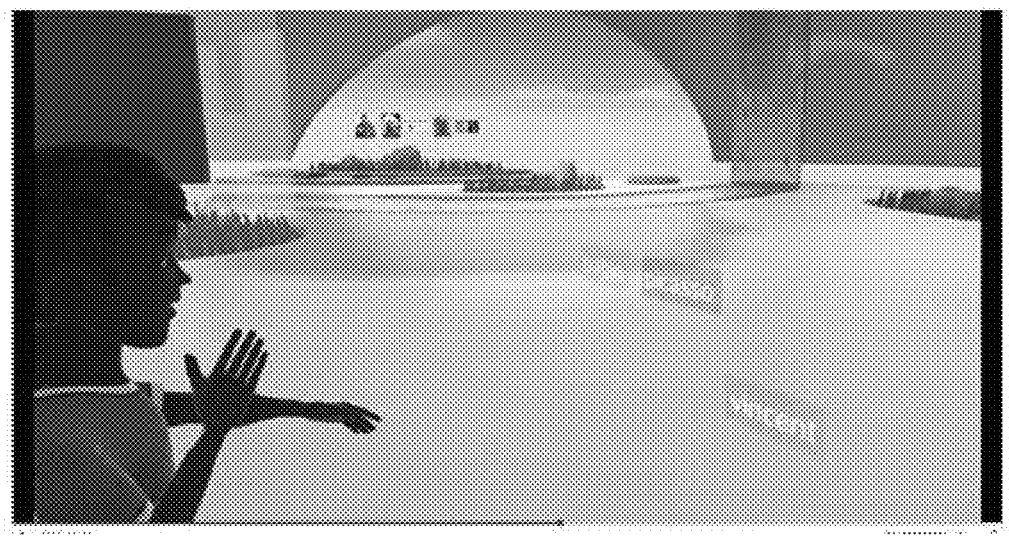

FIG. 14A illustrates an example of how the AR system may enable voice to display modulation. For example, through using a particular gesture (such as a hand gesture as if the user is bringing their hand or a microphone up their mouth), the AR system may be activated to scan the words being spoken by one or more users (which may include all the users or just the gesturing user). Using natural language processing, the AR system may selectively visualize certain key or subject-based words. Or, for example, the AR system may visualize everything that is said, and allow the user(s) to decide what to keep or discard.

Figure 14B:

FIG. 14B illustrates an example in which the AR system enables the users then to perform an action, such as a web or other database search with the visualized text. For example, by clicking an AR search display button, or making a search gesture, the AR system may submit the phrases to a search engine and return results to the user. The results may be categorized by type (news story, image, video, drawings, etc.), by source, by popularity (e.g., by likes on a social media platform, number of views, etc.), or by any other search criteria.

In an embodiment, the AR system may passively (in the background) listen for keywords from a conversation. The AR system may then generate thought bubbles that are visible to the users. The thought bubbles may appear for a specified period of time (e.g., 5 seconds) and then disappear if not acted on by a user. Action on a selection of a thought bubble may cause a search to be performed on one or more terms across one or more of the bubbles. The search results may be visually displayed as described herein. In an embodiment, a selection or activation of a thought bubble may cause the launching of a particular application or document. For example, if a user says "Twitter" a Twitter thought bubble, if activated, may load data from the selecting user's Twitter® account. In an embodiment, user 1 can activate a thought bubble of user 2.

Figure 15A:
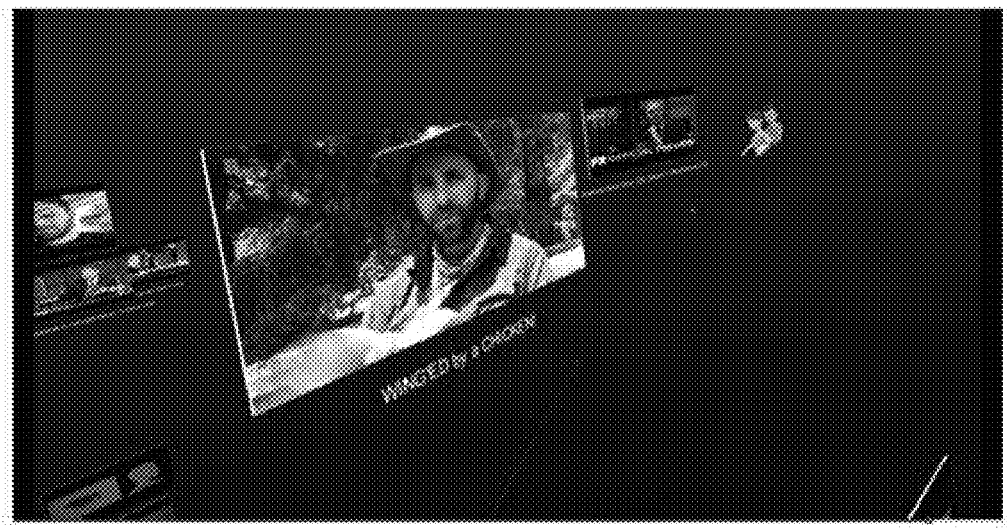
Figure 15B:
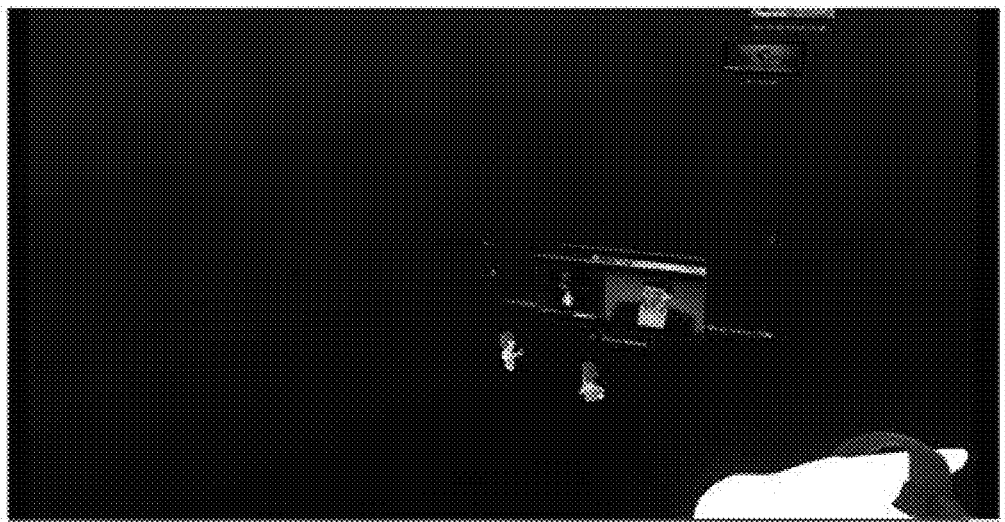

FIG. 15A and FIG. 15B illustrate example applications of the AR/VR system described herein. FIGS. 15A and 15B illustrate how users may join other users in an AR or VR system and share the same data. For example, a user may join a social group or video application AR or VR space, and see what videos other users (who may be participating in the same group) in the space are viewing.

The AR/VR system described herein may enable a social aspect to VR. For example, a popular video may include more avatars or other representations of the people who are or who have viewed it. Then, for example, a user may move over to the space in front of the video and watch the video from the point where the user joined the other users. In an embodiment, the users may float (as if in a weightless environment) or swim (as if underwater) around the various videos and join other users who may be viewing videos already in progress. As such, the users in a shared AR/VR space may engage in a shared experience of videos, images, or other data. In an embodiment, a user may queue up a video to be watched as a group once a specified number of users are viewing the video.

Figure 16:
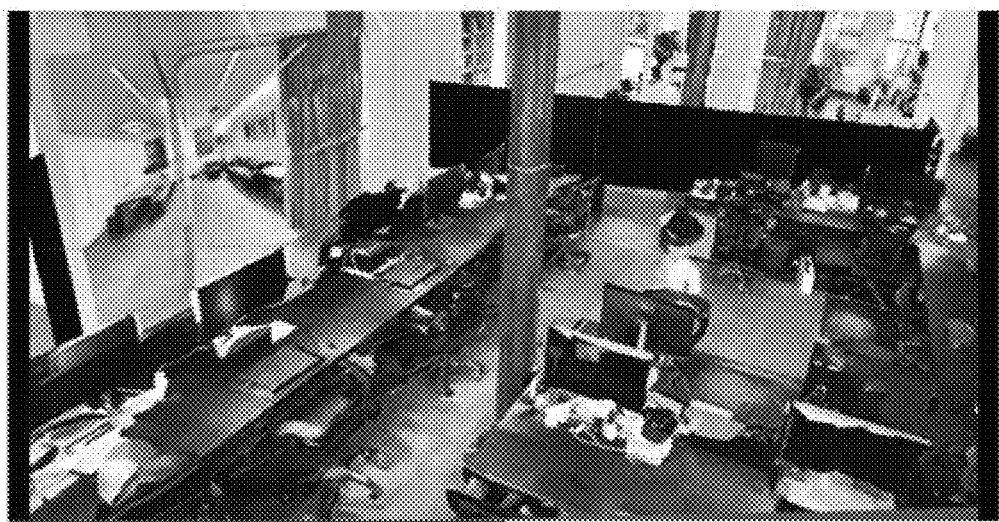

FIG. 16 illustrates an example of an avatar of an individual who is walking around an AR space. In the example of FIG. 16, the actual physical space where an individual is going to engage the AR system may be scanned for both imagery and depth. Then, for example, when the user activates the AR system (e.g., puts on the AR goggles or headset, or otherwise logs into the AR system from an AR enabled device) the AR system may track the user's movements and location within the scanned room. In an embodiment, the AR system may track relationships and locations between the display objects, including the users/avatars and display elements, objects, or other data overlaying the physical environment, and the physical objects of environment which may have been previously scanned and are accounted for. In an embodiment, if no such scan has been performed, then a user may access the display elements and objects in a VR representation or world.

Figure 17A:
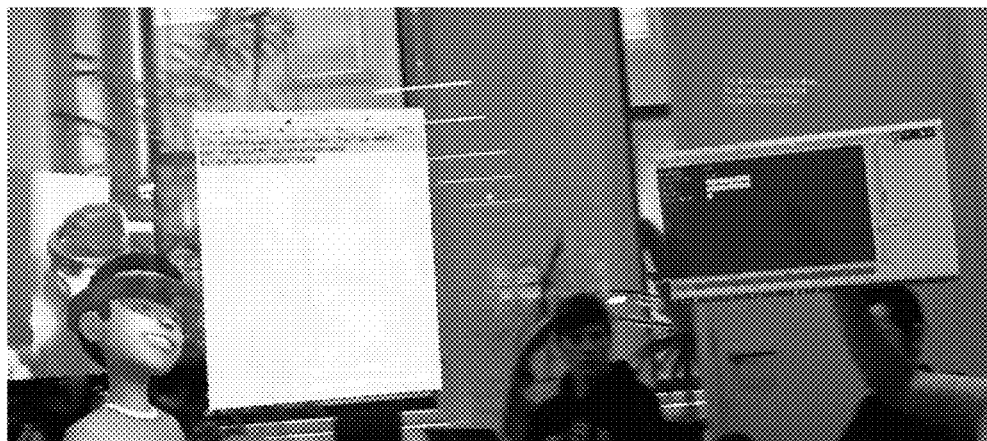
Figure 17B:

FIGS. 17A and 17B illustrate examples of AR and/or VR meetings that may be conducted using the AR system described herein. For example, as shown in the example of FIG. 17A, multiple users may be having a meeting a particular room, or co-located geographic location. Another, remote user who may be located in a different room, or different country, may join the meeting.

The remote user may join the meeting and may be physically represented in the space as an avatar. The avatar may be provided or displayed in an actual empty seat on the table (if any exists). Then, for example, all the users (both the ones physically located in the room, who may have AR devices/goggles and the users who may be joining remotely) may access and manipulate the same display objects from AR or VR interfaces. The remote user may be accessing the AR workspace from an AR-enabled mobile device, laptop, glasses, or may be interacting and seeing a VR-based platform (but may still have access to the same documents).

In an embodiment, the display images shown may originate from the remotely located user's device. For example, the remote user may have particular webpages or browser windows which he wants to share with other users during the meeting. Then, for example, by joining the meeting through the AR system, the user may drag the windows or documents from his local machine into the AR display element format and all the users may be able to see/manipulate the data that is hosted on the remote user's local machine.

Figure 18:

FIG. 18 illustrates an example of how the avatars may include real images of the person's face. For example, a smart phone with a depth perceptible or other camera may be able to scan a user's face. This information may be received by the AR system.

The AR system may selectively choose a subset of the data to compress and stream from the user's device over the network, into the cloud, and into the AR meeting room. The selected data may include those features that are determined to be distinguishable about an individual's face. Example features may include data about the eyes, nose, and mouth. Another example may include not selecting or sending every other pixel. This reduction or selection of a limited number of features or data to compress and send may enable the AR system to improve the processing speeds so that the most life-like real-time image is displayed. In areas of slower bandwidth, even less information may be collected and transmitted.

Figure 19A:
Figure 19B:
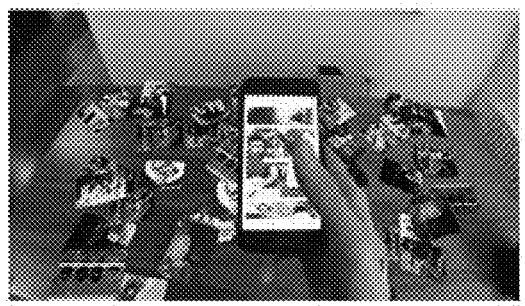

FIGS. 19A and 19B illustrate two example embodiments of how the interface of a 2D device can be merged with a physical, real-world, 3D environment in which the AR system is operating. In the example of FIG. 19A, a user may use their mobile phone (or other AR enabled device) to take pictures (such as selfies). As part of its native operation, the phone may store image files in the phone's memory and/or to a cloud system to which the phone is communicatively coupled.

Through providing a link, app, or plugin that connects the phone to the AR system, or by providing the AR system with account information that enables the AR system to communicate or be the cloud system where images are uploaded, the AR system can link the 2D screen with the 3D environment. For example, when a user clicks the take a picture button, the AR system may produce the effect of the pictures that were taken visually falling from the phone onto the table in front of the user. In another embodiment, the pictures could automatically leave the phone and be placed on a wall.

As described above, a room or physical space may be mapped with various virtual, AR meshes that may be user configurable. In an embodiment, the meshes may initially be mapped to planar surfaces, such as walls, ceilings, floors, table tops, or other areas where users may place, hang, or stick physical real-world objects. However, in physical environments in which there are no or are only a limited number of such surfaces, meshes may be created anywhere and of any shape, meshes may be flat (horizontal or vertical) or curved (or may map curved surfaces).

In the examples shown, an AR mesh may be generated on the table in front of the user. In FIG. 19A, the pictures, when taken by the user may visually appear to fall on the table top mesh. Using a randomizer, the AR system may simulate the pictures falling and landing differently on the table. Or, the AR system could cause the pictures to automatically stack on each other.

In an embodiment, the mobile phone may be configured to operate with an AR system and may be communicatively to a network or a cloud. When the mobile phone receives a command to take a picture, the picture file (or a selected portion thereof) may be automatically compressed and uploaded to the cloud or network (the picture file may also be stored locally on the device). The AR system may receive this file over the network or from a cloud computing device (which may be part of the AR system). The AR system may also be communicatively coupled to a user's AR enabled glasses or headset (though which the user may be viewing the mobile device). The AR system may provide the image file and the effect (of the pictures falling to the table) to the glasses, and then the glasses may display the effect for the user.

In an embodiment, rather than being received from the AR system, the picture taking gesture may be detected by the AR enabled glasses. For example, the AR system may receive an indication that the phone or other computing device is AR-enabled and connected to the system. Then, for example, the AR glasses may process, scan, or be configured to detect particular gestures associated with the device. For example, a picture taking gesture (a thumb hitting a particular area of the mobile phone) maybe registered by the glasses as an image retrieve and drop effect. For example, the AR system may retrieve the image file from the computing device, and provide it to the AR glasses. Then, for example, when the AR glasses receive the image file, the image drop effect may be executed and visually displayed within the glasses.

In the example of FIG. 19B, a user may have a number of different pictures, images, files, windows, browser tabs, or other files stored or open on their mobile phone or other device. The mobile phone may be connected to the AR network or system. With a swipe or other gesture, the AR system may retrieve the indicated files (such as a particular album of photos, which may be stored locally on the device, or in the cloud), and process or execute the scatter effect. The scatter effect may spread or scatter the selected files across a physical (or virtual) table in the user's environment.

Figure 20:
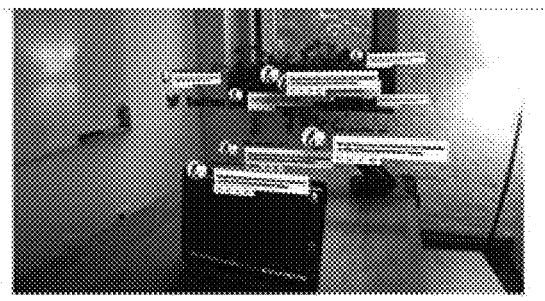

FIG. 20 illustrates an example of how a user may use the AR system to view or access more information and/or with greater context and simultaneously than may otherwise be available using a normal 2D device or 2D application. In the example shown, the Twitter® application (which displays data in a 2D scroll view within 2D devices and applications) may be loaded into the AR system (which may operating on a user's local device, or on a cloud-based device logged into a user's account). The tweets or other messages may be received by the AR system and rendered as a 3D flow view within the physical 3D environment of the user.

For example, a particular physical or geographic space may be indicated for new tweets or messages, and then when new feed information is received, it may be automatically displayed in the designated area. The user may then physically rearrange or manipulate the floating physical representation of the tweets as if they were real-world objects (such as playing cards floating in a weightless environment). The tweets may each be registered to one or more digital meshes rendered by the AR system, which may or may not be visible to the user at various instances. Or, for example, the user may have designated certain users with a higher priority and their tweets may be placed at a closer depth level relative to less important tweets.

Figure 21A:
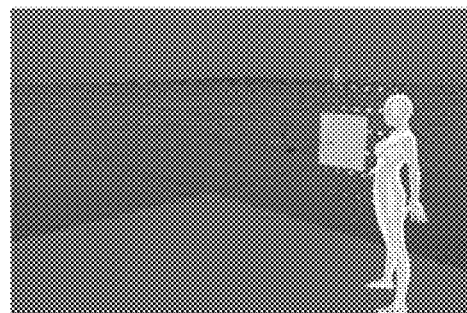

FIG. 21A illustrates that different users that enter or that are part of the AR environment in a particular room or workspace may each be assigned or configured with their own mesh. The individual mesh may enable a user to bring display elements closer to the user for viewing at a default distance (which may be configured by the user).

Figure 21B:

The individual mesh may also enable users to toss or pass display elements or objects back and forth to each other in the AR world. For example, as shown in FIG. 21B, two users may toss a pipe (display element) back and forth to each other. When a first user throws or gives an object to a second user, the AR system may generate a simulated motion of the object from the first user's mesh to the second user's mesh. In an embodiment, the first user may activate or grab the object with a first gesture, may point to a second user, and let go or make a throwing motion which may be detected by the AR system, to indicate that the activated object(s) or mesh of objects is to be provided to the second user.

The path taken between the users may vary based on the speed and/or motion of the user who is tossing the object. In an embodiment, an arm motion with greater velocity may move faster. The velocity and/or direction of a throw may be measured by an accelerometer.

Figure 22:

FIG. 22 illustrates an example of how multiple users may collaborate in an AR and/or VR based environment. In the example shown, the users may each be remote from one another (located in different rooms), but may nonetheless interact with each other, see what data each user is working on and share and manipulate data for brainstorming sessions and more effective communication and interactions between the users.

Figure 23:
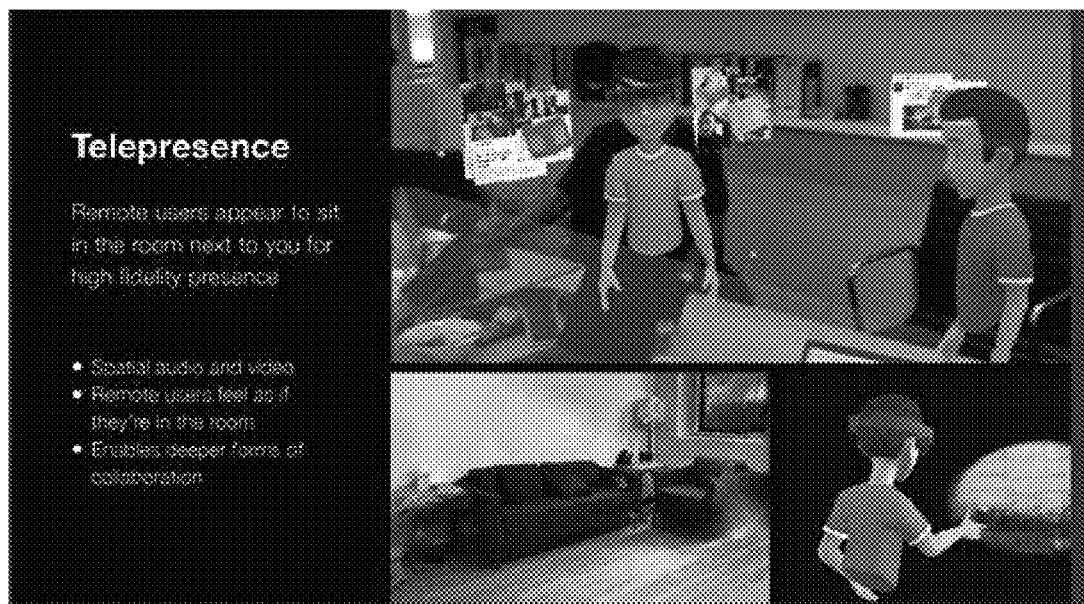

FIG. 23 illustrates the telepresence of users within a meeting. For example, remote users for a meeting may be placed around a table in which other, physically present users may be sitting. The AR system may know the relative locations of each user (using GPS, or network-based location tracking), and when the user speaks, the sound of the user's voice may be received by a microphone across one or more AR-enabled devices, such as the user's own headset, glasses, or mobile phone, and may be received and processed by the system. The AR system may then process the sound and return to the headsets or speakers of the other users to make the sound seem as if it is directionally based (coming from the speaker's physical location within the room). Remote users may see avatars or other symbols designating the other users may be physically present within the same physical location.

Figure 24:
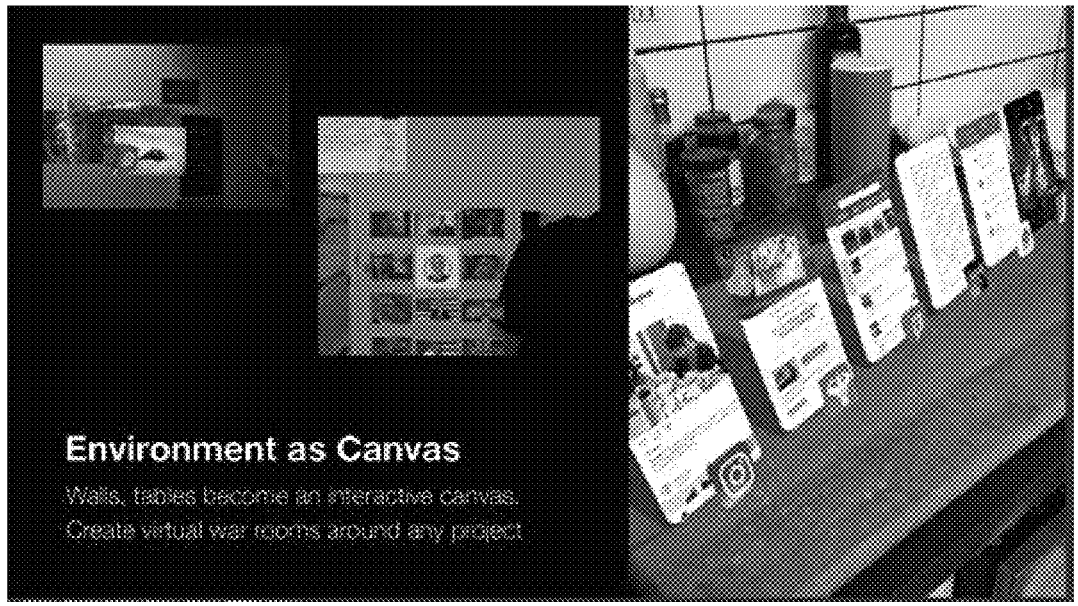

FIG. 24 illustrates examples of how a user may use their physical environment as a canvas, desktop, or home screen. For example, different data, apps, files, or images representing the various data, may spatially organized around whatever physical environment the user is geographically located. The images may float in space, be placed on a wall, or may stand on a table, bookshelf, or ledge like a book, or anywhere else a mesh has been designated by the AR system or a user of the system.

Figure 25:
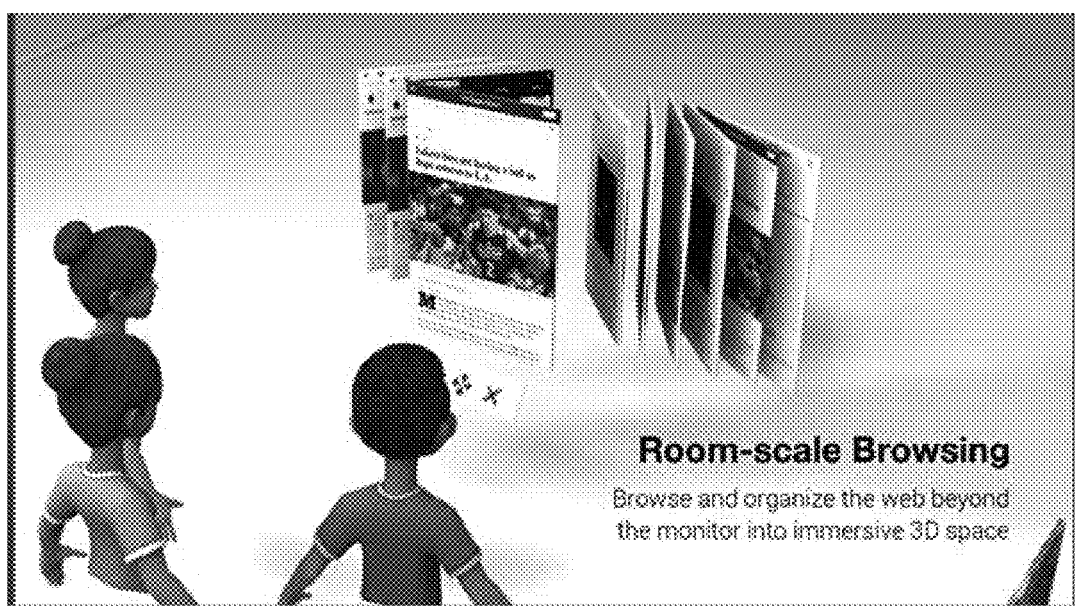

FIG. 25 illustrates an example of how a webpage or document that may be viewable on a 2D screen by an individual may be expanded within the physical environment so that it is simultaneously viewable and accessible to multiple users simultaneously. In an embodiment, the AR system may capture or receive one or more images of the document or webpage (and any subsequent pushed updates (received from a content provider) or device-initiated (by a user) updates thereafter), and may present those to the users in the AR environment. The images may be expanded to fit any wall or mesh within a room without distortion.

Though the example of FIG. 25 illustrates the different webpages as being different physical pages that the users can scroll through in a book type format, in other embodiments, the webpages may arranged differently. For example, in an embodiment, the webpages may be arranged in a tab strip format (discussed in greater detail below). Further, the various documents or webpages may be vertically and/or horizontally scrollable if all the information in the document/webpage does not fit within the designated display area. For example, a user may make a swipe up gesture and see the information at the bottom area of a webpage that is not displayed in the visible area of the webpage within the AR environment.

Figure 26:

FIG. 26 illustrates an example of a user interacting with a media browser, or streaming media app. In the example shown, the user may have the option of selecting movies, videos, or other multimedia that has been separated into different categories. The example movie categories shown include Action, Family, Superhero, Comedy, etc. And the user may see a preview of an example of the selection of the types of movies, media, or other files that are accessible with each category.

The preview may include new releases, most popular, recently watched movies, movies on the user's watch list or other categories of movies. In an embodiment, the AR system may be interacting with the streaming media provider (application), and when a user selects a particular movie to watch or preview, the AR system may receive (and buffer) content related to that movie that may be playable for the user (or a group of users in diverse geographic locations) over the cloud.

Figure 27:
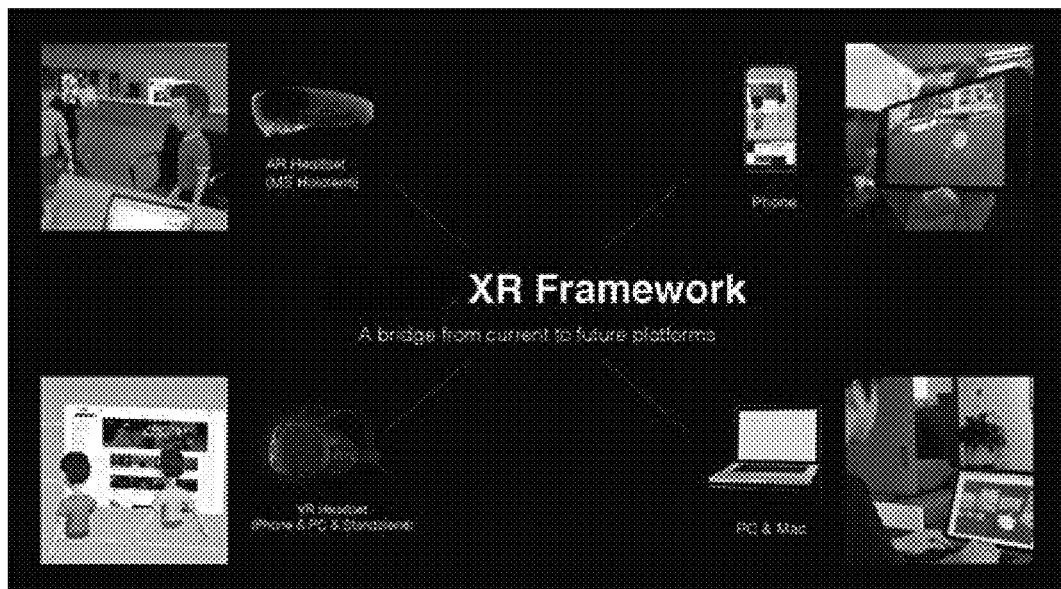

FIG. 27 illustrates an example of how the AR system or XR (cross-reality) system is device and platform agnostic. For example, the AR system may simultaneously interact with various AR-enabled devices across different operating systems and platforms. There are many different ways through which a device may be AR-enabled and may vary on a device-by-device, or app-by-app basis.

For example, a web-browser may be AR-enabled through the download and installation of a plug-in which allows the AR system and the browser to communicate with each other over the network. Similarly a phone may be AR-enabled through logging into a cloud-based network associated with the AR system, through which the AR system may access or receive information and data from the phone. The AR system may work with both AR and VR headsets or glasses.

The AR system may allow users on different devices and different platforms interact with each other simultaneously within the same AR or VR workspace, allowing them all to share an interact with the same data (AR data elements) regardless on which device(s) the actual underlying data (webpage, app, image, etc.) is being hosted.

Figure 28:
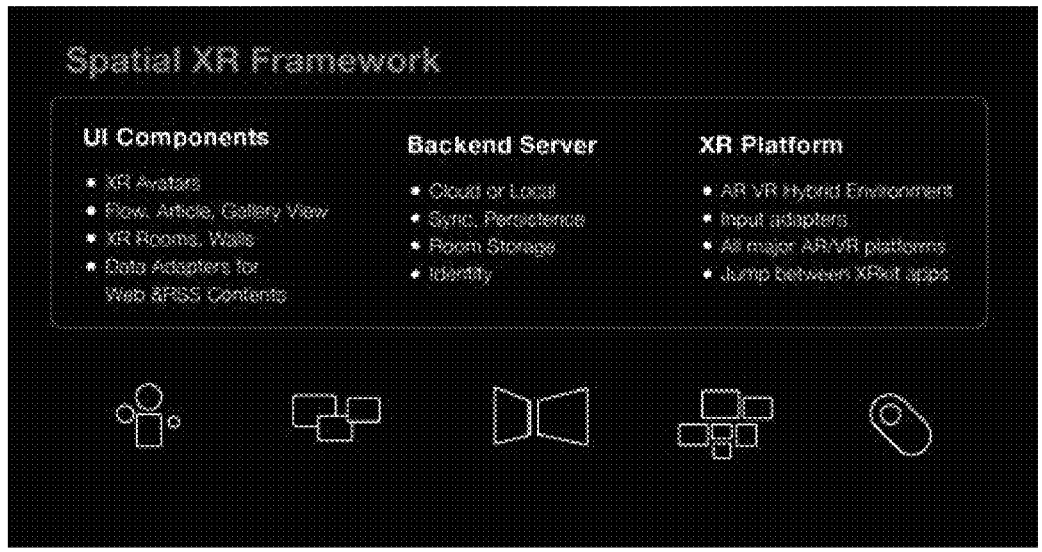

FIG. 28 illustrates an example AR system framework. The Spatial AR system framework may include user interface (UI) components which include avatars that represent the physical location of users within a VR/AR meeting space. In an AR system, the avatars may overlay the actual people who the avatars represent. The UI components may also manage flow, data elements, store room scans and meshes, and include data adapters for RSS and other data feeds.

A backend server system may include a cloud or other network-based system. The backend server may store information about stored physical environments, rooms, and the arrangement of data elements within different rooms and environments. The backend server may also track data states, room states, that enable rewind, replay, and roll back of changes made during a particular meeting which were recorded during an AR meeting or session.

The XR platform may receive data or input from a variety of different devices or methodologies. For example, input may be received through keyboards, voice, hand or other body gestures, touchscreen devices, etc. In an embodiment, the AR/XR/VR system described herein may normalize or virtualize the input such that input can be processed from any different number of devices. The terms AR, XR, and VR may be used interchangeably.

Figure 29:
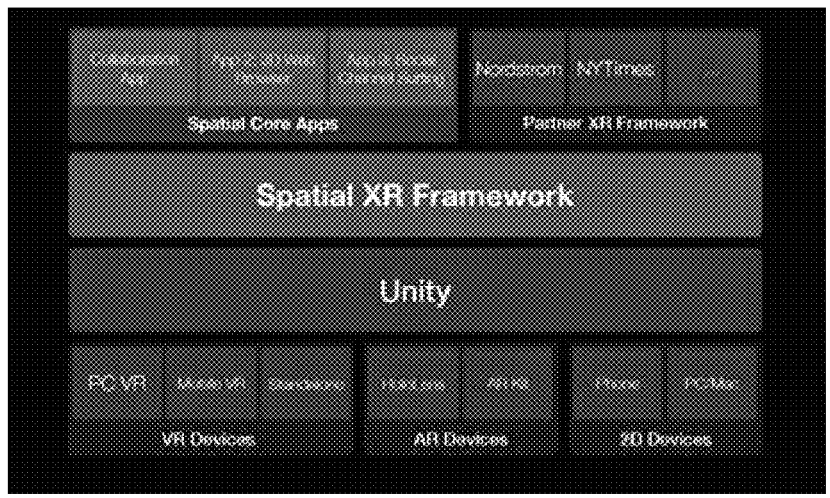
Figure 30A:
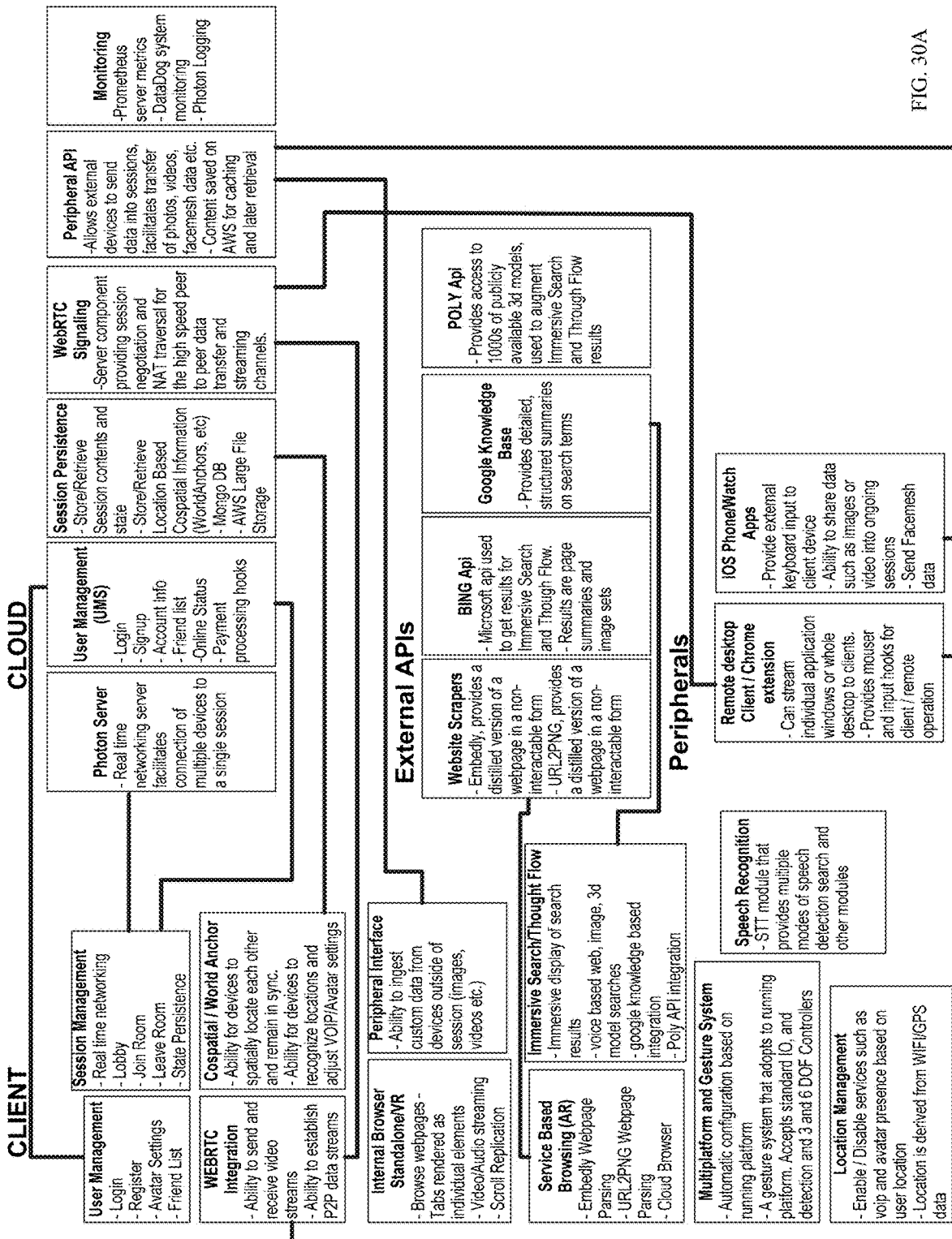
Figure 30B:
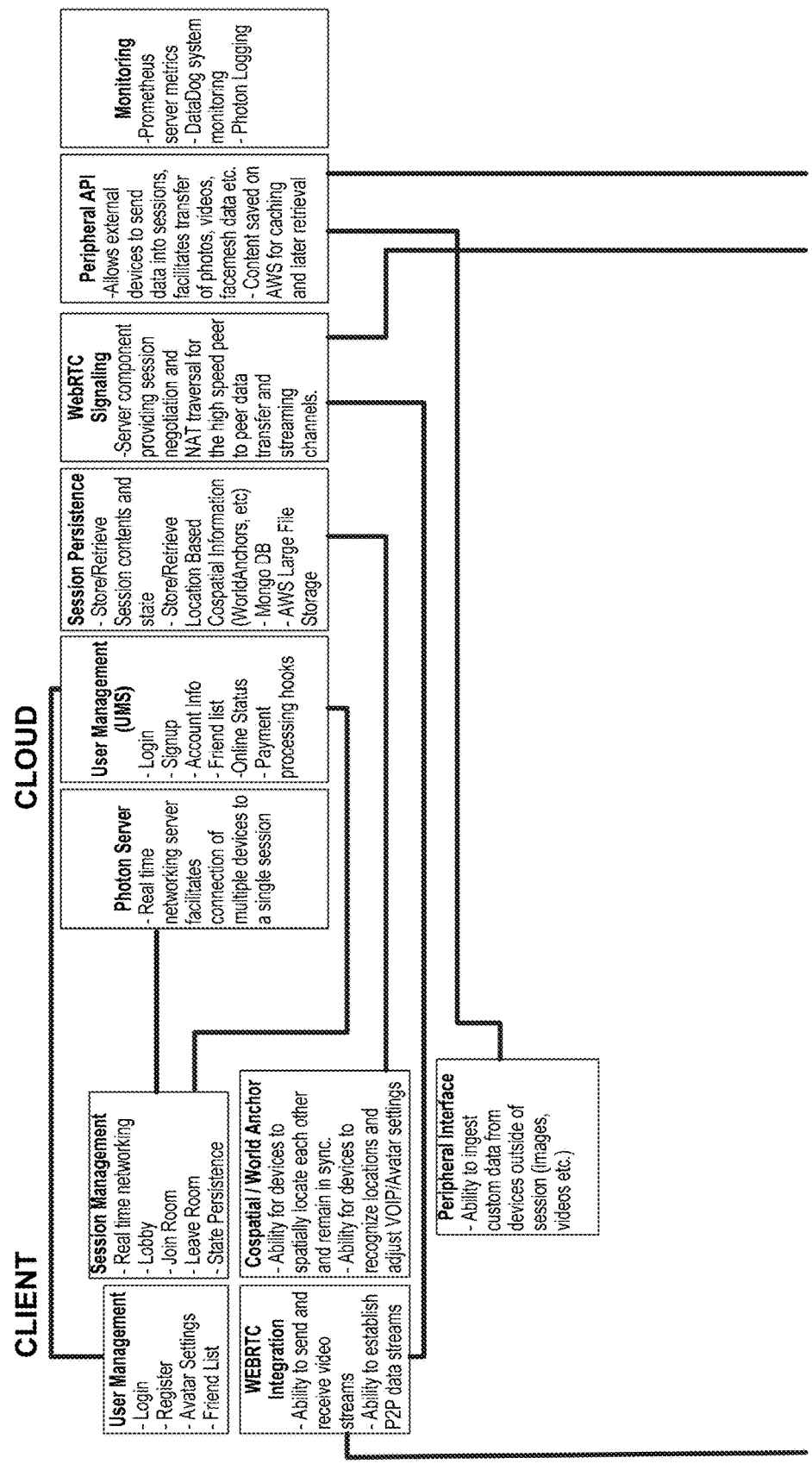
Figure 30C:
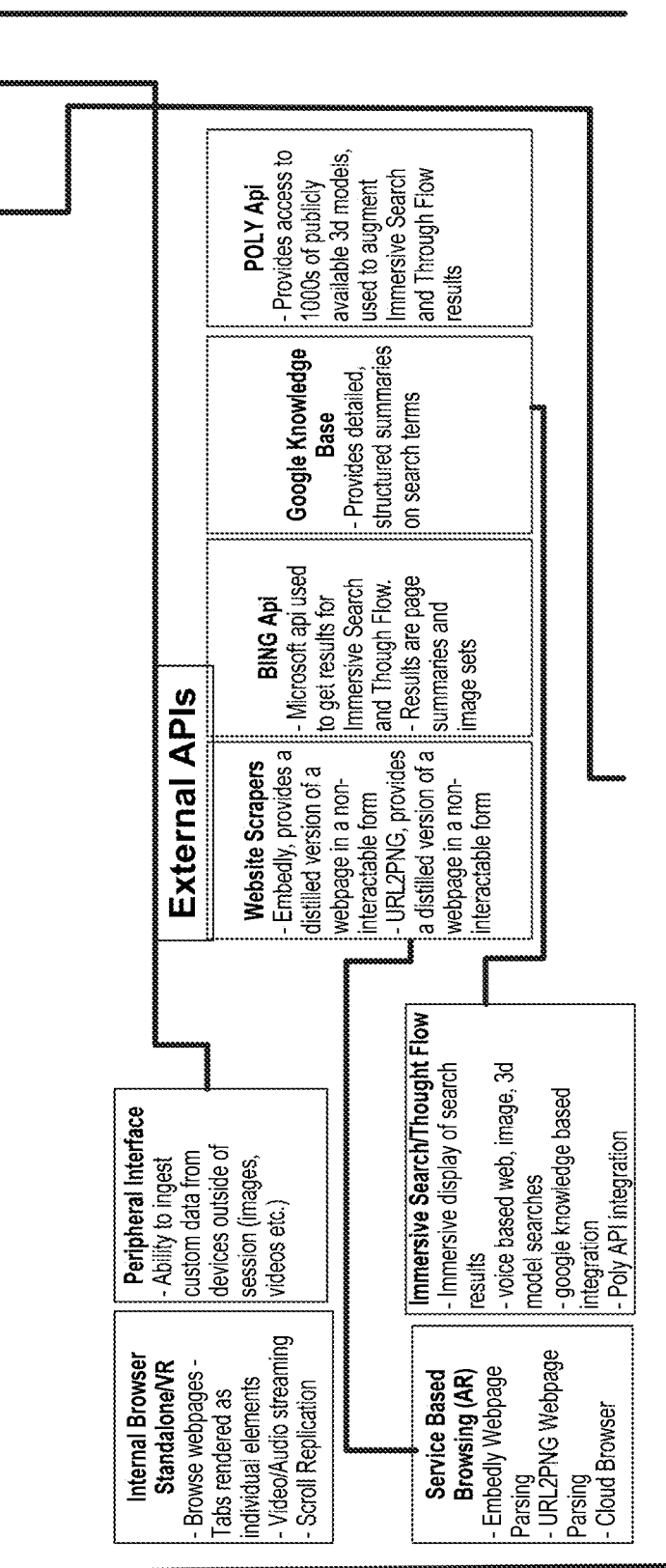
Figure 30D:
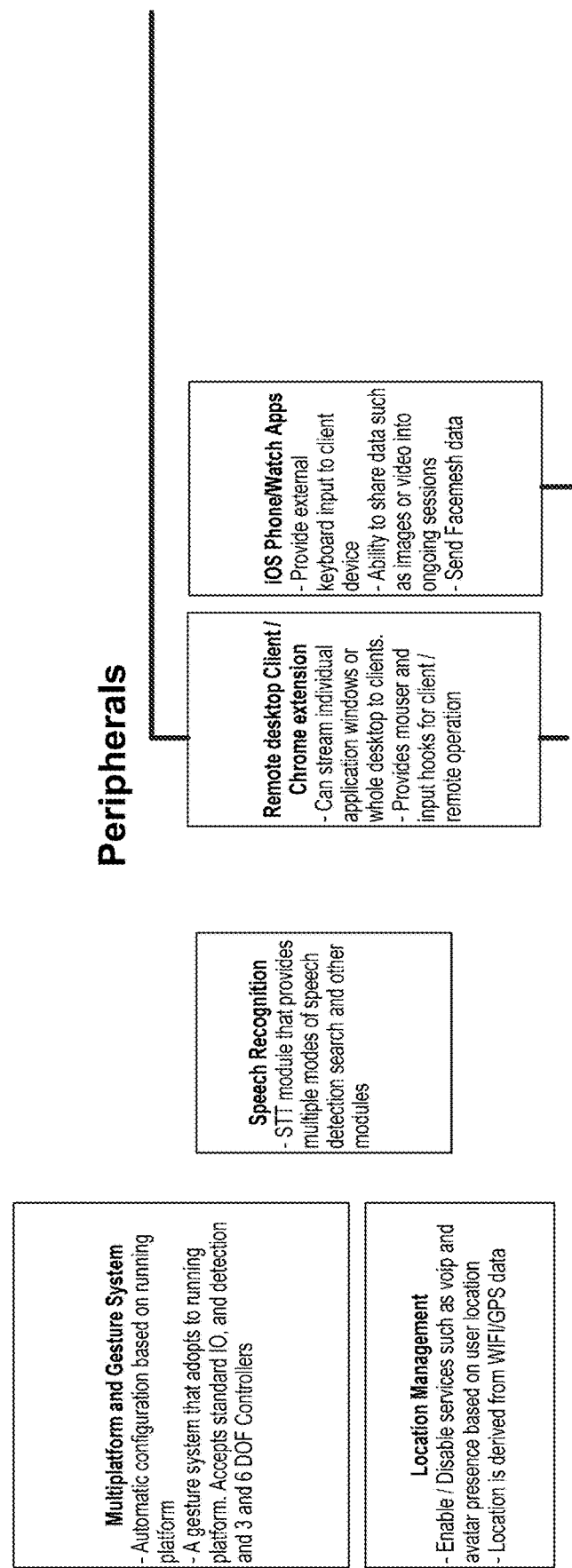

FIG. 29 illustrates an example configuration and relationship between the various computing devices of an AR/XR system. Various end users may be using different devices operating on different platforms, including VR devices, AR devices, and 2D devices. The input from these devices may be received by the Unity framework. Unity may be a cross-platform (game) engine that is configured to receive and normalize input regardless of the device or platform from which it is received, regardless of whether the device is a 2D or 3D device.

The Spatial XR framework or AR engine may receive the unity input and coordinate it or map with the input received from various AR-enabled applications or content providers and output the content through the Unity framework and back to the devices. The combination or integration may then be used to generate output that is sent to AR-enabled devices to produce a corresponding display for users.

FIGS. 30A-30D illustrate the interactions of various elements that may be involved in an example embodiment of the AR system. Various client-side functionality may be handled or processed by different elements across a VR/AR system.

In an embodiment, portions of the client-side functionality may be handled by network-based or cloud-based components or devices. This client-side functionality may include user management functions (login, register, avatar settings, friend list), session management functionality (real-time networking, joining/leaving room, state persistence), WebRTC (real-time communication) integration (ability to send and receive video streams, ability to establish peer-to-peer data streams), internal browser standalone VR functionality (browse webpages, tabs rendered as display elements in AR/VR environments, video/audio streaming, scroll replication), cospatial/world anchor (ability for devices to spatially locate each other and remain in sync, ability for devices to recognize locations and adjust VOIP/avatar settings), peripheral interface (ability to ingest custom data from devices outside of sessions, including images, video, and other data).

Other client side functionality that, in an embodiment, may be handled, executed, processed, or provided by other devices, such as the use of external APIs (application programming interfaces), or peripheral devices may be provided. Examples of such functionality includes service based browsing (AR) (embedded webpage parsing, URL2PNG webpage and document or image parsing which may take snapshots of data or images, such as webpages, cloud browsing), multiplatform and gesture system (automatic configuration based on a running platform, a gesture system that adopts to running platform, and accepts standing input/output, hand detection and 3 and 6 DOF controllers), location management (enable/disable services as VOIP and avatar presence based on user location, location is derived from WIFI/GPS data), immersive search and thought flow (immersive display of search results, voice based web and imaging, 3d model searches, Google knowledge base integration, and Poly API integration), and speech recognition (STT module that provide multiple modes of speech detection search and other modules).

The cloud components and functionality may include a real-time networking server that facilitates connections of multiple devices to a single session or workspace, a user management service (UMS) that handles login, signup, account information, friends lists, online status, and payment processing. The cloud devices may provide session persistence that enable users to store/retrieve meeting or session contents and state information (including actions by various users during session and data changes made during session), store/retrieve location based cospatial information (including the physical placement of data elements in one or more different physical environments, such as home office and work office).

The cloud device may also perform WebRTC signaling which may include provide session negotiation and NAT traversal for the high speed peer-to-peer data transfer and streaming choices. The cloud devices may also perform peripheral API functionality that allows external devices to send data into sessions and facilitates the exchange or transfer of data (such as photos, videos, face mesh data, etc.), and may save the content on a cloud-accessible system for caching and later retrieval. The cloud devices may also measure various session metrics (such as length of time, participants, upload/download speeds, etc.). and log user participation, data accesses, and other actions.

The external APIs may include website scrapers which may provide a distilled or partial version of a webpage in a non-interactable forms, may use APIs for web-based or other network-based search engines, and may search publicly available # d models used to augment immersive search technologies.

Other peripheral devices which may connect and interact with the AR/VR system include a remote desktop with a browser extension or app which cloud or AR devices can receive streamed data or have access, and enables user interaction with the AR/VR environment through traditional input/output mechanisms (mouse keyboard). Other devices may include smart watches that are able to share data with the AR/VR environments described herein.

The AR/VR system described herein provides for a collaborative browsing environment of data, webpages, images, video, documents, etc. In the collaborative browsing environment users can simultaneously browse the web and create virtual data rooms in which they can share data and files. The system supports all the functionality of today's browsers but layers on live or asynchronous collaboration as well as using the "room as a display"/creating virtual data rooms around project. Also trying to better support user flow/creativity.

The system may support general browsing behavior that people use in traditional 2D browsers with minimal buttons and one-hand gesture control. Some of these behaviors include search, open link, open links in new tabs, close tab(s), back button, forward button, scroll through numerous tables, reorder tabs, stacking/spreading/panning/repositioning tabs.

Figure 31:
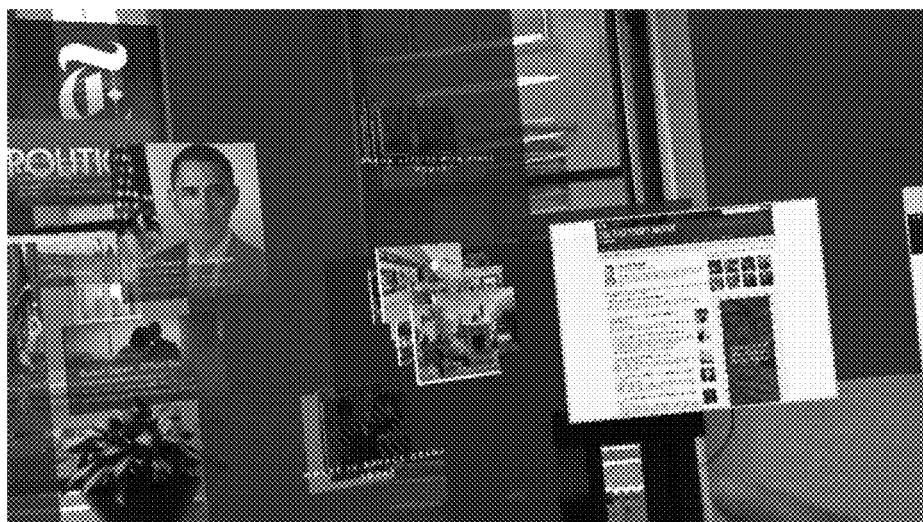

As shown in FIG. 31, during a browsing session (of webpages, images, or other documents) different documents may be placed at different depths and include different opaqueness depending on their state or priority. A tab may be in ready state in which the tab is readable in its current form. A tab may be in focused state, which may resemble full screen view in a traditional 2D environment, in which the user may see the focused state tab with no other distractions (e.g., all other tabs moved to the background or other physical locations around the room) (as shown in FIG. 31). In an embodiment, the other tabs may be in ready state or a background state. Multiple tabs may be in any state at any given point in time. Or for example, two different users in a room may each have their own focused state tabs.

Figure 32:
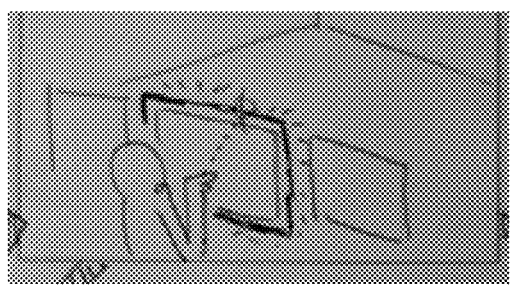

FIG. 32 illustrates an example usage of an AR/VR system. In the example shown, a user may be viewing a particular panel or AR data element, and perform a pinch or grab gesture that may indicate or initiate a command to move, expand, relocate, or otherwise manipulate the data element. The AR system may provide a visual indicator for the user to indicate which panel has been selected. During this selection state, the user may toss the tab to another user, stack the tab on top or behind other tabs, delete the tab, rotate the tab, or perform any other tab manipulation.

Figure 33:

FIG. 33 illustrates an example of a tab strip, in which traditional tabs or data elements in the AR environment may be organized into a strip. The user may resize particular windows or data elements and arrange multiple data elements within the confines of the strip. In an embodiment, the strip is an example of a preconfigured mesh that is accessible by the user. The user may expand or relocate the strip, and all the data elements or the objects of the tab strip mesh may adjust accordingly.

In an embodiment, the AR system may visually treat these data elements in a tab strip or other mesh as physical objects. For example, if a user drags a first data element from a first position to a second position, if a bump feature is activated, then the object may bump or physically move any data elements it intersects or interacts with along the way.

Figure 34:
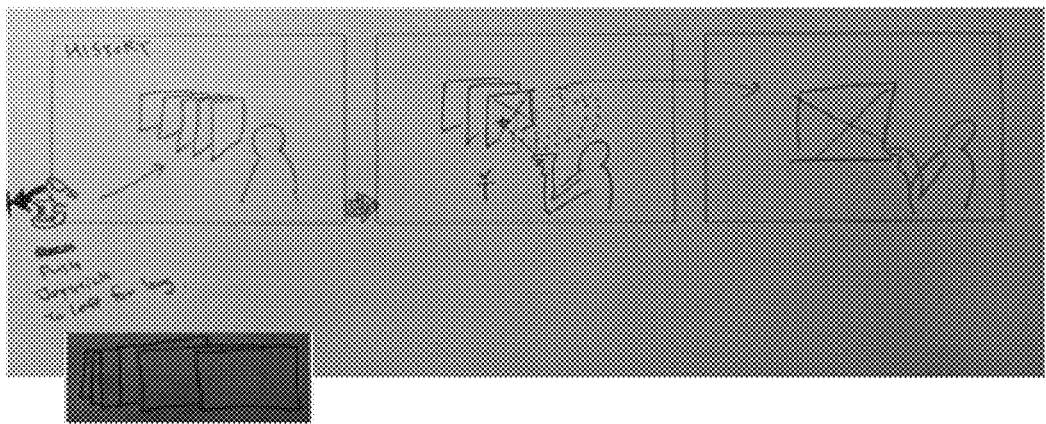

FIG. 34 illustrates an example of how a user may view a history of previous accessed images, documents, webpages, etc. which may stacked. In the first stack or pan mode, the user may be able to partially see a selected number of the history tabs. The user may then point or pinch and select one of the tabs, which may be made active or otherwise pulled to the forefront. Then, the remaining tabs may be moved behind the activated tab or otherwise deleted from the view space. In an embodiment, these history tabs may be cached in a cloud computing system for fast access in case the user wants to see them again.

Figure 35:
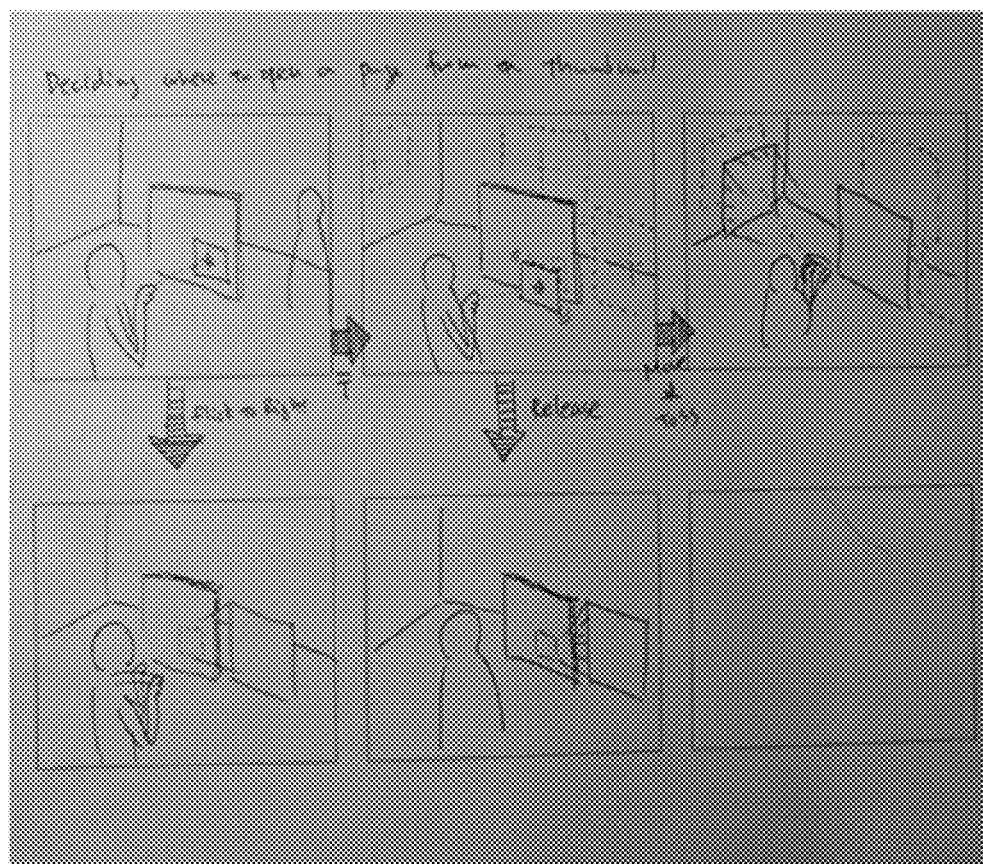

FIG. 35 illustrates some example commands or manipulations a user may perform with regard to the opening a new tab, or relocating an existing tab. In the example shown, a user may select a tab from a mesh and may flick to the right and the tab is placed to the right of where it was. In the example shown, the user may simply grab the tab and bring it closer. In the example shown the user may select the tab and toss or pin it onto another wall or mesh.

Figure 36A:
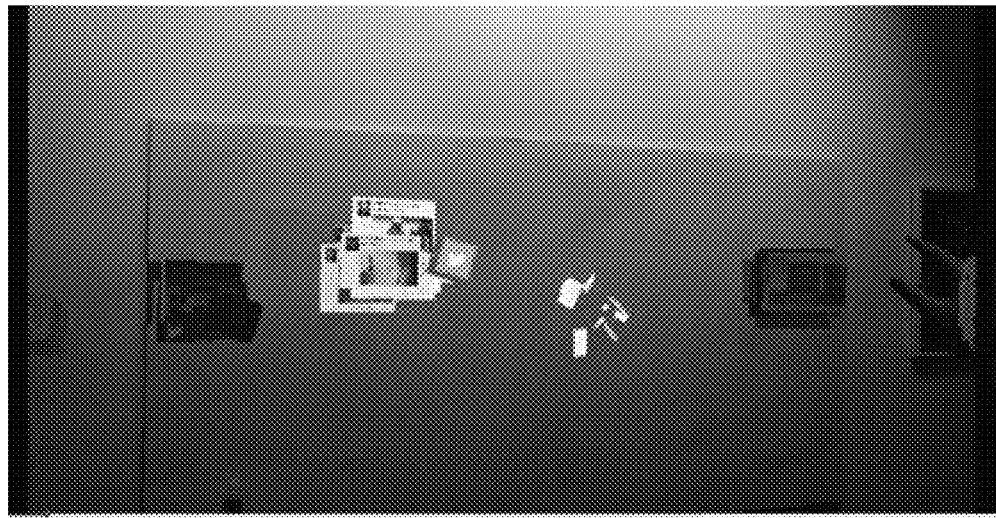

In FIG. 36A a user may select the Twitter® application from the various available applications that are accessible in the VR space, which may include a search functionality using a particular hand gesture. Other background applications may be viewable, but include visually distinct features relative to the active or activated application.

Figure 36B:

As shown in FIG. 36B, upon selection of Twitter® or the performance of another hand gesture, the elements or data of Twitter may be expanding across one or more meshes or locations within the room. In an embodiment, if a user is reopening the application, it may resume from a previous state with a similar physical arrangement.

Figure 36C:
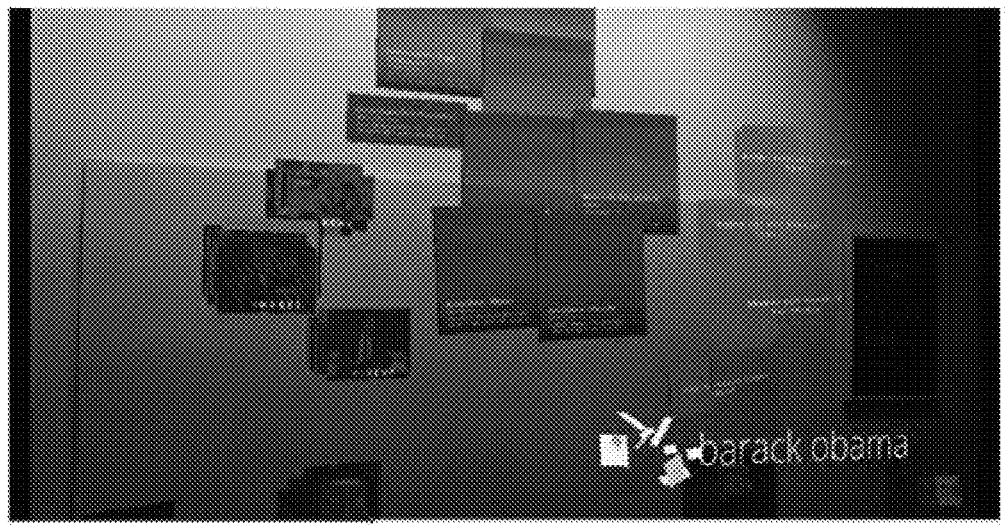
Figure 36D:
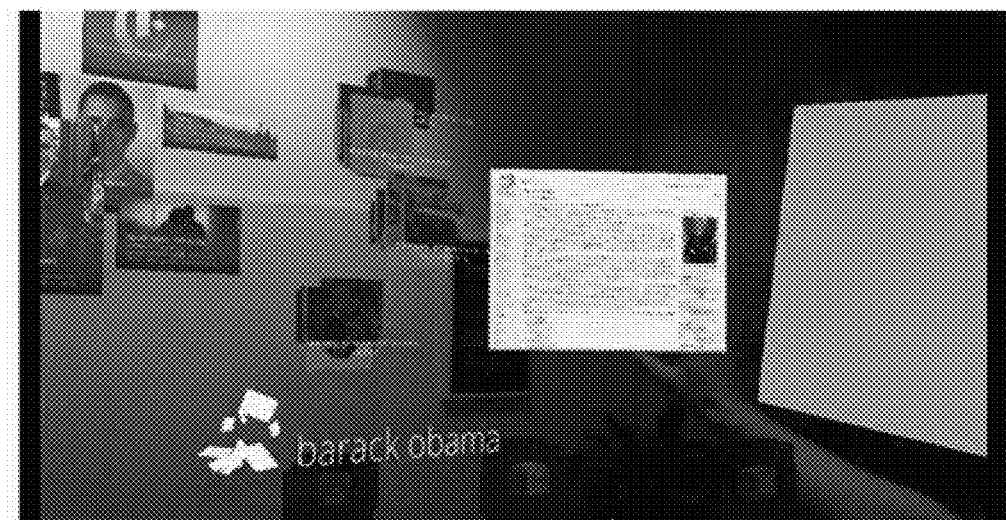
Figure 36E:
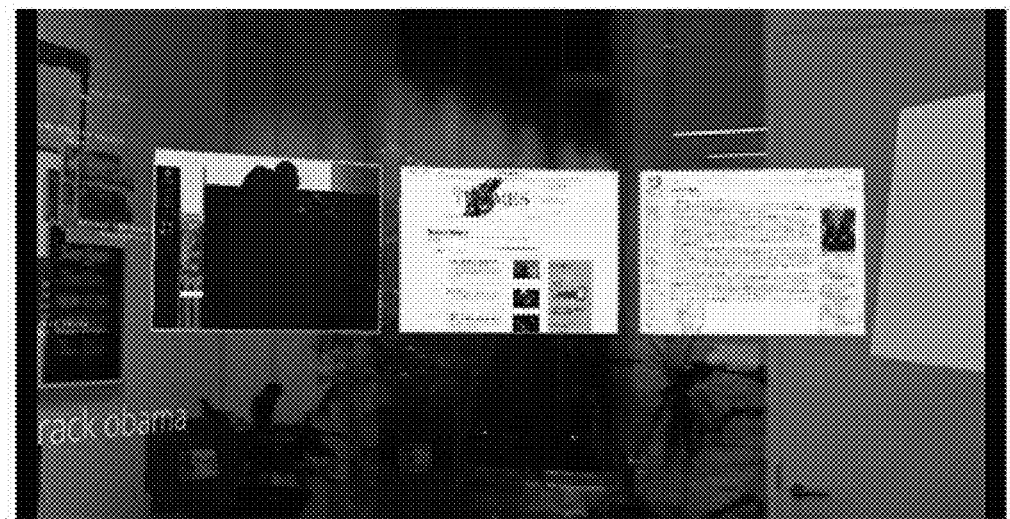

FIG. 36C illustrates an example search functionality as results are being loaded for the search "Barack Obama." FIG. 36D illustrates that a user may use a hand gesture to select one of the images, and may drag the webpage from which the images is taken or displayed, into a new mesh. FIG. 36E illustrates a tab row that may be created by a user using a selected subset of the search results.

Figure 36F:
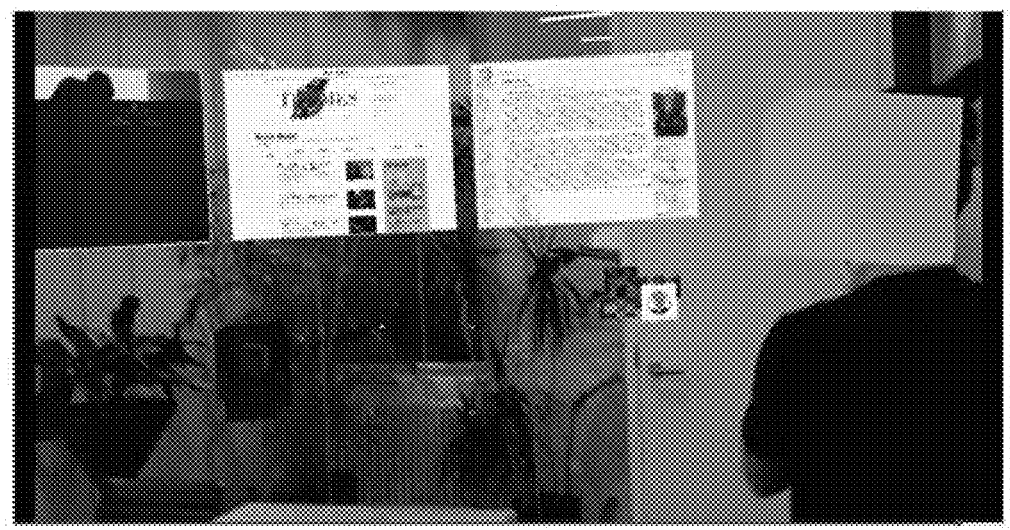
Figure 36G:

In FIG. 36F the user has selected a particular group or mesh of the search results and is moving the mesh to the door. In FIG. 36G, the user has tossed the selected group or mesh of search results against the door mesh and the AR system has expanded the images to take up the space of the mesh or to display all the images.

Figure 37:
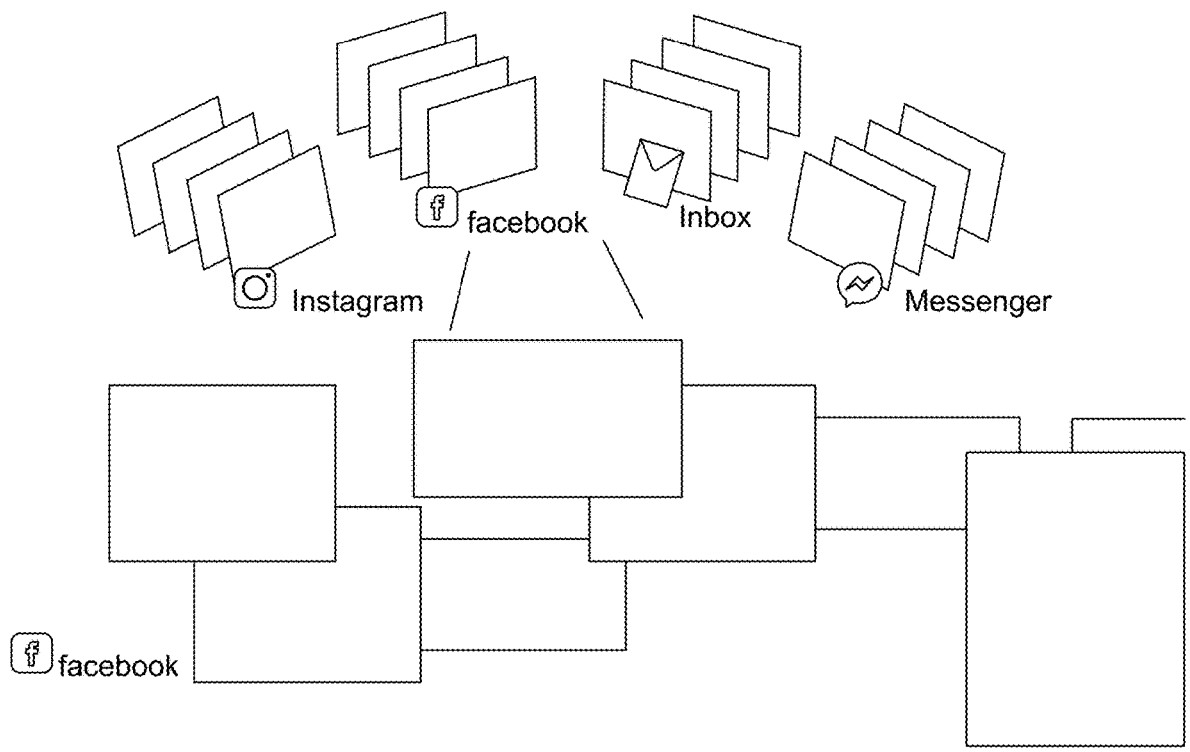

FIG. 37 illustrates an example of what a home screen (of a 2D smart phone) may look like in an AR environment. In the example shown, a user may have a number of different apps open (Instagram®, Facebook, Inbox (e-mail), messages (text/SMS). The most recent or other sorted content may be previewed or panned out in the AR environment. In the example shown, the Facebook app may be activated and expanded to a closer mesh and may take up more physical/digital real estate within the user's view.

Figure 38A:
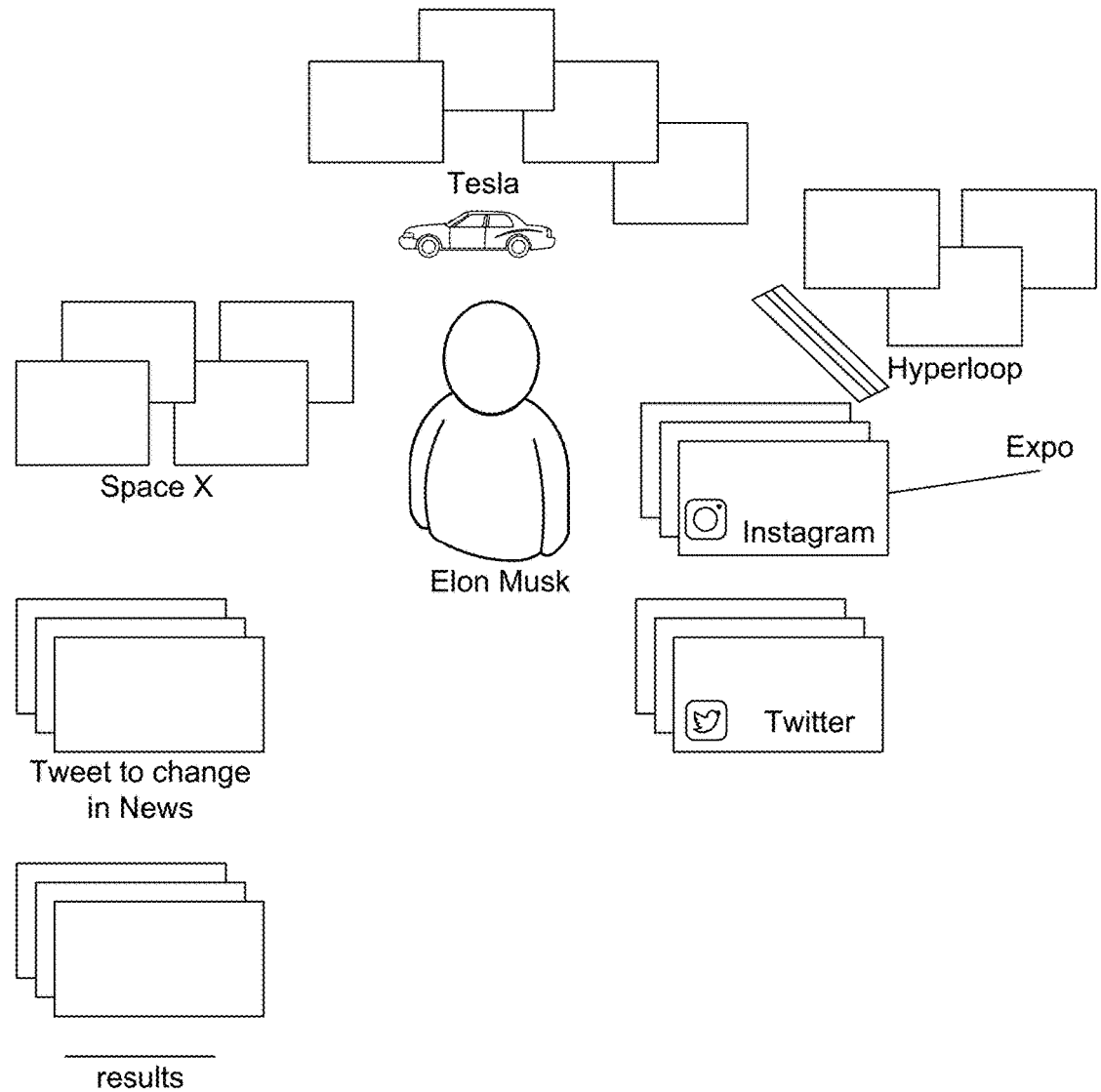
Figure 38B:
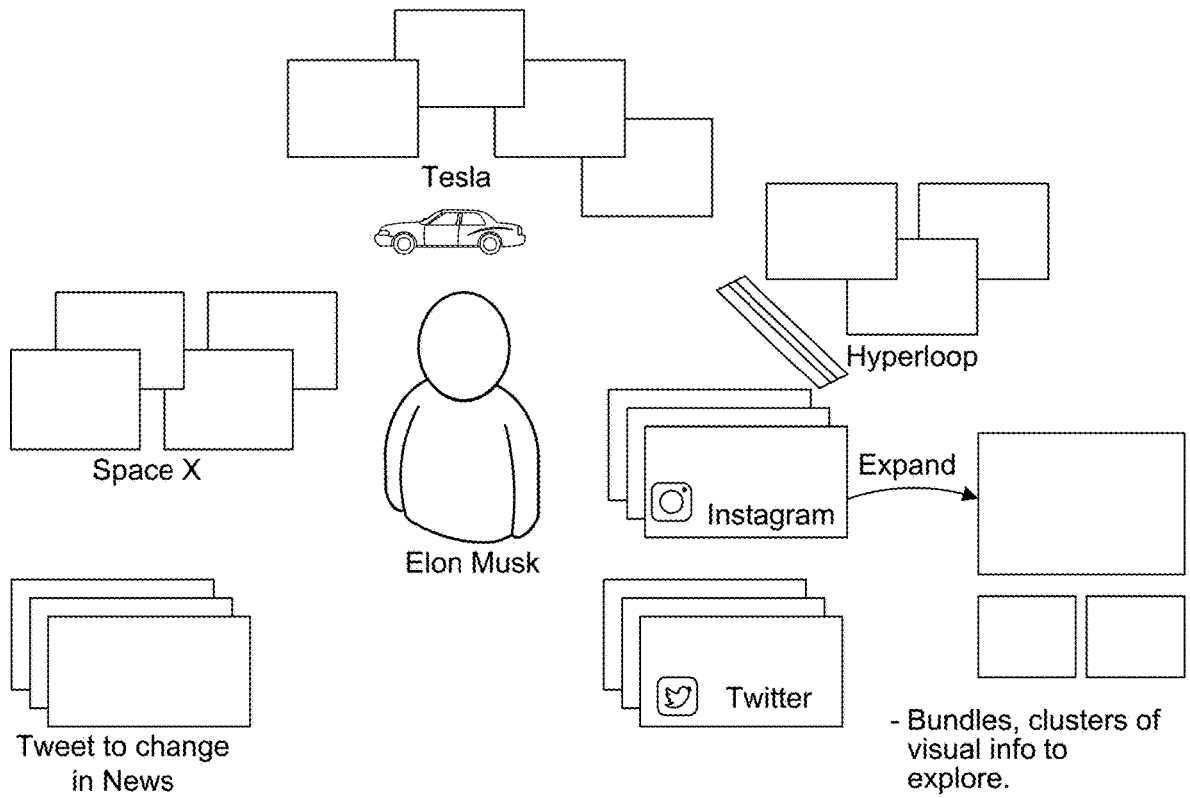

FIGS. 38A and 38B illustrate a search functionality in an AR environment, in an example a search bundle may be selected and tossed to a new area/mesh where the contents are expanded for viewing.

Figure 39:
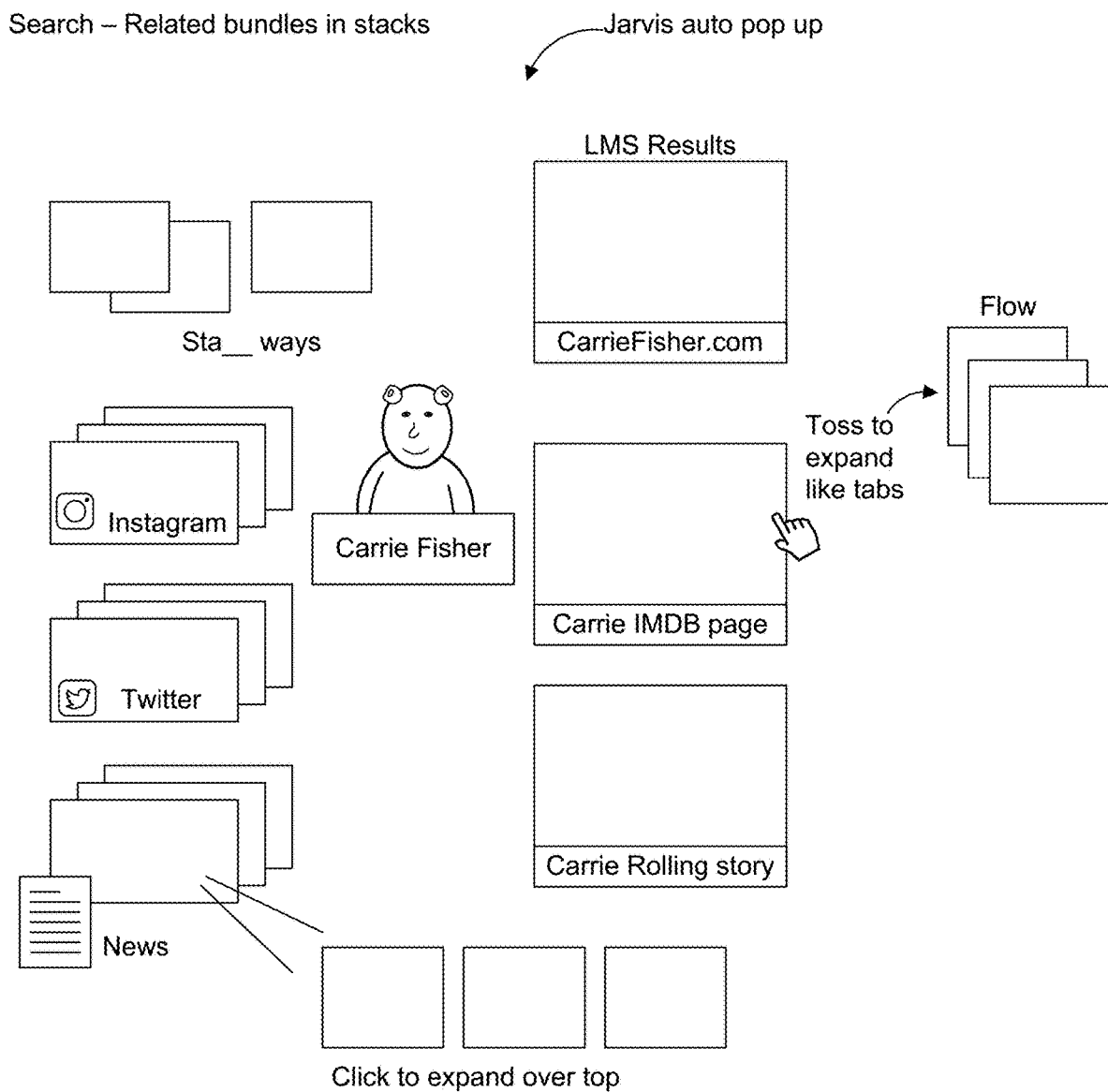

FIG. 39 illustrates an example functionality of a browser mode in which when a particular bundle of data is selected, the other data may be pushed into the background, which may include changing a tint, opaqueness, size, or other dimensions of the data.

Figure 40A:
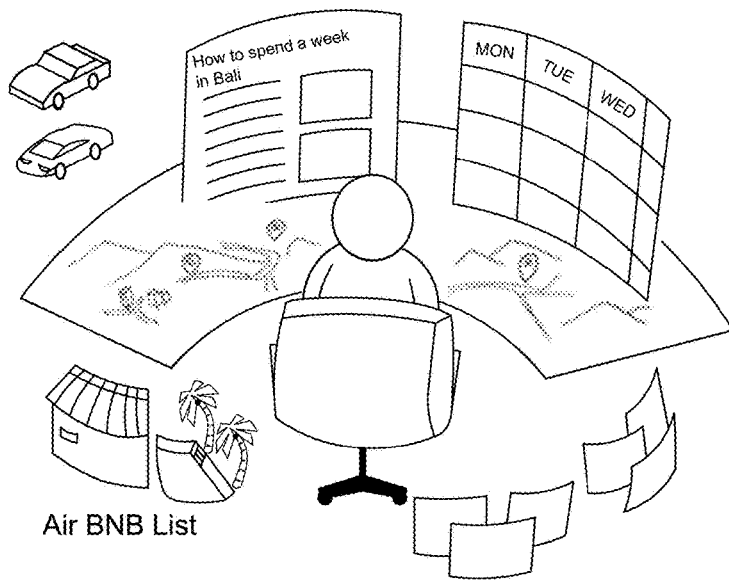
Figure 40B:
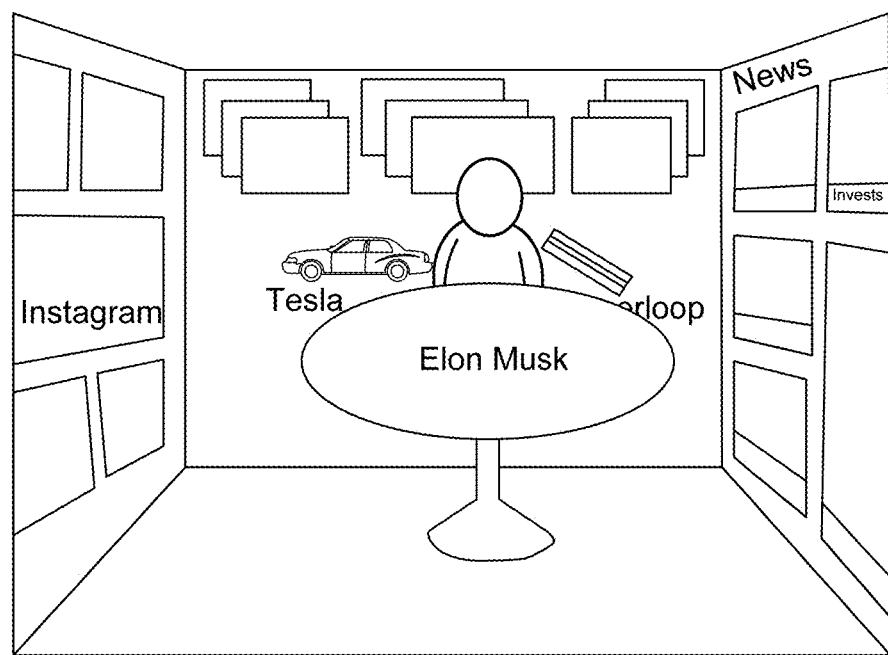

FIGS. 40A and 40B illustrate example usages of the AR/VR system described herein. In the embodiment, the user may have 360 degree workspace in which the user may view or access different data of different types, including webpages, spreadsheets, images, 3D models, apps, word processing documents, etc. In the example of FIG. 40B, the user may be viewing or interacting with particular images or 3D models that are anchored to or sitting on a mesh mirroring a table top while other display elements may be anchored or stuck to wall meshes.

Figure 41:
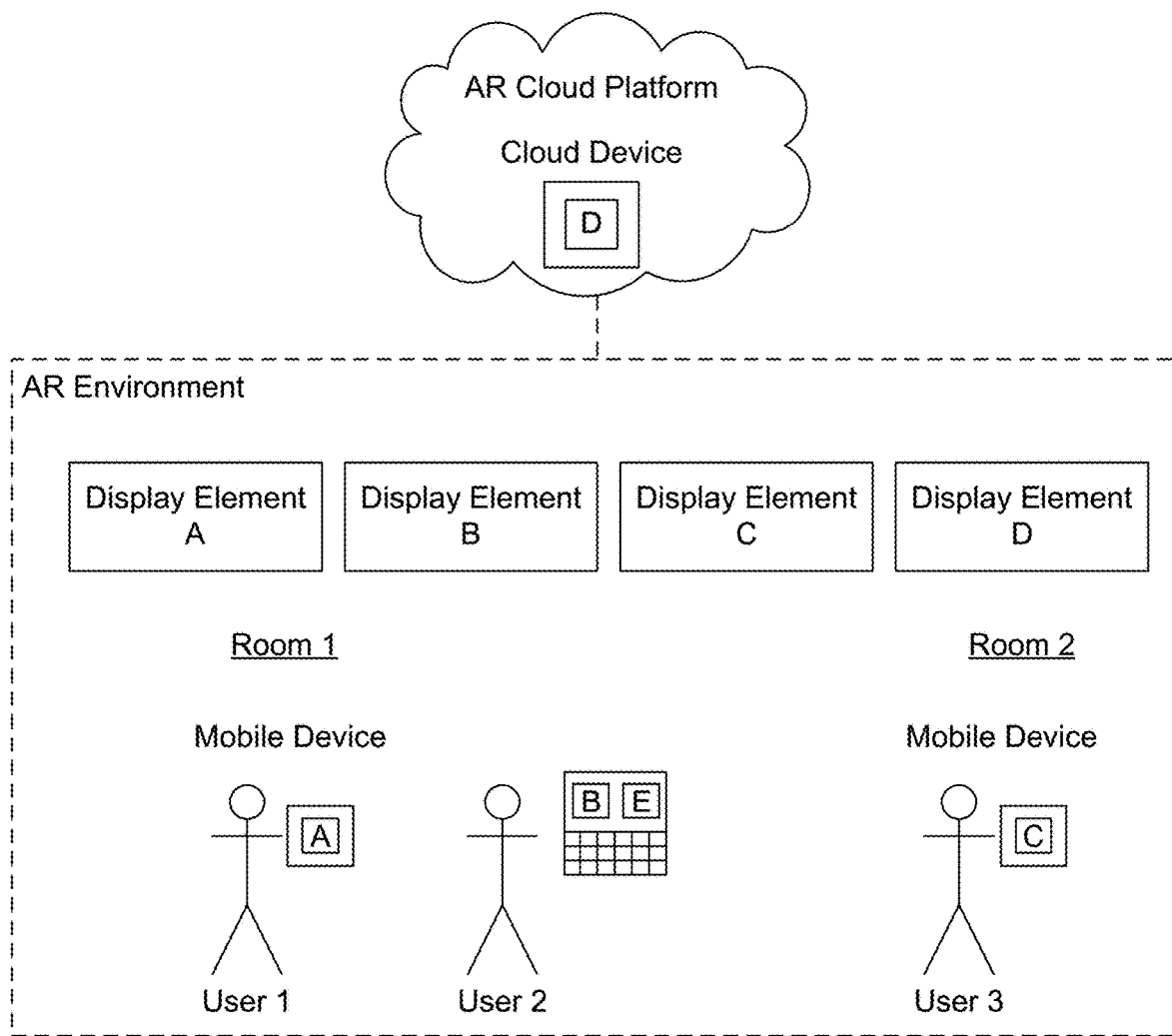

FIG. 41 illustrates an example embodiment of the AR/VR system described herein. In the example system, user 1 and user 2 may be geographically located within the same physical space or room (room 1) and user 3 may be located in a different geographical area or room (room 2). In the example embodiment, all 3 users may be wearing AR enabled headsets or glasses, and thus have access to the AR environment.

Available to all three users are 4 display elements or objects (A, B, C, and D). In an embodiment, the display elements may be images of data or files that are accessible and sharable by all the users as described herein. For example, all 3 users may have equal access to see and manipulate all of the display elements. In other embodiments, certain users may have restricted permissions with regards to their ability to manipulate or see certain display elements.

In an embodiment, the display elements may correspond to an app, image, file, webpage, or other data that is stored or is operating on an underlying device. For example, display element A may be a webpage that is retrieved or operating on user 1's mobile device. In an embodiment, the mobile devices (of user 1 and user 3) may be AR-enabled (they may include an app or plugin) such that they are able to communicate with AR cloud platform.

In an embodiment, user 1 may select data A (app, application, image, streaming multimedia, file, etc.) and indicate an intent to include this data in AR environment. In an embodiment, a swipe up gesture made by the user's fingers may be detected by the user's AR headset or glasses. This gesture may be interpreted by the headset or the AR cloud platform as an intent to include an image of data A in the AR environment. The AR cloud platform may communicate with user 1's mobile device, get or generate an image of data A and communicate this image of data A to the headsets or AR glasses of the users 1, 2, and 3 who are participating in the AR environment. As such, each of the users may now see and manipulate data element A which may be retrieved from user 1's mobile device.

Similarly, each of the users may see and manipulate display elements B and C which may be operating or stored on the devices of user 2 and user 3, respectively. User 2's laptop computer may have another data element or window E which may be opened, but which is not shared within the AR environment.

In an embodiment, interactions or changes to display elements A, B, or C may be made within AR environment and may be communicated back to the originating devices. For example, if display element A includes a web browser window, and user 2 performs a back command within the AR environment to go to a previous web page that was viewed within the window. This command may be received by the AR cloud platform and may be communicated back to user 1's mobile device to retrieve the previous web page (if this information was not previously buffered by the AR cloud platform, which it may be in some embodiments). In an embodiment, this back command may issue a back command on user 1's mobile device, such that the mobile device displays the previous window instead of webpage A.

In an embodiment, display element D may be an image of data that is received from a cloud device in the AR cloud platform. In an embodiment, data D may have been initially retrieved from a user device (may be an image, video, file, etc.) and may be stored on disk, memory, or temporarily buffered by cloud device for user and access by users of AR environment. In another embodiment, data D may be a webpage or other file that a user within AR environment requested to access and that was accessible by a cloud device without the need to communicate or request the data from any of the user devices. Serving data directly from one or more cloud devices, when possible, may shorten the latency and improve the throughput between users interacting with the display elements and the changes to the display elements as a result of the interactions.

Figure 42:
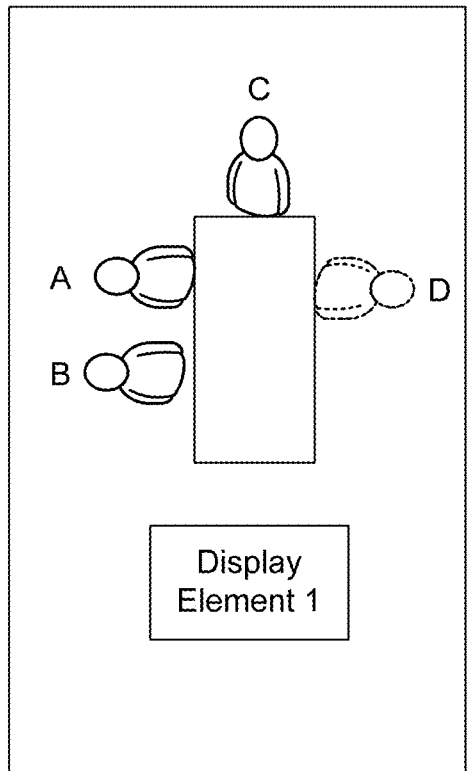
Figure 42:
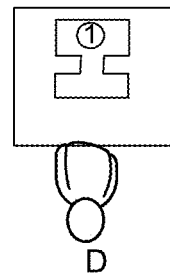

FIG. 42 illustrates an example embodiment of the AR/VR system described herein. In the example shown, users A, B, and C may be co-located within the same conference room, and may be wearing AR-enabled glasses. User D may be located in their office and may be attending the meeting over their AR-enabled computer from their desk.

In an embodiment, using GPS and/or WIFI, the AR system may know the position or location of each user within the conference room. In an embodiment, the AR system may identify an open space or seat at the conference table and render an avatar, image or other representation of user D. Then, for example, when users A, B, or C look (using the AR enabled glasses) to the rendered position of user D, they would see an avatar, graphic, or other representation of user D as if user D was in the same room In an embodiment, the AR environment may include display element 1, which may be retrieved from any computing device as described herein. User D who is attending remotely, may be able to see display element D on his computer. And using conventional input techniques (touch screen, mouse, keyboard) may be able to manipulate, move, or otherwise access display element D as if user D was spatially located in the conference room. These changes may be transmitted to and seen by users A, B, and C. Similarly, any change to the positioning or otherwise of display element 1 within the AR environment of the conference room may be seen by user D on his computer.

In an embodiment, if a remote user is joining an AR workspace from a room composed of non-planar surfaces (e.g., circular), the AR meshes and display elements may appear curved to mape the surfaces. Or the user may reconfigure the meshes in a planar (vertical or horizontal) format. In another embodiment, display elements and meshes from a 'primary' AR room may be scaled down to be displayed in a smaller room from which a remote user may be attending the AR meeting. In an embodiment, the primary room may be designed by an administrator, or may be a workspace with the most number of users or attendees.

Figure 43:
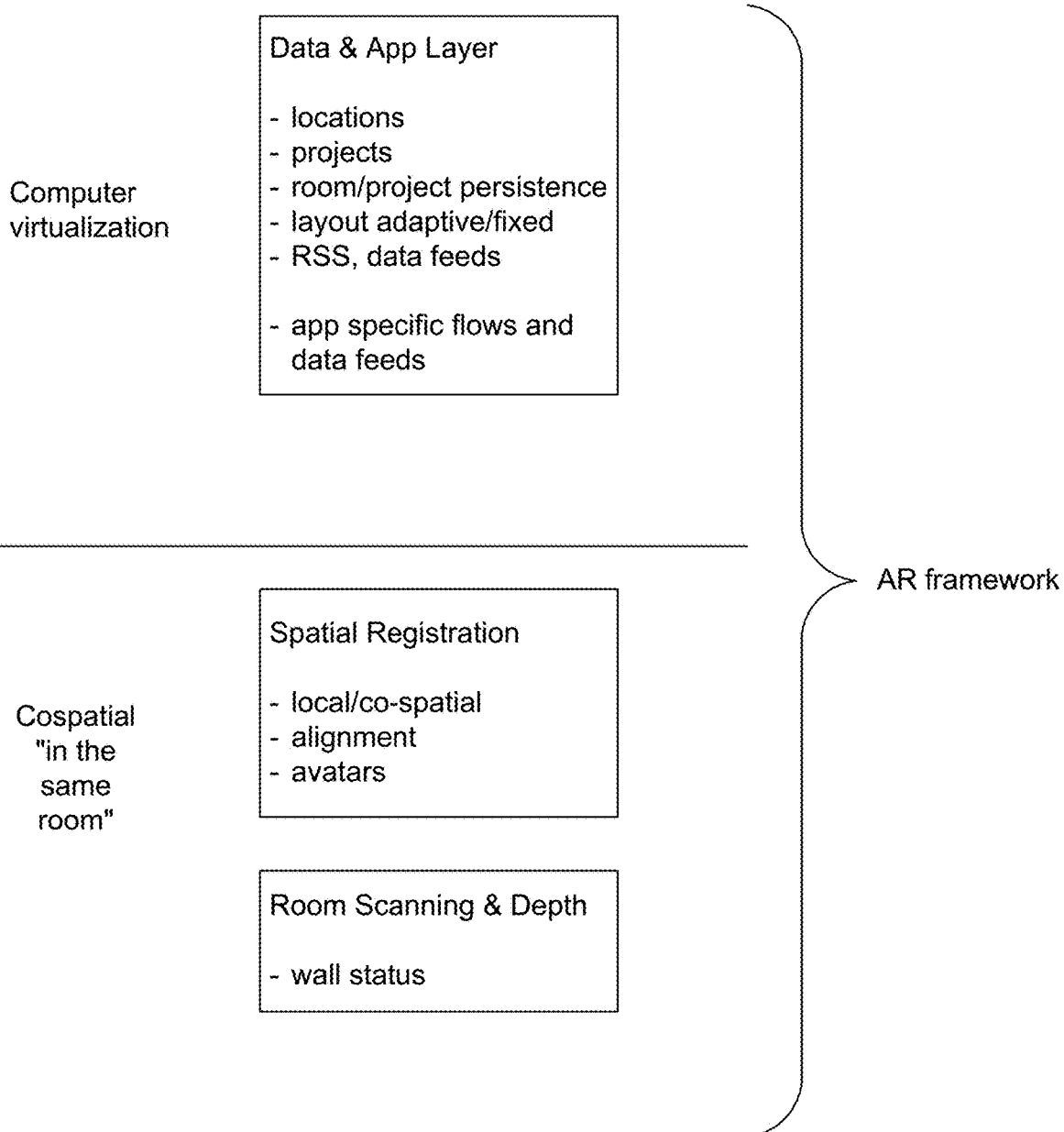

FIG. 43 illustrates an example AR framework according to an embodiment, for implementing the functionality described herein. One part of the framework may handle the logistics related to aligning users and their interactions when they are co-located within the space room or physical space. This functionality may include performing room scans including depth scans understanding the relative placement and images of physical objects to one another (chairs, tables, floor, ceiling, furniture, etc.). This functionality may also include spatial registration where the location of each user/attendee of an AR meeting is tracked through the room and relative to one another. This may help prevent, for example, an avatar of a virtual attendee intersecting with another avatar or with a user who is physically present in the room.

The AR framework may also include a computer virtualization layer that may perform functionality such as identifying the location of the various users. In an embodiment, if a user is attending an AR meeting from a remote location and the AR system includes a scan of both rooms, the AR system may provide the remote attendee a composite room which may account for the actual physical dimensions of his current room combined with the relative placement of avatars, people, and display objects within the room of the AR meeting he is attending.

The computer virtualization functionality may also include saving projects or workspaces, saving various locations or room scans, saving relationships between project layouts and rooms, and managing default and app specific RSS, data flows, and data feeds for use within the AR environment. In an embodiment, a particular app such as Twitter® or Netflix® may a 2D version of their data feed for 2D devices, and an AR-specific data feed for AR environments or interfaces.

In an embodiment, an AR-enabled device, may include a 'share to AR' permission set or folder such that apps, data, or other objects may be designated as sharable or not. Then, for example, upon an activation of the device or logging into an AR session, the AR system may have access to the designated files, windows, or other data elements.

In an embodiment, when a new user joins a session that is already in progress, one or more of the existing users may be notified of the new user. In an embodiment, a user in a room may use an explode view or gesture that causes a designated image or display element to consume an entire wall or table-top or floor mesh. Then, for example, any other display elements from the mesh may be hidden by the exploded display element.

The AR system described herein supports both synchronous and asynchronous collaboration of documents between geographically distributed users, who may talk to each other and share and manipulate data and display elements in such a way that the changes are visible and/or accessible to other users, regardless of on which device the data may be hosted.

The AR system may account for variations when a user's physical space does not match or coordinate with a VR or previously saved AR meeting room. For example, a user may be sitting in an airplane seat and joining a VR/AR meeting in a conference room. Within the confine of the airplane passenger's available physical/visible space, the airlines passenger may be able to join the meeting in AR mode where the size of the documents may be adjusted to fit into the space, or otherwise the passenger may join in a VR mode.

In another embodiment, if two users are joining a meeting from different physical workspaces or rooms, the AR system may average or develop a composite of both rooms in which the users can meet and arrange documents. Thus giving both users the optimal experience with adaptive room layouts.

If the documents cannot fit in the space of the passenger or other user, then there be a visual icon or indicator that allows the user to scroll up/down/left/right/back/forth between views using whatever space may be available. This scroll function may be made available such that it does not change the size of the documents or mesh being scrolls.

In an embodiment, certain users within a particular workspace may be designated as being able/unable to change the size or manipulate particular display elements. For example, a room or document administrator may designate certain users as read-only users.

In an embodiment, when a room or document is activated by a user, the active data may be stored on a cloud computing device (in memory) such that the users of a room will have faster access to the data versus performing repeated disk accesses. In an embodiment, data may be collected or stored on database, such as Mongo DB and the AR system may take advantage of the features of NoSQL, which may enable easy horizontal scaling. The database may include collections of user information, avatars, profiles, rooms, permissions, data, etc. In other embodiments, or types of database and structured query languages (SQLs) may be used.

In an embodiment, the AR system described herein may include a manager device or component that operates across a plurality of devices that manages the application state, including pre-launch functionality (scanning the ceiling/walls/floor of rooms) and sign-in. The manager may also allow users to create accounts, customize avatars, save room states and data to the disk/cloud, load data and room states from the disk/cloud, and configure other options.

The manager may also maintain a persistence of canvases or meshes, allowing users to load saved preferences. In an embodiment, the manger may allow non-AR clients to join meetings, such as over the telephone (receiving/providing audio-only).

In an embodiment, the AR system described herein may include an Internet or WWW loader device or component that operates across a plurality of devices that safely downloads images, audio, data streams/feeds, HTML and other data from the Internet or other networks. The loader may check prerequisites including the file size before, during, after download, and the image resolution. The loader may provide third party parsing and processing for the content prior to display in the AR environment. The loader may cache data and/or designate some data as non-cacheable.

In an embodiment, users may be able to pull or share files from different storage accounts, including different cloud platforms into the AR environment. For example, a user may have access to their private data or streams from Dropbox®, Google drive, photos, slack, email attachments, AR Home-esque, etc.

In an embodiment, the AR system may provide an immersive map view. For example, if a user is planning a trip to Paris, the AR system may provide an image of a map of Paris to indicate a current location of the user within the context of Paris. Then, for example, the AR system may display images related to the place indicated on the map. As the user moves around the Paris map, the other immersive images may be coordinated and change based on the user's designated location.

As a user moves around a room (in or outside of map view), the AR system may track the user's movements and re-project images and adapt to the different spatial, semantic, and social configurations. In an embodiment, the AR system may use the walls as portals to new rooms or workspaces. For example, a user may go from a Paris planning workspace and by walking through a particular wall of the room, may enter a Hawaii vacation workspace.

In an embodiment, the AR system described herein may be used to locate or identify other users of the AR system to find where in the physical, virtual, and/or augmented world they are located. For example, the AR system may provide a 'find my friends' command which may show the user in which virtual/augmented their friends are located and on what projects/data they are working, to the extent this information has been designated as sharable and the user has permissions to view/access this data.

In an embodiment, the AR enabled glasses or headset described herein may include the ability to display pixels in an AR/VR space. As part of an initial set-up, the glasses may be used to detect surfaces within a room as part of a room scan. The AR system may perform processing to determine on which surfaces the grid appears. This information may be stored across one or more cloud devices, thus enabling multiple users to have a shared view of a room/workspace. From this data, spatial anchor and meshes within the room may be defined and redefined by users.

The AR system described herein may virtual space, data, and people, and the relationships between them, across platforms, across devices, across physical locations, and across networks.

Figure 45:
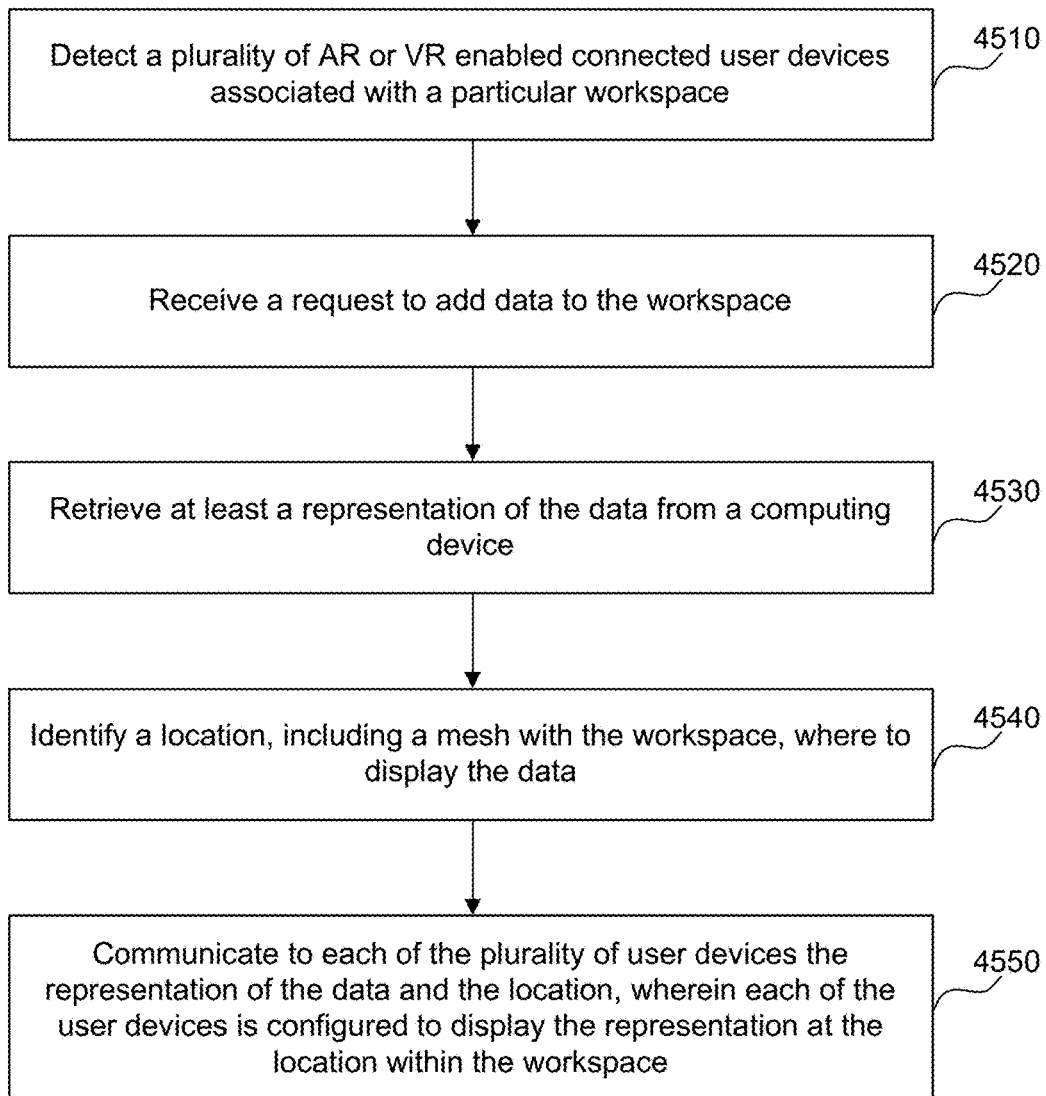

FIG. 45 is a flowchart of method 4500 illustrating example operations of a database recovery system with batch processing, according to some embodiments. Method 4500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 45, as will be understood by a person of ordinary skill in the art. Method 4500 is not limited to the example embodiments described herein.

In 4510, a plurality of AR or VR enabled connected user devices associated with a particular workspace are detected. For example, in FIG. 2B, AR/VR cloud system 206 may detect a plurality of VR/AR glasses 204 or other devices communicatively coupled to system 206. As shown in FIG. 41, users 1 and 2 may be co-located within the same room and using participating in the workspace through an AR session. User 3 may be remotely located and may be participating in or viewing the workspace through either an AR or VR session.

In 4520, a request to add data to the workspace is received. For example, any of users 1, 2, or 3 in FIG. 41 may request to add data A, B, or C to the shared workspace or AR/VR environment. This request may take the form of a swipe or other gesture that is detected by AR/VR glasses (e.g., 204 of FIG. 2B) or another device and may be communicated to AR cloud platform (e.g., 206 of FIG. 2B). The AR system may receive the intent and retrieve In 4530, at least a representation of the data may be retrieved from the computing device. For example, in FIG. 2B, after receive a request to move data 214 into a virtual or augmented workspace, AR/VR cloud system 206 may request or retrieve the data or a representation of the data 214 from computing device 216. For example, system 206 may retrieve a copy of an image or other data file from computing device 216 and host the file on one or more cloud devices 216.

Or, for example, data 214 may be a webpage from a browser of computing device 216. One or more cloud devices 218 may then load the webpage into their local memory or buffer, and make the web page accessible to the users 202 of a particular workspace.

Or, for example, data 214 may be a webpage or file that is hosted and local to computing device 216. Rather than moving the hosting of data 214 to one or more cloud devices 218, in an embodiment, system 206 may retrieve one or more snapshots or images of data 214 for presentation as element 212 within the AR environment. For example, if data 214 includes a spreadsheet file. System 206 may receive or retrieve images of the spreadsheet file from computing device 216.

Cloud devices 218 may arrange the image(s) such that the spreadsheet is accessible as element 212. Then, for example, during a scroll command, the system 206 can process, arrange, or load other retrieved images without performing another request to computing device 216. However if non-retrieved information, or a new spreadsheet file is to be viewed, then a subsequent request to computing device 216 may be performed.

In 4540, a location, including a mesh within a workspace, where to display the data is be identified. For example, in FIG. 2B, user 202 may have indicated a particular location or mesh within a physical or virtual workspace where the requested data 214 is to be displayed. This location may be received or identified by glasses 204, and communicated to AR/VR cloud system 206).

In 4550, the representation of the data and the location is communicated to each of the plurality of user devices, wherein each of the user devices is configured to display the representation at the location within the workspace. For example, in FIG. 41, the AR cloud platform may communicate the location of each of the display elements A-D to each of the AR or VR enabled devices from which users 1, 2, and 3 are accessing the workspace. As shown in FIG. 2, the elements 212 may include particular locations on one or more meshes 208 that are arranged across a physical or virtual meeting space.

Figure 46:
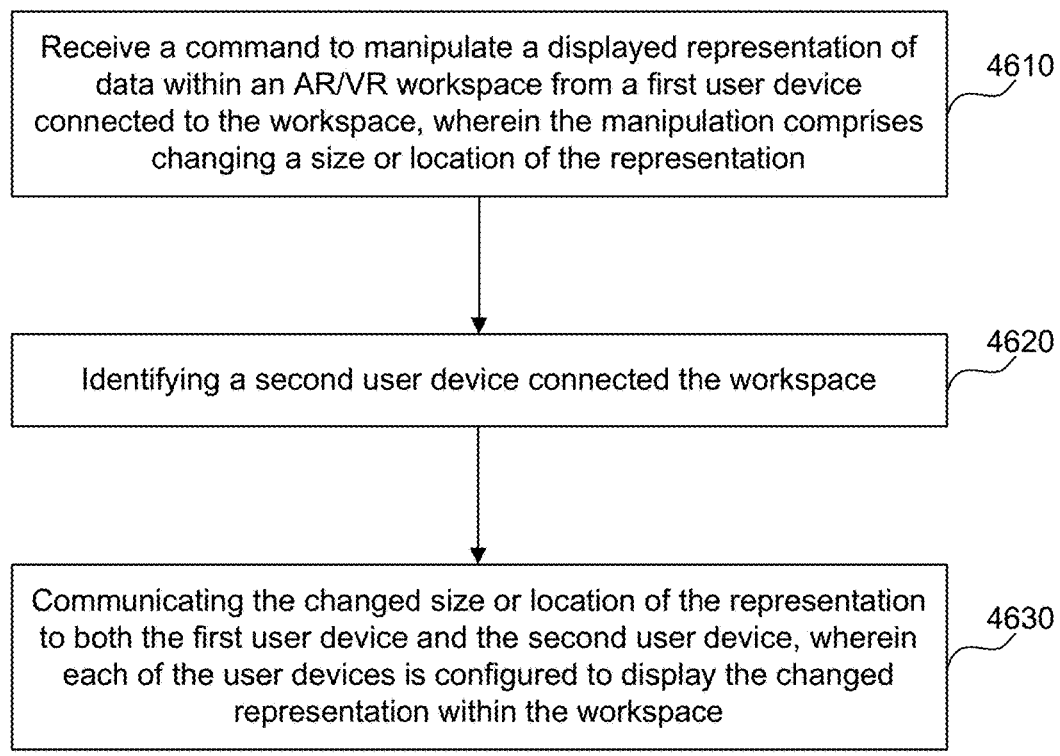

FIG. 46 is a flowchart of method 4600 illustrating example operations of a database recovery system with batch processing, according to some embodiments. Method 4600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 46, as will be understood by a person of ordinary skill in the art. Method 4600 is not limited to the example embodiments described herein.

In 4610, a command to manipulate a displayed representation of data within an AR/VR workspace from a first user device connected to the workspace is received, wherein the manipulation comprises changing a size or location of the representation. For example, in FIG. 41, user 2 may perform a motion or gesture to change the size or location of display element C. This gesture may be detected by glasses (e.g., 204 of FIG. 2B) being worn by user 2, and communicated to the AR cloud platform.

In 4620, a second user device connected to the workspace is identified. For example, in FIG. 41, the AR cloud platform may identify that user 1 is accessing a shared AR workspace with user 2 and that user 3 is accessing a shared VR workspace with user 2, all of whom have access to or are seeing display element C.

In 4630, the changed size or location of the representation is communicated to both the first user device and the second user device, wherein each of the user devices is configured to display the changed representation within the workspace. For example, in FIG. 41, the AR cloud platform may communicate the new location or size of display element C to the devices being used by users 1, 2, and 3 by which to access the shared workspace. The AR or VR enabled devices may then process this process information and project display element C with its new size and/or in its new position within the respective AR or VR environment being hosted or projected by the device.

Figure 47:
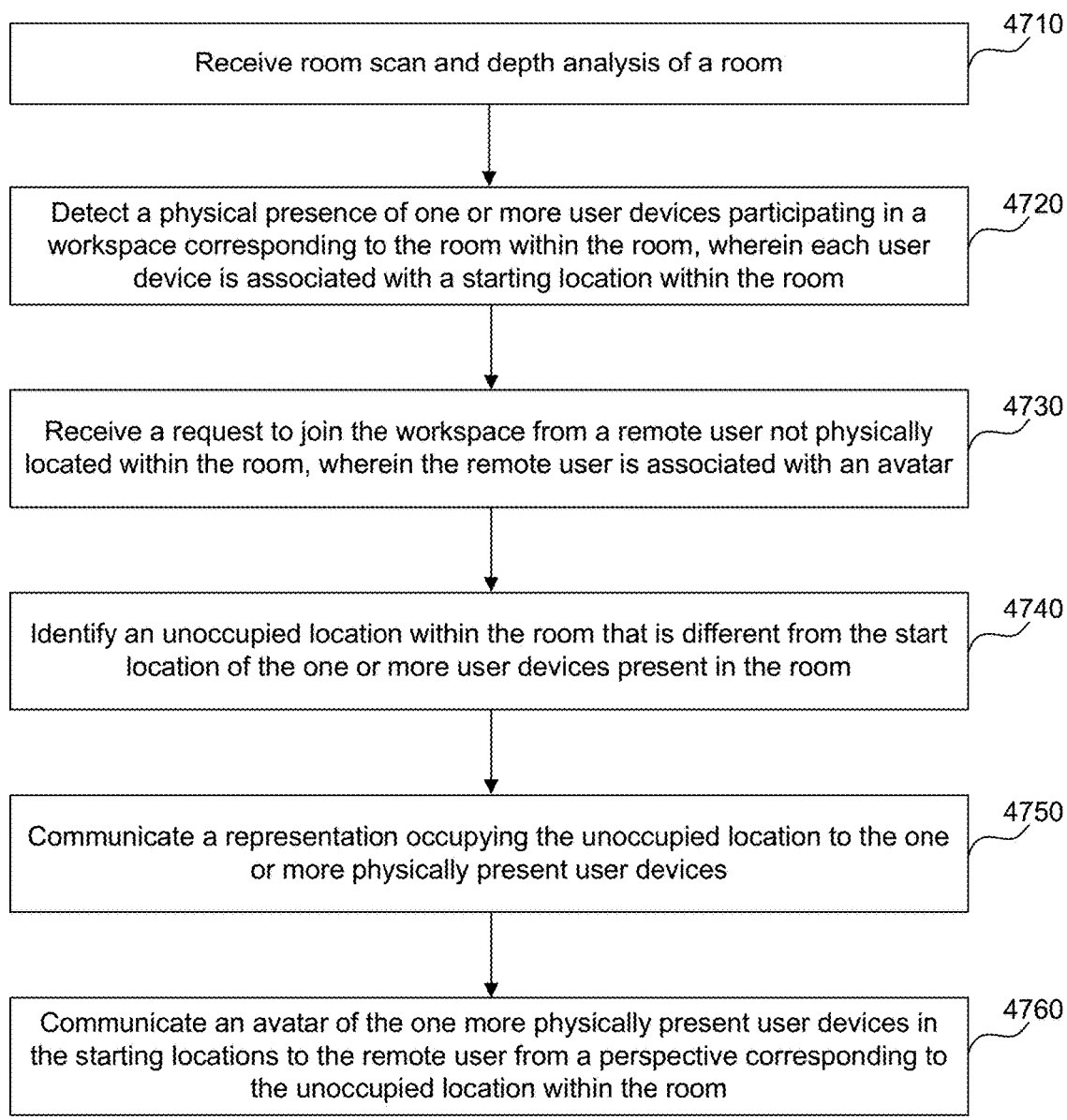

FIG. 47 is a flowchart of method 4700 illustrating example operations of a database recovery system with batch processing, according to some embodiments. Method 4700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 47, as will be understood by a person of ordinary skill in the art. Method 4700 is not limited to the example embodiments described herein.

In 4710, a room scan and depth analysis of a room is received. For example, in FIG. 2, the AR/VR cloud system 206 may receive a room scan and depth analysis of a room where one or more users are physically located. In an embodiment, this scan may be performed by specialized cameras, or may be performed with glasses 204.

In 4720, a physical presence of one or more user devices participating in a workspace corresponding to the room is detected within the room, wherein each user device is associated with a starting location within the room. For example, in FIG. 41, each user may have an AR enabled device through which they are participating in the shared workspace. Using GPS or network-based triangulation or other location determination, the AR cloud platform may identify the location of each of the users 1, 2 who are physically present in the room.

In 4730, a request to join the workspace from a remote user not physically located within the room is received, wherein the remote user is associated with an avatar. For example, in FIG. 41, the AR cloud platform may receive a request from user 3 to join the workspace with users 1 and 2.

In 4740, an unoccupied location within the room that is different from the start location of the one or more user devices present in the room is identified. For example, in FIG. 41, the AR cloud platform may combine the identified location of the users with the room scan and depth analysis information previously received to determine what empty or unoccupied spaces remain within the room. In another embodiment, users 1 or users 2 may identify and communicate (using AR-enabled devices) an unoccupied location within the room where they want an avatar of one or more remote users to appear.

In 4750, a representation occupying the unoccupied location is communicated to the one or more physically present user devices. For example, as shown in FIG. 17A, an avatar representing the remote user may appear in the (previously) unoccupied location. In an embodiment, the AR cloud platform (of FIG. 41) may track the location of each user. This user location tracking may enable the AR cloud platform to properly position new joining users, or prevent users from putting display elements in locations that may already be occupied by virtually or physically present users.

In 4760, an avatar of the one more physically present user devices in the starting locations is communicated to the remote user from a perspective corresponding to the unoccupied location within the room. For example, as shown in FIGS. 22 and 23, the remote user may see avatars or other representations of the users who are taking part in the meeting. FIG. 18 illustrates an example of how an avatar may include a life-like taken from a user's camera or mobile device.

Figure 48:
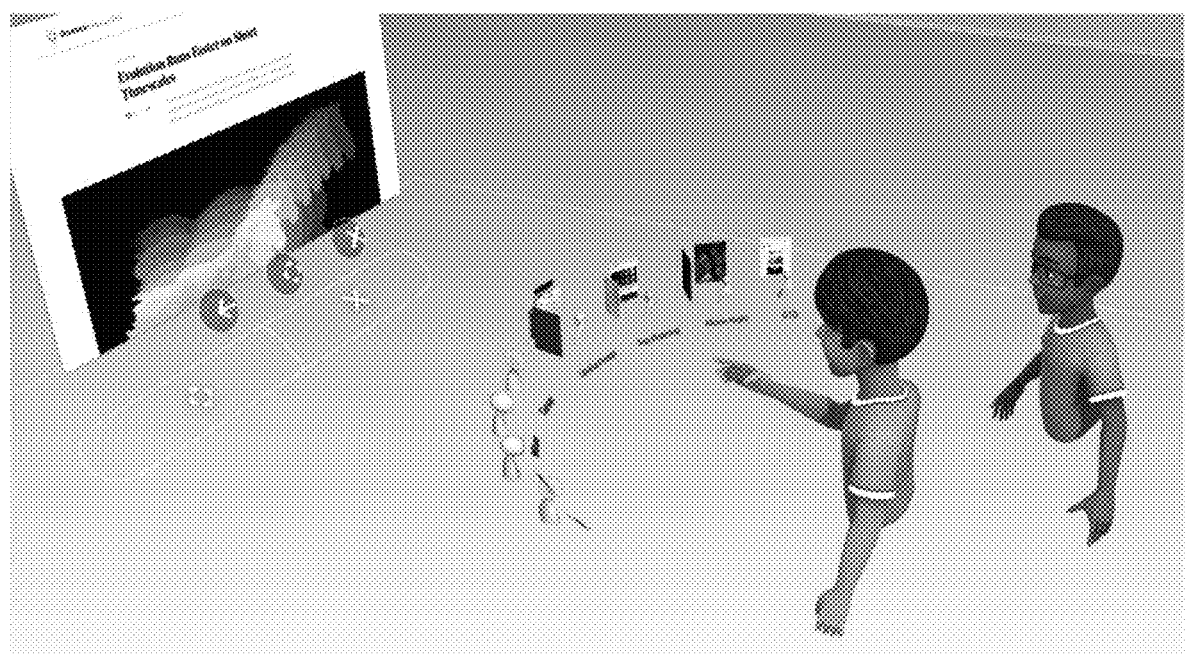

FIG. 48 illustrates an example embodiment of the AR/VR system described herein. In the example shown, two users may be viewing a VR desktop or interface. The VR desktop may include forward, back, and other commands used to manipulate or interact with an active document. The users may also select from and load previously saved workspaces (which may include their own documents, spatial arrangements, and room assignments) or communicate with or see the status of other users of the system.

Figure 49A:
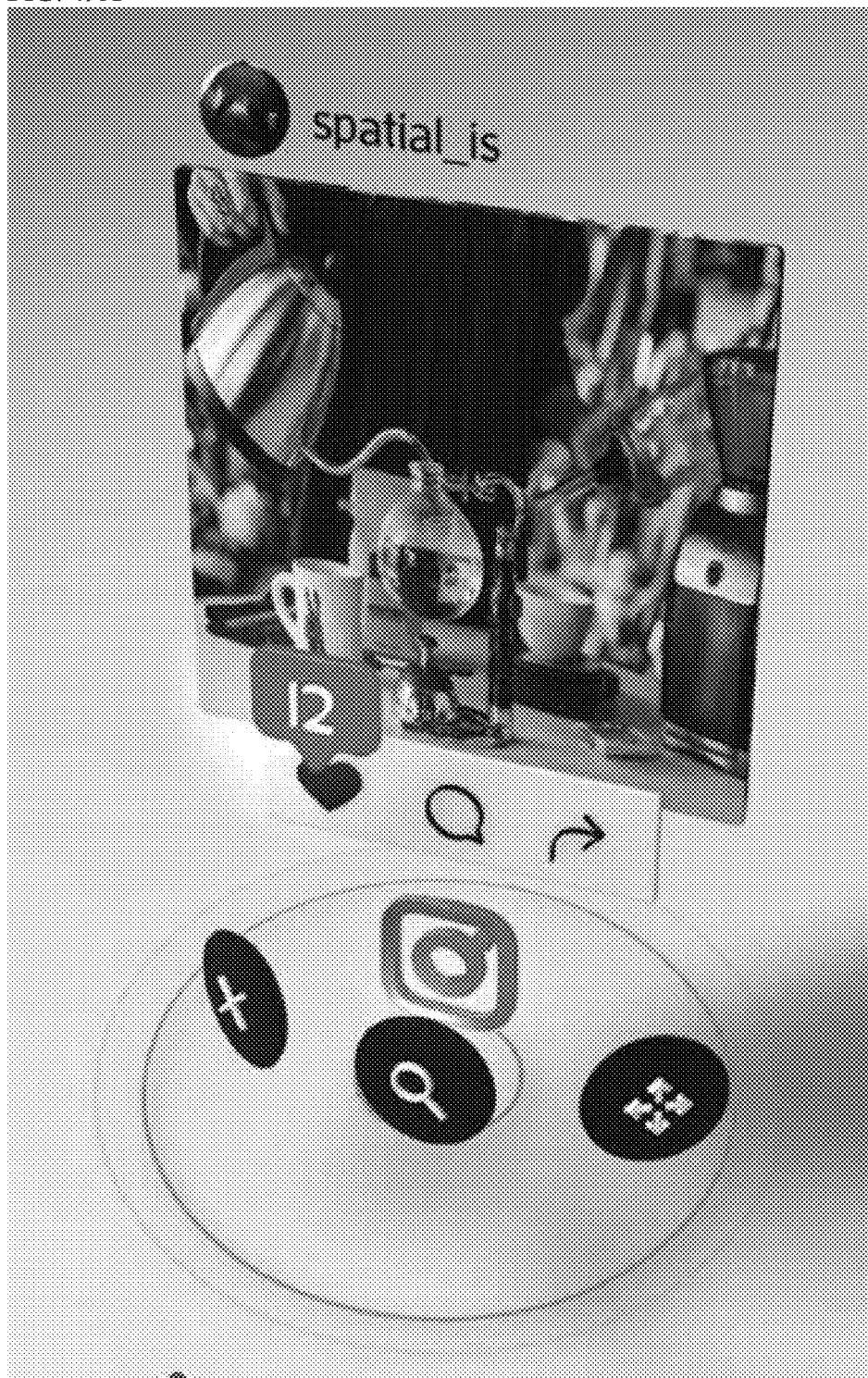
Figure 49B:

FIGS. 49A and 49B illustrate examples of interacting with apps in an AR/VR environment described herein. As shown in FIGS. 49A and 49B, particular applications may be selected and each application may include its own set of functional controls (e.g., forward, back, search, scroll, like, etc.). In an embodiment, an icon may be displayed near the content or document displayed from the app. As shown, the AR/VR system may generate an indicator light indicating that the app has been selected or is active.

Further, the AR/VR system may generate a shadow effect in the AR/VR system simulating ceiling or other lighting within the workspace. In an embodiment, a user may configure or select from where the lighting in the workspace is generated, and the AR/VR system will generate corresponding shadow effects in relation to the display elements, avatars, or other displayed room objects.

Figure 50A:
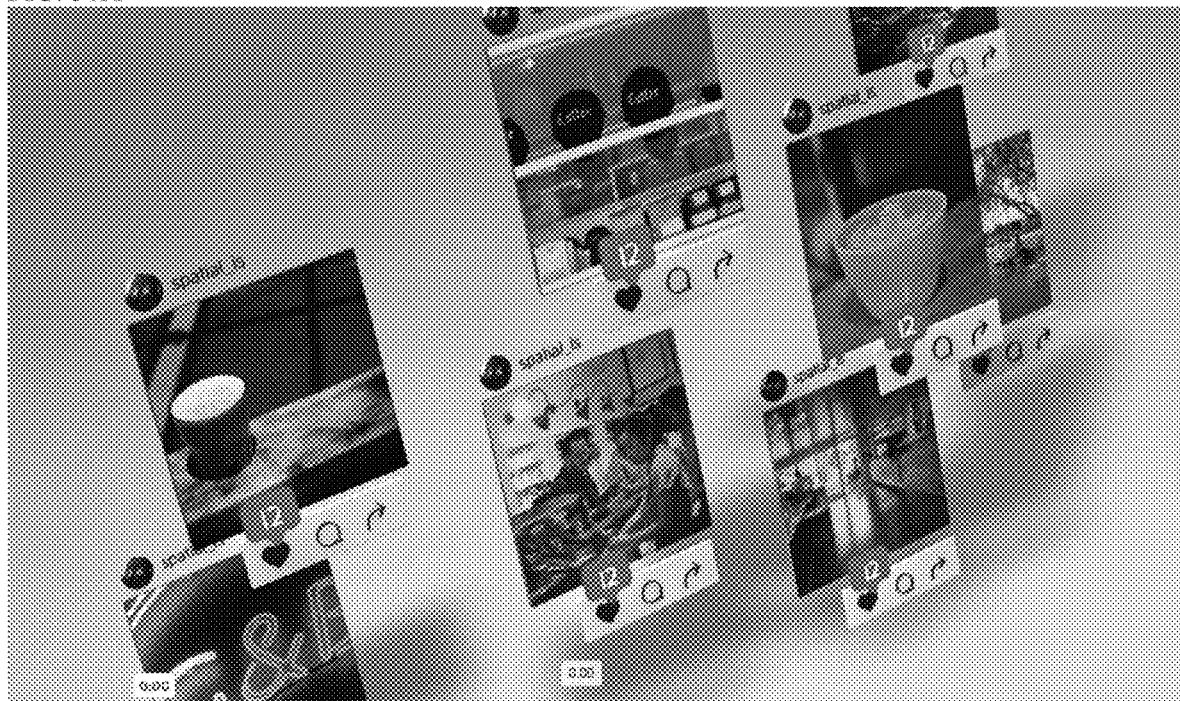
Figure 50B:
Figure 50C:

FIGS. 50A-50C illustrate an example embodiment of how a display element may float in an AR/VR environment. In the example shown, the Instagram® app may be open and may include a number of pictures (files) that are displayed. In an embodiment, the pictures (which may assembled across one or more meshes) may all rotate in synchronicity. For example, in FIG. 50A, the images may appear right facing. The images may all rotate to center facing in a period of time as shown in FIG. 50B, and then right facing as shown in FIG. 50C. In an embodiment, the image may then rotate back to the original position, or may continue rotating in a 360 degree fashion.

In an embodiment, the rotation may indicate that the app is active or that the app is a background app. The example shown illustrates an example of a weightlessness environment that may be generated or simulated by the AR system. In another embodiment, display elements or meshes may including either a small vertical or horizontal back-and-forth motion until acted upon by a user.

Figure 51:
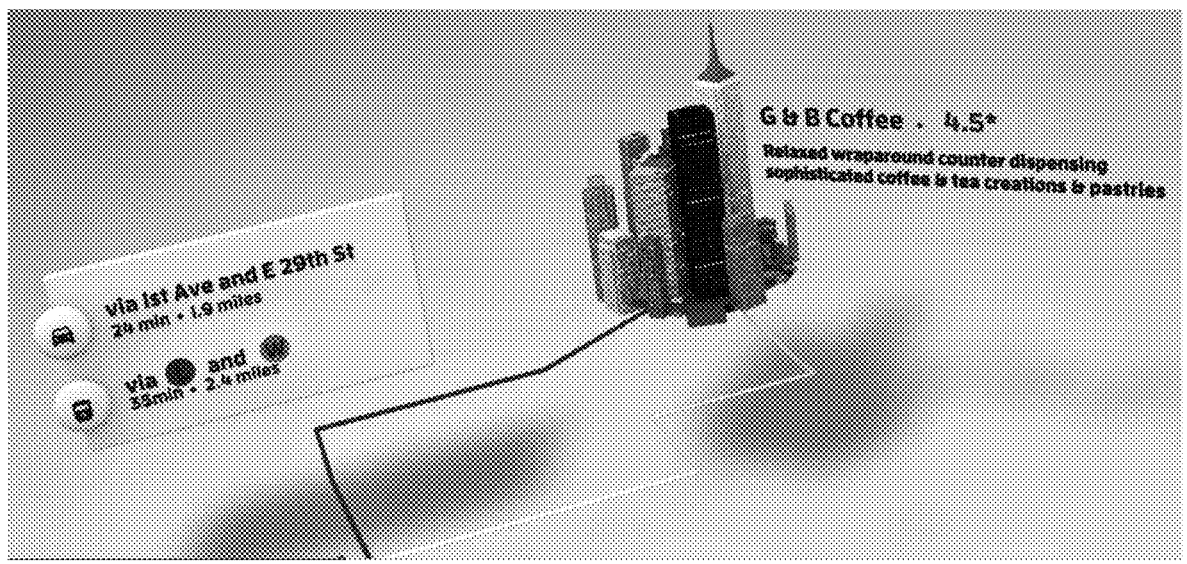

FIG. 51 illustrates an example map embodiment of the AR/VR system described herein. In the example shown, a user may interactively see directions from a current location to a desired location, including various modes of transportation available to the user to reach their destination. The map may also include an image or representation of the city or destination. In an embodiment, the user may traverse directions and the perspective of the city or the destination may change and the user may see images related to the particular illustrated direction. For example, if the directions said to make a right on Main Street, then the user may see a picture of the Main Street sign, or an image of a restaurant that is on the corner of Main Street where the user is supposed to make a right. In an embodiment, these images may include geospatial tags, enabling the AR system to synchronize or coordinate them with the map that is displayed.

Figure 52:
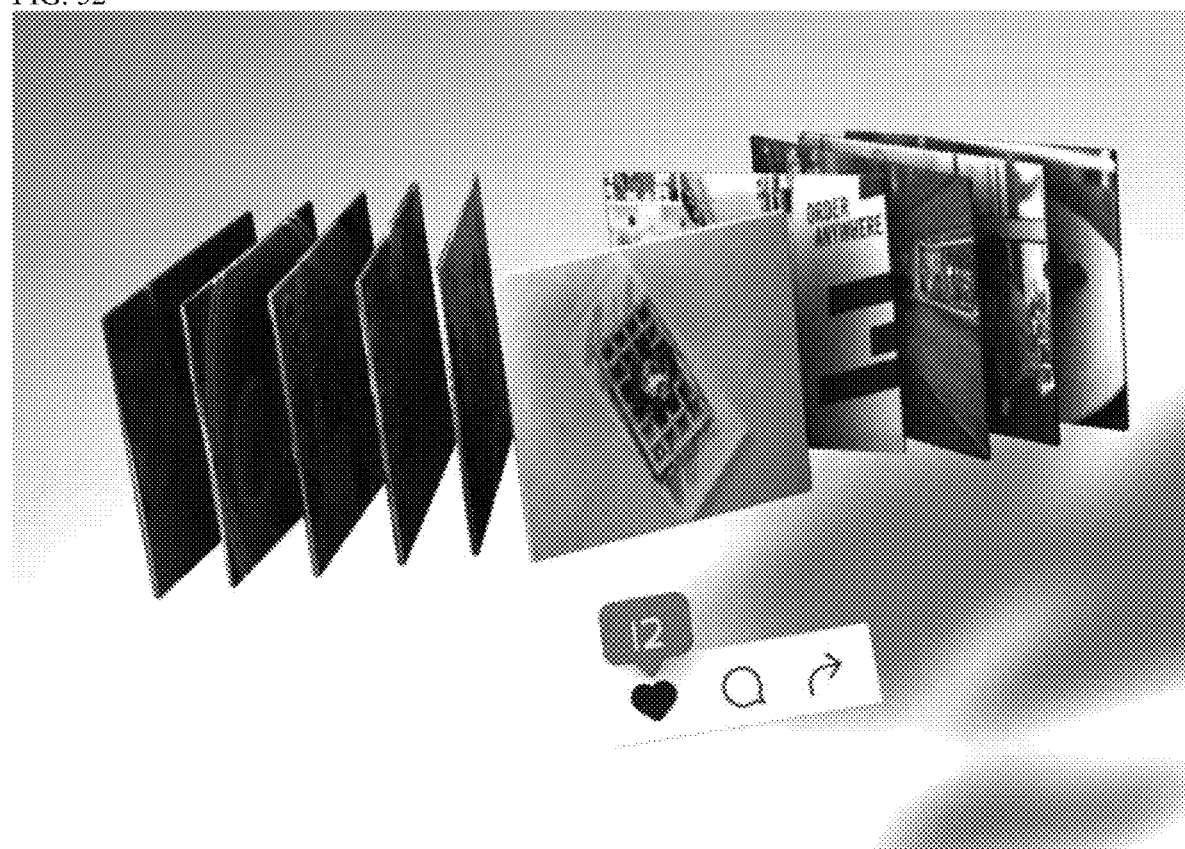

FIG. 52 illustrates an example embodiment of the AR/VR system described herein. In the example shown, a user may scroll through a stack of images or other documents, and a currently active or selected document may be displayed more fully to the user relative to the previously scrolled documents (which may appear to the left of the current image) and the remaining documents (which may appear to the right of the current image). As shown, the previously scrolled images may be less visible than the images which have not yet been scrolled.

Figure 53:

FIG. 53 illustrates an example embodiment of the AR/VR system described herein. The example shown illustrates how the AR/VR system may visually expand the computing surface a user is able to use to view or access images or other documents. For example, the slow magic document shown may be stored on the computing device. However the user may indicate that the wants to move the document to a position above the monitor beyond the confines of the 2D screen.

In an embodiment, a user who is wearing AR glasses, may indicate a position above the monitor where the user wants to access or position the slow magic document. The AR system may communicate with the local machine, and receive an image of the slow magic document and related application. The AR system may then seamlessly illustrate the document being moved from the screen into the 3D environment. In an embodiment, the AR system may initially overlay the original position of the document on the 2D monitor, and then respond to the user's command to move the document from a first location to a second location, providing the appearance of a smooth interaction between the 2D and 3D environments.

Figure 54A:
Figure 54B:
Figure 54C:
Figure 54D:
Figure 54E:

FIGS. 54A-C illustrate an example embodiment of the AR/VR system described herein. In the example shown, a user located in a first room may want to see another room or workspace. Using the AR system, the user may select the new room, and the AR system may visually generate a VR environment where the selected room overlays the physical environment or room where the user is located. FIGS. 54D-E illustrate a similar room view or workspace join effect in an AR environment, in which the selected room is overlayed on the user's physical environment.

Figure 55A:
Figure 55B:
Figure 55C:
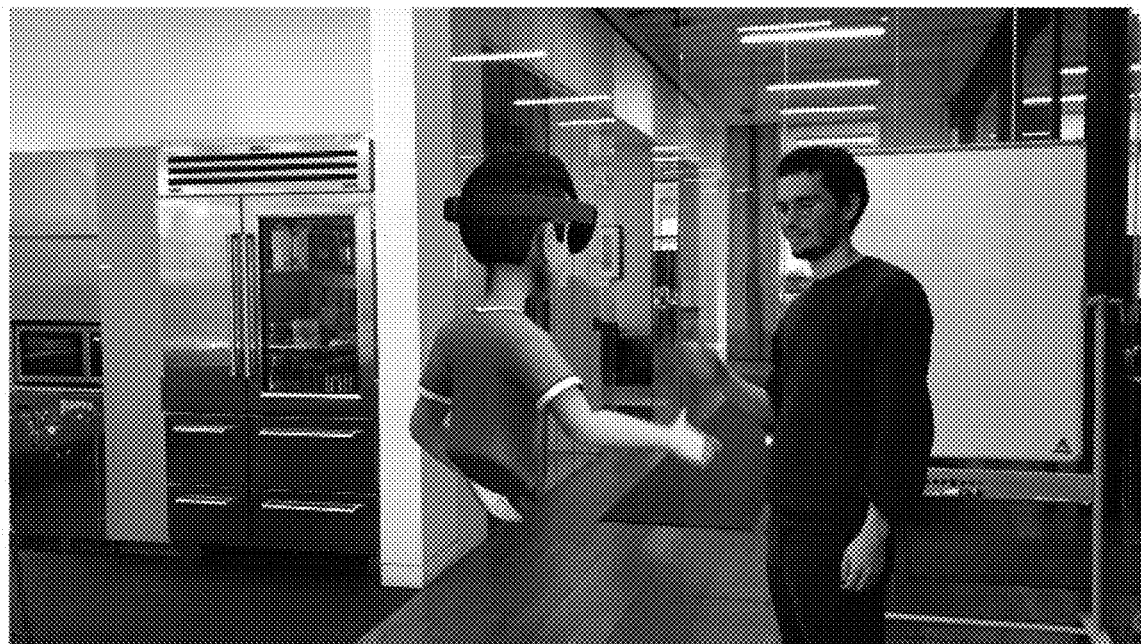

FIGS. 55A-C illustrate an example embodiment of the AR/VR system described herein. In the example shown, a first user located in a first room may want to interact with another user of the system who may be physically located in another room or working in another workspace. For example, a manager may want to meet with an employee face-to-face. The manager may physically select or pick up the user from the first room (if the manager has permissions to do so) and place the selected user in the physical environment of the manager.

Then through AR glasses or a headset, the manager may see an avatar or other representation of the user in the new physical workspace of the manager. Similarly, the employee who is represented by the avatar may see an augmented or virtual representations of the room and an avatar of the manager. As may be shown, the size of the avatar may be increased to represent the size of a real or average person as if they were physically present in the room.

Figure 56:

FIG. 56 illustrates an example embodiment of the AR/VR system described herein. In the example shown, two users may share a perspective or view of files that would otherwise only be available to a single user. For example, one user may be taking pictures of the other user on their phone. And rather than the files only showing up on the 2D screen of the phone, the AR system may be configured to retrieve or receive the images, and automatically move them to a designed wall or mesh within the environment. Then, for example, the user of whom the pictures are being taken may see the images without looking at the phone of the user taking the pictures.

Figure 57:
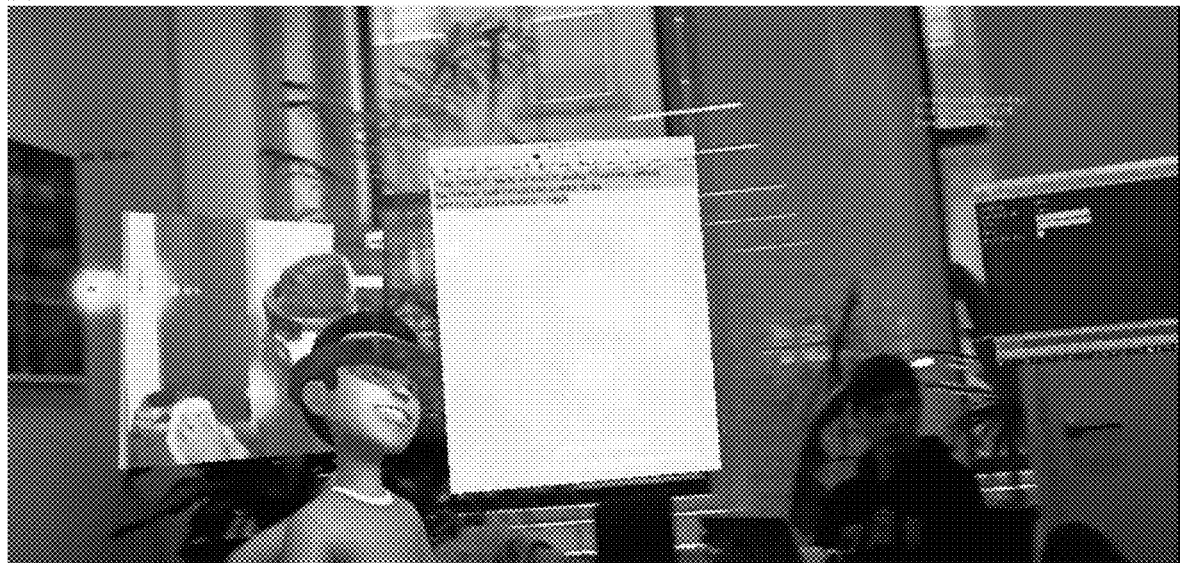

FIG. 57 illustrates an example embodiment of the AR/VR system described herein. In the example shown, multiple users may be attending a meeting in the AR workspace. In the example shown, the featured user may be attending remote from their home office and may be physically represented as an avatar. However, the users who are physically located in the primary meeting room may also see an image of the actual user in their remote location as shown. This image, video, or stream of the user may be received from a camera the remote user's location.

Figure 58:
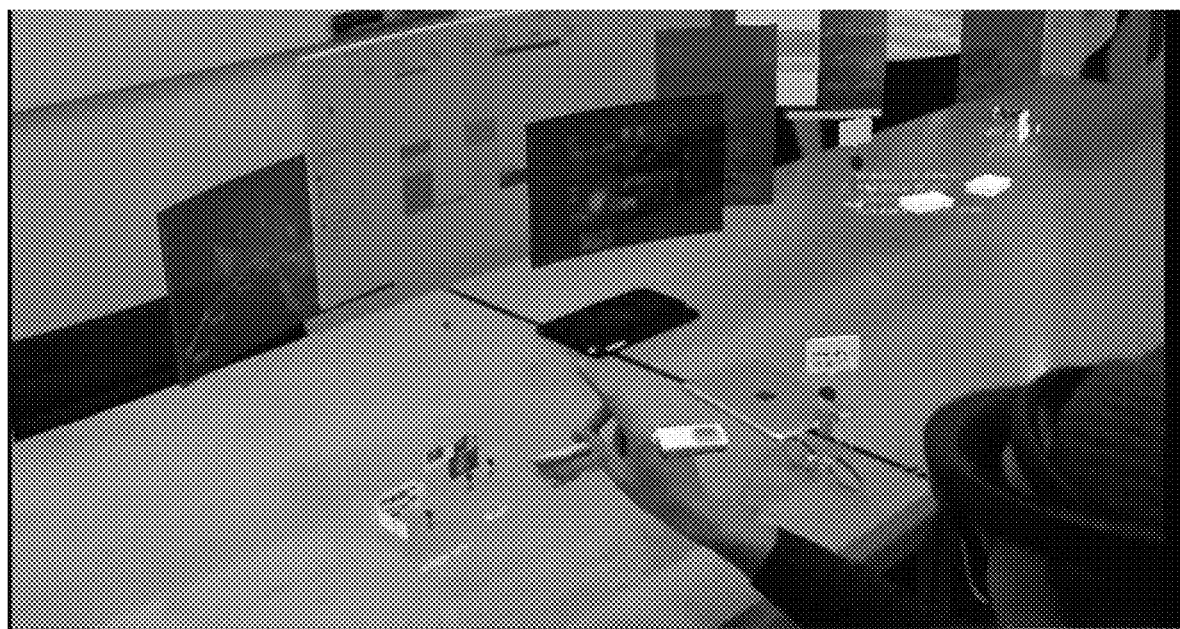

FIG. 58 illustrates an example embodiment of the AR/VR system described herein. In the example shown, a user may be working on an augmented desktop or workspace. As may be seen, without the use of a physical computer on the table, the user may (using the AR enabled headset) retrieve and interact with various documents, applications, and files which may be stored across one or more remotely located computing devices which may be communicating with the AR system.

In an embodiment, the AR system, as shown, may enable multiple users to share a single computer or other computing resources. For example, two different users may remotely access two different webpages from the same computer in two different augmented desktop environments without interfering with each other if their sessions are not linked with one another through the AR system. In an embodiment, the shared computing device may be a multiprocessing system and may enough resources available such that the users may access the applications, webpages or documents via the AR system without interfering with each other.

Figure 59A:
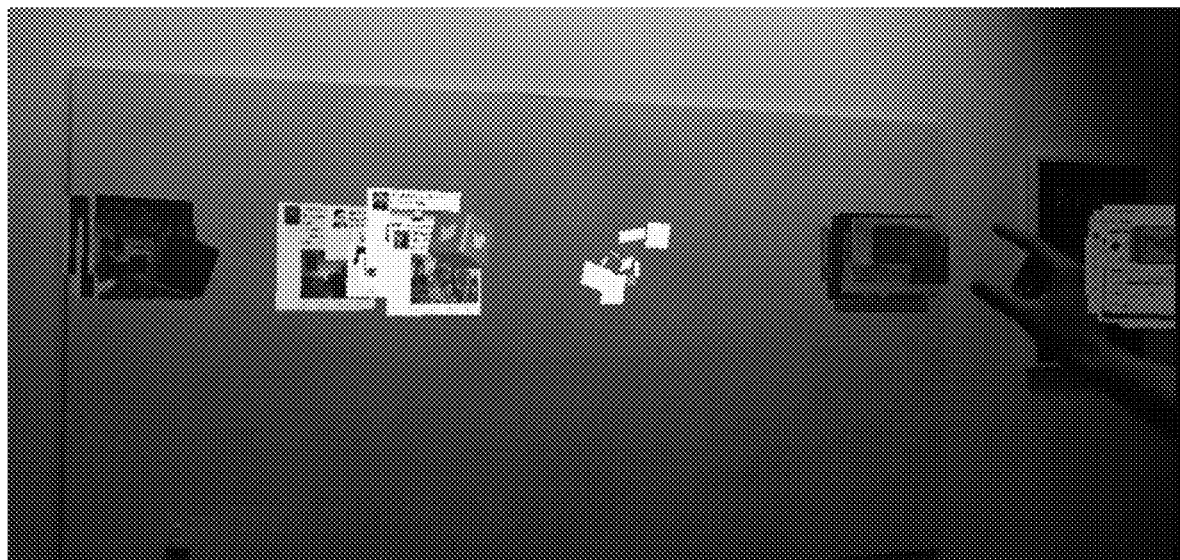
Figure 59B:

FIGS. 59A and 59B illustrate an example embodiment of the AR/VR system described herein. In FIG. 59A, an AR home screen featuring multiple different applications may be shown. In FIG. 59B, a selection of the Twitter® application may cause the unselected applications to vertically drop, stack the shown images, close, or otherwise become less visually present in the user's perspective or view of the AR home screen.

Figure 60:
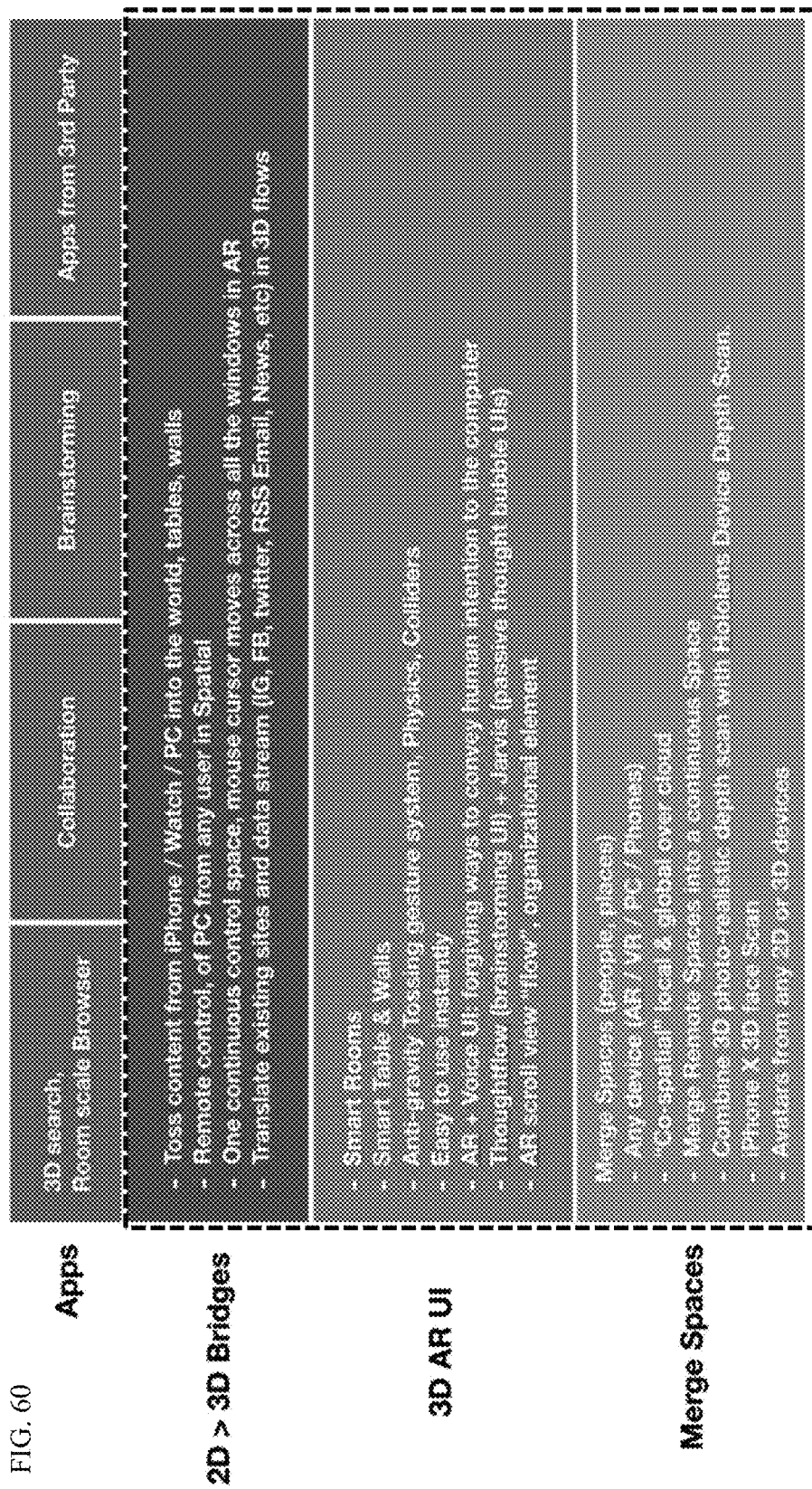

FIG. 60 illustrate example embodiments of the AR/VR system described herein. As shown in the example of FIG. 60, the AR/VR system may provide a foundation or framework for developing or executing different apps or applications by third parties. Some example apps are described herein. The 3D search and room scale browser app when executed by the AR/VR system may enable a user to see search results grouped or spread across the physical layout of a user's AR/VR environment, rather than being limited to search results that are provided in a single window/tab on a 2D screen or device.

The collaboration app may enable multiple users who are using either AR or VR embodiments of the system to share files or images of files with each other so that all the users may have access to the same information regardless of their physical location or the location of the computing device(s) from which the information is retrieved.

The brainstorming app may automatically visualize words being spoken by users who are participating in a workspace or brainstorming meeting, regardless of whether the users are co-located or located in different geographic environments. For example, when a user speaks, a microphone on the headset may receive the voice signal and transmit the voice signal to the AR/VR system for processing. In addition to transmitting the sound of the voice to the various headsets as described herein, the AR/VR system may parse and visualize the words that were received. In an embodiment, the parsing may exclude certain common connector words or phrases such as "and," "the," "um," etc. Then the users may have the ability to save or otherwise act on the visualized text before it disappears or is replaced by new text from one or more of the users.

In an embodiment, the 2D>3D bridges, 3D AR UI, and Merge Spaces functionality may provide an AR/VR framework upon which the system described herein operates and/or the apps operate or execute.

The AR/VR system described herein can create bridges or seamless (from the user's point of view) transitions between 2D screens and 3D augmented environments. This is described throughout this application including with reference to FIGS. 1A, 1B and 53. For example, images or other content may be viewed on a 2D device such as a mobile phone, smart watch, smart television, tablet, etc. may be moved from the 2D screen and displayed in the augmented physical 3D environment of the user. In an embodiment, the AR/VR system may generate an image overlay on the original image, and then block or black out the original location of the image as it is being moved on the 2D screen where it is initially visualized or displayed to its new location as part of or within the augmented 3D environment.

In an embodiment, any user in a workspace may interact with any content from any computing device that is connected to the AR/VR system (to which the user has authorized permissions to access). In other embodiments, this cross-user functionality may be restricted based on document ownership, roles, or other factors. In an embodiment, the AR/VR system may translate or map 2D content retrieved from the device (such as a website or RSS feed) into a 3D format for display. The 3D format may be specially configured by a published and may be included in metadata associated with the 2D content, or may be mapped by AR/VR system in whatever 3D format is deemed most fitting. This mapping described throughout the specification, including with reference to FIGS. 36A, 36B, 49A, and 49B.

3D AR UI functionality may include the AR/VR system proving an augmented reality user interface in any physical or 3D environment in which the user may be accessing the AR/VR system (e.g., using an AR or VR enabled device). Some of the features of this functionality may include smart rooms or meeting spaces where multiple users can interact with the same display elements, including moving objects to meshes that may be generated to corresponding walls, tables, and other physical planar or non-planar surfaces.

As described above, display elements (including avatars) when moved into an AR/VR space may float around and move as if weightless in an anti-gravity or under-water type environment. By simply placing on AR glasses or an AR headset communicatively coupled to the AR/VR system, a user may begin interacting with the AR/VR system. As described herein, the AR/VR system may listen for and process voice commands from the users, and may generate visual displays of keywords or speech that may be acted upon by users in a workspace. The AR/VR system may also offer various scrolls through data, including stacking, and allowing a user to scroll through the content of a particular display element (vertically or horizontally) without changing the size of the display element (similar to how a user may scroll through a window on his or her 2D screen).

The merge spaces functionality may enable multiple users accessing a particular workspace from multiple different physical rooms or environments to merge workspaces or join the same AR workspace. For example, if two users are accessing the same workspace from two different rooms, in an embodiment, the AR/VR system may generate for each user an averaged or composite room (including meshes) in which both users can access the same data or display elements.

As described herein, the AR/VR system may merge or combine depth scans of rooms or other physical environments with images (3D) taken of the room to provide a more realistic AR experience for users. As described above, this functionality may include using face scans of users to provide realistic representations of their faces on their corresponding AR/VR avatars that may be seen by other users with whom they are sharing a workspace. Further, the AR/VR system may enable users to access or join workspaces using standard mobile phones or other computing devices which are connected to or communicatively coupled to the AR/VR system. The AR/VR system may then generate avatars representing these users in the AR/VR environment of other users with whom they are sharing workspaces.

Figure 44:
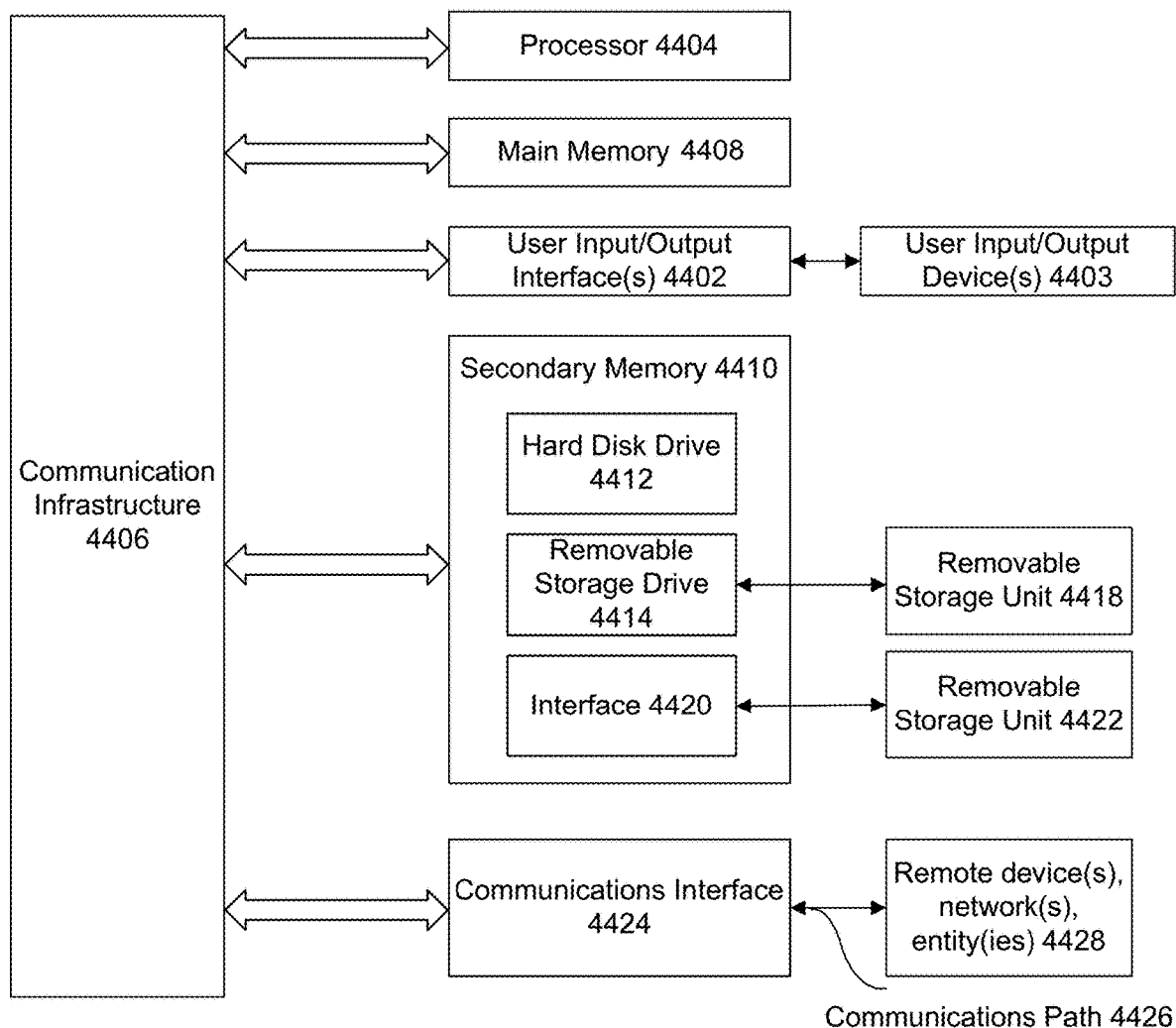

Various embodiments may be implemented, for example, using one or more well-known computer systems, such as computer system 4400 shown in FIG. 44. One or more computer systems 4400 may be used, for example, to implement any of the embodiments discussed herein, as well as combinations and sub-combinations thereof.

Computer system 4400 may include one or more processors (also called central processing units, or CPUs), such as a processor 4404. Processor 4404 may be connected to a communication infrastructure or bus 4406.

Computer system 4400 may also include user input/output device(s) 4403, such as monitors, keyboards, pointing devices, etc., which may communicate with communication infrastructure 4406 through user input/output interface(s) 4402.

One or more of processors 4404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 4400 may also include a main or primary memory 4408, such as random access memory (RAM). Main memory 4408 may include one or more levels of cache. Main memory 4408 may have stored therein control logic (i.e., computer software) and/or data.

Computer system 4400 may also include one or more secondary storage devices or memory 4410. Secondary memory 4410 may include, for example, a hard disk drive 4412 and/or a removable storage device or drive 4414. Removable storage drive 4414 may be a floppy disk drive, a magnetic tape drive, a compact disk drive, an optical storage device, tape backup device, and/or any other storage device/drive.

Removable storage drive 4414 may interact with a removable storage unit 4418. Removable storage unit 4418 may include a computer usable or readable storage device having stored thereon computer software (control logic) and/or data. Removable storage unit 4418 may be a floppy disk, magnetic tape, compact disk, DVD, optical storage disk, and/any other computer data storage device. Removable storage drive 4414 may read from and/or write to removable storage unit 4418.

Secondary memory 4410 may include other means, devices, components, instrumentalities or other approaches for allowing computer programs and/or other instructions and/or data to be accessed by computer system 4400. Such means, devices, components, instrumentalities or other approaches may include, for example, a removable storage unit 4422 and an interface 4420. Examples of the removable storage unit 4422 and the interface 4420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 4400 may further include a communication or network interface 4424. Communication interface 4424 may enable computer system 4400 to communicate and interact with any combination of external devices, external networks, external entities, etc. (individually and collectively referenced by reference number 4428). For example, communication interface 4424 may allow computer system 4400 to communicate with external or remote devices 4428 over communications path 4426, which may be wired and/or wireless (or a combination thereof), and which may include any combination of LANs, WANs, the Internet, etc. Control logic and/or data may be transmitted to and from computer system 4400 via communication path 4426.

Computer system 4400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 4400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 4400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 4400, main memory 4408, secondary memory 4410, and removable storage units 4418 and 4422, as well as tangible articles of manufacture embodying any combination of the foregoing. Such control logic, when executed by one or more data processing devices (such as computer system 4400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 44. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

Meeting Space Save and Load

Figure 61:
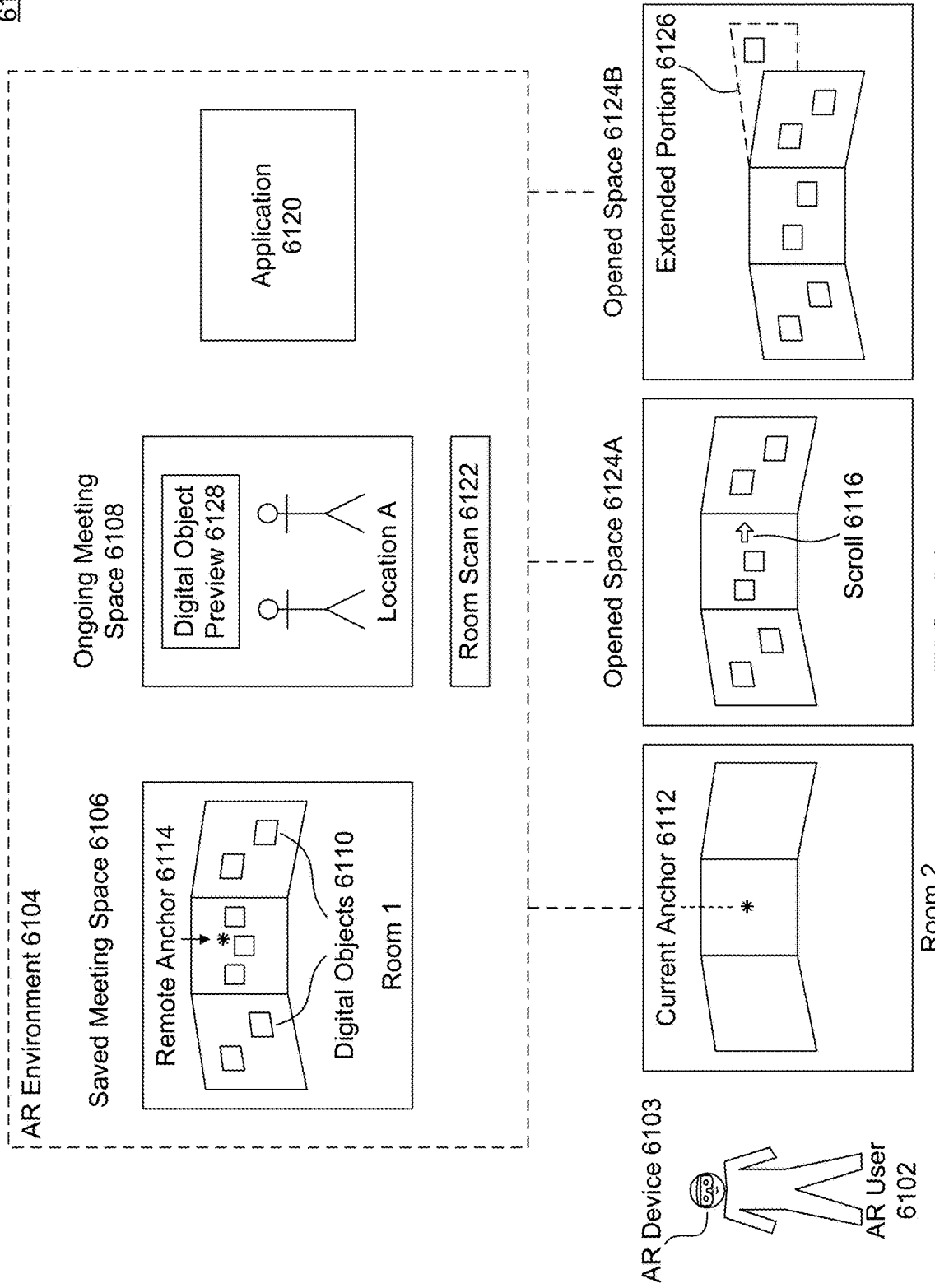

FIG. 61 illustrates another example diagram 6100 of how a workspace or meeting space may be configured and saved in one physical environment and loaded and arranged into another physical environment, according to some embodiments.

In the example, augmented reality (AR) user 6102 may be a user using or wearing an AR device 6103. AR device 6103 may include a helmet, goggles, glasses, contact lenses, or other AR compatible device or apparatus through which an AR user 6102 may view or interact with an AR meeting or work space.

AR user 6102 may login to their user account in an AR environment 6104 and may select any different number of AR compatible workspaces or meeting spaces which they are authorized to open or join in their current physical location. Hereinafter, the terms workspace and meeting space shall be used interchangeably as referring to any AR or AR-compatible environment.

In an embodiment, an AR environment may include the digital rendering of various digital images or objects on one or more digital canvases which are overlaid on images or video of a physical environment, and which may be viewed and/or interacted with through an AR-compatible or AR device 6103.

In the example shown, AR user 6102 may have the options of opening a saved meeting space 6106, joining an ongoing meeting space 6108, or opening an application 6120. Saved meeting space 6106 may include a previously opened and configured meeting space in which one or more users (which may or may not include the AR user 6102 now opening the saved meeting space 6106) were working and accessing (e.g., viewing, editing, adding, removing) any different number of digital objects 6110. In another embodiment, a user may open a meeting or workspace from a link in a text message, e-mail, or other form of electronic communication.

Digital objects 6110 may include visual displays of webpages, documents, images, videos, or any other multimedia that is capable of being displayed on the screen of a computing device, but which is rendered in an AR environment. The digital objects 6110 may be rendered or displayed as three-dimensional or holographic representations of the underlying data or objects. Through performing actions and gestures which are captured or detectable by AR device 6103, an AR user 6102 can interact with the digital objects 6110 in the AR environment (e.g., picking them up, passing them to another AR user, zooming in, trashing them, opening new objects, editing them, etc.).

In an embodiment, digital objects 6110 may be organized across various digital canvases (as described in various figures above, and as further described below as digital canvas 6310 with respect to FIG. 63). A digital canvas may be a transparent (or translucent) digital surface often aligned with one or more walls or other surfaces (tables, desktops ceilings, floors) of a room (e.g., Room 1) on which one or more digital objects 6110 may be placed. In another embodiment, saved meeting space 6106 may also include a digital canvas that is not aligned to wall or other surface, but instead may a free-standing or user-generated digital canvas. For example, AR user 610 may place a digital canvas between two physical walls of a room, or in an open grass field (if using AR device 6103 outdoors) without any physical walls.

AR user 6102 may be physically located in Room 2. Room 2 may be a different room from where saved meeting space was previously used (Room 1). AR environment 6104 may enable AR user 6102 to open saved meeting space 6106 in Room 2. AR environment 6104 may then configure, arrange, or align the digital canvases and/or digital objects 6110 of the saved AR workspace as arranged in Room 1 into the new physical environment of Room 2.

Rather than randomly placing digital objects and canvases anywhere within the new AR environment or workspace, AR environment 6104 may maintain a similar relative alignment of the digital canvases and objects in Room 2 as they were arranged in Room 1 using anchors 6112, 6114. The anchors 6112, 6114 in the various physical locations may provide AR environment 6104 a user's preferences on how they want the workspace or meeting space opened and aligned to their current physical location.

In an embodiment, when opening either a saved meeting space 6106 or ongoing meeting space 6108, AR user 6102 may be prompted to designate a primary or current anchor wall or area 6112 in Room 2. For example, in responding to a prompt (provided through AR device 6103), a user may use their fingers to select a spot on a physical wall in Room 2 as an anchor area 6112. For example, the AR user 6102 may be prompted to identify the center (or approximate center) of the biggest wall in the room. This interaction may be detected by AR device 6103 and transmitted to AR environment 6104.

AR environment 6104 may receive or store room scans 6122 of Room 1 and Room 2. Room scans 6122 may include images and/or video of the visual appearance of the rooms including the physical objects in the room (e.g., tables, chairs, individuals, paintings, equipment, etc.), relative location of objects in the room, and may include actual or approximated room and/or object dimensions. In an embodiment, room scans 6122 may be received from one or more AR devices 6103 which may include cameras and (2D or 3D) room scanning capabilities operating or having operated in a particular room or location.

If a user requests to open an AR meeting space in a new room, AR environment 6104 may prompt an AR user 6102 to scan the room using AR device 6103. Alternatively, a user may skip this step and AR environment 6104 may load or display saved meeting space 6106 as it was arranged in Room 1 without any visual adjustments or alignment of the digital objects of the AR environment to the current physical space of AR user 6102. This may save bandwidth and processing overhead that may otherwise be consumed in aligning the AR environment with the current physical space.

In an embodiment, a remote anchor 6114 may have been previously designated for saved meeting space 6106 by one or more of the participants on the meeting space. By aligning remote anchor 6114 with current anchor 6112, and using room scan information 6122, AR environment 6104 may visually configure, manipulate, or adjust the digital canvases and digital objects 6110 of saved meeting space 6106 to align and/or fit within a new Room 2. This adjusted alignment of the saved meeting space 6106 (e.g., digital canvases and objects) may be transmit to one or more AR devices 6103 (for different users 6102) who may be participating in the meeting in Room 2. Then, for example, each user 6102 in Room 2 (wearing an AR device 6103) may have a shared display of the loaded meeting space 6106.

If Room 2 is the same size as Room 1, or within a size threshold of Room1 if Room 2 is a little smaller or larger than Room 1 (as may be determined based on room scan 6122), then AR environment 6104 may align remote anchor 6114 with current anchor 6112 and open the digital canvases of Room 1 in Room 2 without any size or appearance adjustments. AR user 6102 may then have the option to increase, decrease, or otherwise change the size or rearrange the digital canvases or digital objects to fit into Room 2. In an embodiment, if one AR user 6102 adjusts the digital canvases/objects of the AR environment in Room 2, any other users participating in the AR environment of Room2 may see their displays updated in real-time reflecting those changes.

This same method may be used if AR user 6102 is an open field or stadium, or otherwise larger than Room 1. For example, if there are no walls, AR user 6102 may still designate current anchor space or spot 6112 in a particular area. AR device 6103 may capture the area relative to the AR user 6102, and AR environment 6104 may provide saved meeting space 6106 in alignment with anchor 6112 without any size adjustments. AR user 6102 may then add, remove, combine, increase the size, decrease the size, or otherwise modify the digital canvases in Room 2 (even if Room 2 is an open field without walls).

If Room 2 is smaller than Room 1, then there any number of different modifications or adjustments that may be performed by AR environment 6104 in displaying saved meeting space 6106 in Room 2. These may include a providing scaled down, scrollable, and/or dollhouse views of saved meeting space 6106. In an embodiment, AR environment 6104 may additionally or alternatively open saved meeting space 6106 in its original size with an extended display area that appears to be extending into and through a wall or border of Room 2 if Room 2 is smaller than Room 1.

In a scaled down display, saved meeting space 6106 may appear the same as it appeared in Room 1, however the digital canvas and/or digital objects 6110 may be scaled down to fit within the confines of the walls and other surfaces of Room 2. In an embodiment, if some of the walls of Room 2 are the same size and some are smaller than corresponding walls of Room 1 (e.g., relative to the anchors 6112, 6114), then only the smaller walls and objects may be scaled down.

In an embodiment, there may be a threshold for how much a digital canvas or digital object 6110 may be scaled down to fit into Room 2 (e.g., 50%). Once a digital object or canvas needs to be scaled beyond 50%, or whatever other threshold has been specified, AR environment 6104 may configure the digital canvases of Room 2 with a scroll feature or scroll button (e.g., scroll 6116) as illustrated in opened space 6124A.

Scroll 6116 may be a visual or digital indicator that appears on a digital canvas that only displays a portion or subset of the digital objects 6110 that are pinned to that wall. For example, as illustrated only 2 of the 3 digital objects (from the center wall of saved meeting space 6106) appear on the center wall in opened space 6124A. User 6102 may use a hand gesture to select scroll 6116 with their fingers. The gesture may be captured by AR device 6103, received by AR environment 6104, and the remaining digital objects (or a second subset of digital objects not currently displayed) may be rendered on the scrollable canvas. Then for example, a new scroll 6116 may appear on the left side of the wall to indicate that there are other digital objects that are not currently being displayed. A digital canvas may include scrolls 6116 in any direction or combination of directions including up, down, left, right, and diagonal.

In an embodiment, the digital objects assigned or pinned to each wall may be stored locally in memory of AR device 6103. Then, for example, a selection of scroll 6116 may cause AR device 6103 to display the third digital object without communicating with AR environment 6104—particularly when only a single user 6102 is operating in a particular AR environment. The changes may then later be communicated to AR environment 6104 (e.g., when saving a particular workspace, when a new user joins, after a threshold number of changes have been detected, etc.).

In another embodiment, as illustrated in open space 6124B, AR environment 6104 may open saved meeting space 6106 in Room 2 (which has at least one smaller wall than a corresponding wall of Room 1) without performing any scaling or including any scrolling feature. For example, AR environment 6104 may display an extended portion 6126 that from an AR user's point-of-view appears to be extending into or beyond the physical wall of Room 2. In another embodiment, scaling and/or scrolling may be combined with extending.

AR user 6102 may still be able to interact with the digital object(s) 6110 that are displayed in the extended portion 6126 by using various hand gestures. For example, user 6102 may still grab the digital object and bring it closer to the user 6102. The only difference is that user 6102 may not be able to walk in front of the digital objects on extended portion 6126 and stand directly in front of them due to the limited size of Room 2 (relative to the extended portion 6126).

If a user 6102 is in a very small room or office relative to the original Room 1 or is sitting at a desk in an office (as illustrated in FIG. 42), then AR user 6102 may choose an option to open a dollhouse view of saved meeting space 6106 (e.g., to fit within an available surface or display area). An example dollhouse view of a meeting space is illustrated in FIG. 55A. Dollhouse view may be an miniaturized view of meeting space 6106 that is configured or sized to fit in a designated surface area (as indicated by AR user 6102).

In an embodiment, a user may use hand gestures to reach into the digital dollhouse in the AR environment and extract and expand digital objects, which are increased in size in the Room 2 where AR user 6102 is occupying. An example of this is illustrated in FIGS. 55B and 55C in which an image, avatar, or holograph of a user is selected from the dollhouse and expanded within the physical environment of the user. However, this same process could be applied to digital objects 6110 such as documents or webpages that are being displayed.

In an embodiment, a user 6102 may also open or join an ongoing meeting space 6108. This process is described in greater detail below with regard to FIG. 63. However, as illustrated, AR environment 6104 may provide a live preview of an ongoing meeting space 6108 (as described in greater detail above with respect to FIGS. 10A and 10B.

In an embodiment, the live preview may include a subset of one or more (AR and/or non-AR) participants in the meeting space. The live preview may also include a digital object preview 6128 which may be an image of one or more of the digital objects or documents being accessed or viewed in the meeting space. For example, the one or more documents displayed in digital object preview 6128 may include the largest document or most recently or most accessed documents or digital objects from the ongoing meeting space.

The live preview may also include icons or avatars of users participating in the meeting, including their real-time motions. If there are a large number of users, then the meeting organizer or the person speaking may be displayed in the preview. The live preview, including both the displayed participants and/or digital object preview 6128 may be updated and changed in real-time based on what is detected in the underlying, ongoing meeting.

In an embodiment, access to saved meeting spaces 6106 and ongoing meeting spaces 6108 (including the ability to view previews) may be subject to authorization and permission. For example, AR user 6102 may require certain security clearances to open particular documents or meeting spaces, and see certain documents or participants in the live preview. In an embodiment, if AR user 6102 does not have the proper security authorizations, restricted portions of the preview may be blurred or blacked out.

In an embodiment, a user 6102 may choose to open an application 6120 in Room 2. Application 6120 may include a two-dimensional file or directory structure of various documents or data streams. In an embodiment, AR environment 6104 may be configured to read the data, documents, and/or data streams of application 6120 and select portions of the data to display on digital canvases in an AR meeting or workspace.

For example, application 6120 may include an application with both a shared document (which is being updated and accessed in real-time) and a data stream of an opened chat between several different computer or mobile phone users. AR environment 6104 may generate visual displays of the document and chat within the AR meeting space of Room 2. And as changes are made to the shared document or new chats are received, those changes may be displayed in real-time in Room 2.

AR user 6102 may then save the opened application (e.g., as a saved meeting space 6106), and open it again in a different location, or make it accessible to other users. AR environment 6104 may then perform similar processing to that described above when opening the saved application workspace in a new room size. In an embodiment, when opening the saved application workspace at a later time, the shared document and chat stream may include any changes that were made between the time the application workspace was saved and reopened.

In another embodiment, AR environment 6104 may display the saved versions of the document and chat, and provide the user with a notification that the document and chat have been updated. Then, the user may determine whether or not to load the updated, real-time versions into the workspace.

In the example illustrated, Room 1 is shown to have 3 walls on which various digital objects 6110 have been arranged. In different embodiments, digital objects 6110 may have also been arranged on a table, a fourth wall, the ceiling, the floor, or on other digital canvases that were constructed within Room 1 that do not correspond to a wall, desktop, or tabletop. For example, Room 1 may have 4 walls, but a new digital canvas may have been constructed between two of the walls dividing the room in half.

In an embodiment, current anchor point 6112 may be the middle of the largest wall of the room. In other embodiments, current anchor point may be the smallest wall in the room, the floor, the ceiling, the room entrance/doorway, a window, an East-most wall, etc.

In an embodiment, the AR headset of AR user 6102 may perform or record a scan of Room 2, including actual or approximate dimensions of the various walls of Room 2. Based on the indication of current anchor 6112 and a remote anchor 6114, AR environment 6104 may open saved meeting space 6106 into Room 2, using current anchor 6112 as a common point of reference.

Figure 62:
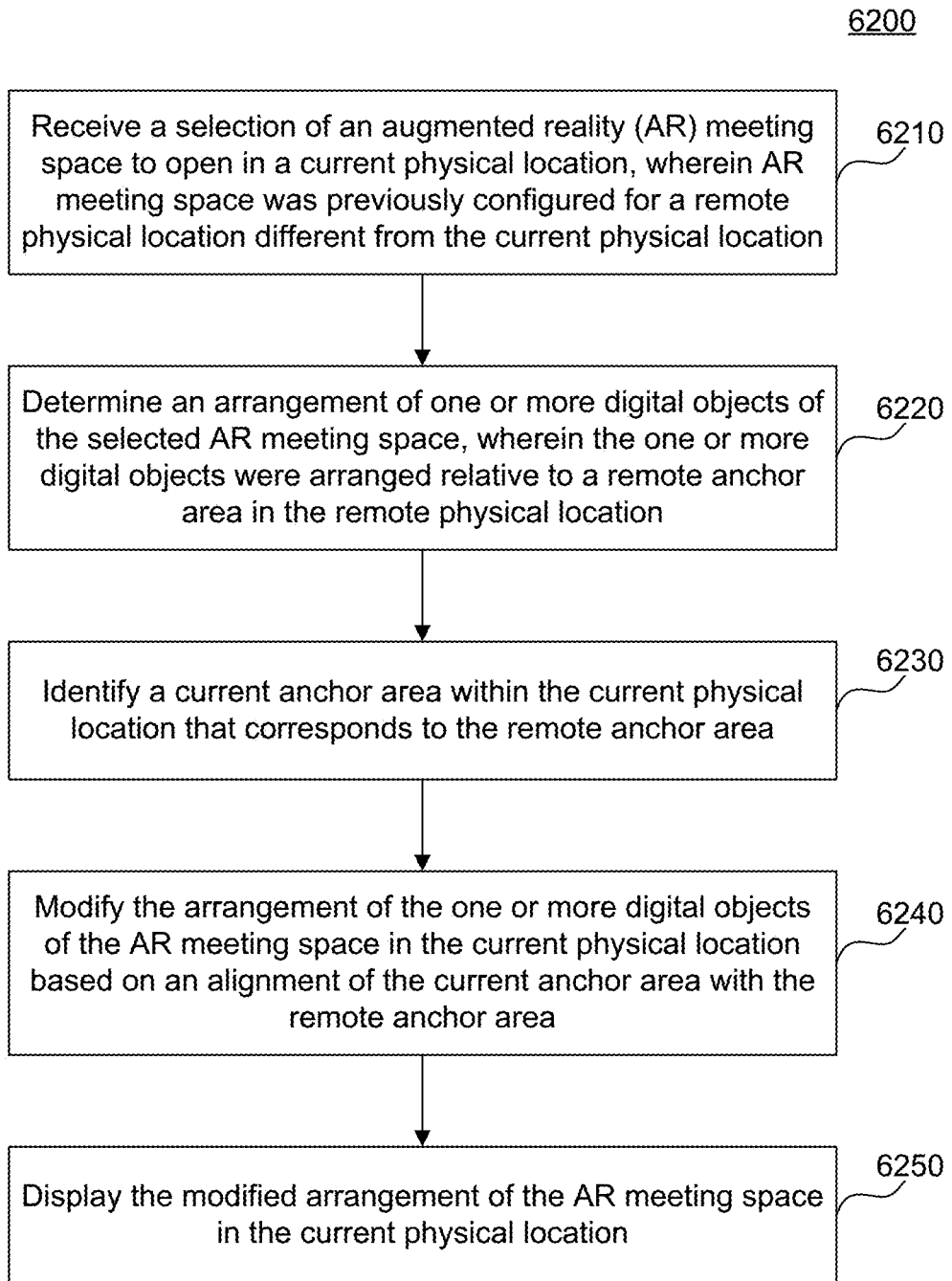

FIG. 62 is a flowchart of method 6200 illustrating example operations of AR meeting space load functionality, according to some embodiments. Method 6200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 61, as will be understood by a person of ordinary skill in the art. Method 6200 is not limited to the example embodiments described herein.

In 6210, a selection of an augmented reality (AR) meeting space to open in a current physical location is received, wherein AR meeting space was previously configured for a remote physical location different from the current physical location. For example, AR environment 6104 may receive a selection of saved meeting space 6106 to open in Room 2, wherein the saved meeting space 6106 was previously opened and/or modified in Room 1.

In 6220, an arrangement of one or more digital objects of the selected AR meeting space is determined, wherein the one or more digital objects were arranged relative to a remote anchor area in the remote physical location. For example the saved meeting space 6106 may include a variety of digital objects 6110 that are organized across one or more digital canvases arranged in Room 1—where the meeting space was created or previously loaded or modified. The digital objects 6110 may include visual or holographic displays of files, data streams, documents, web pages, search results, or other multimedia that may be displayed on a screen of a computing device. In an embodiment, AR environment 6104 may track the distance or relative locations of the digital objects 6110 to remote anchor 6114.

In 6230, a current anchor area within the current physical location that corresponds to the remote anchor area is identified. For example, AR user 6102 may be asked to designate a current anchor area 6112 in Room 2. Or, for example, AR environment 6104 may identify a previously designated anchor area 6112 for Room 2, as may have been previously designated by the same or a different AR user 6102 in Room 2. The current anchor area 6112 may be used (or may have been used) to load or arrange the same or different workspaces from the one currently being loaded (e.g., 6106). For example, once a current anchor area 6112 is set for a room, AR environment 6104 may use the same anchor 6112 for all users and future loaded workspaces moving forward (unless otherwise indicated by an AR user 6102).

In 6240, the arrangement of the one or more digital objects of the AR meeting space in the current physical location is modified based on an alignment of the current anchor area with the remote anchor area. For example, AR environment 6104 may rearrange and/or change the size and location of various digital canvases to approximate a similar alignment to current anchor 6112, as may have been previously aligned with remote anchor 6114. AR environment 6104 may further change how the digital objects 6110 are displayed on those canvases, by changing their size (increasing or decreasing), changing their location, or adding scrollability for objects 6110 that do not fit in the new Room 2.

In 6250, the modified arrangement of the AR meeting space is displayed in the current physical location. For example, AR environment 6104 may provide the new or modified arrangement to an AR device 6103 being worn by an AR user 6102 who may then interact with the loaded meeting space 6106 in opened spaces 6124A or 6124B.

AR Meeting and Remote Join

Figure 63:
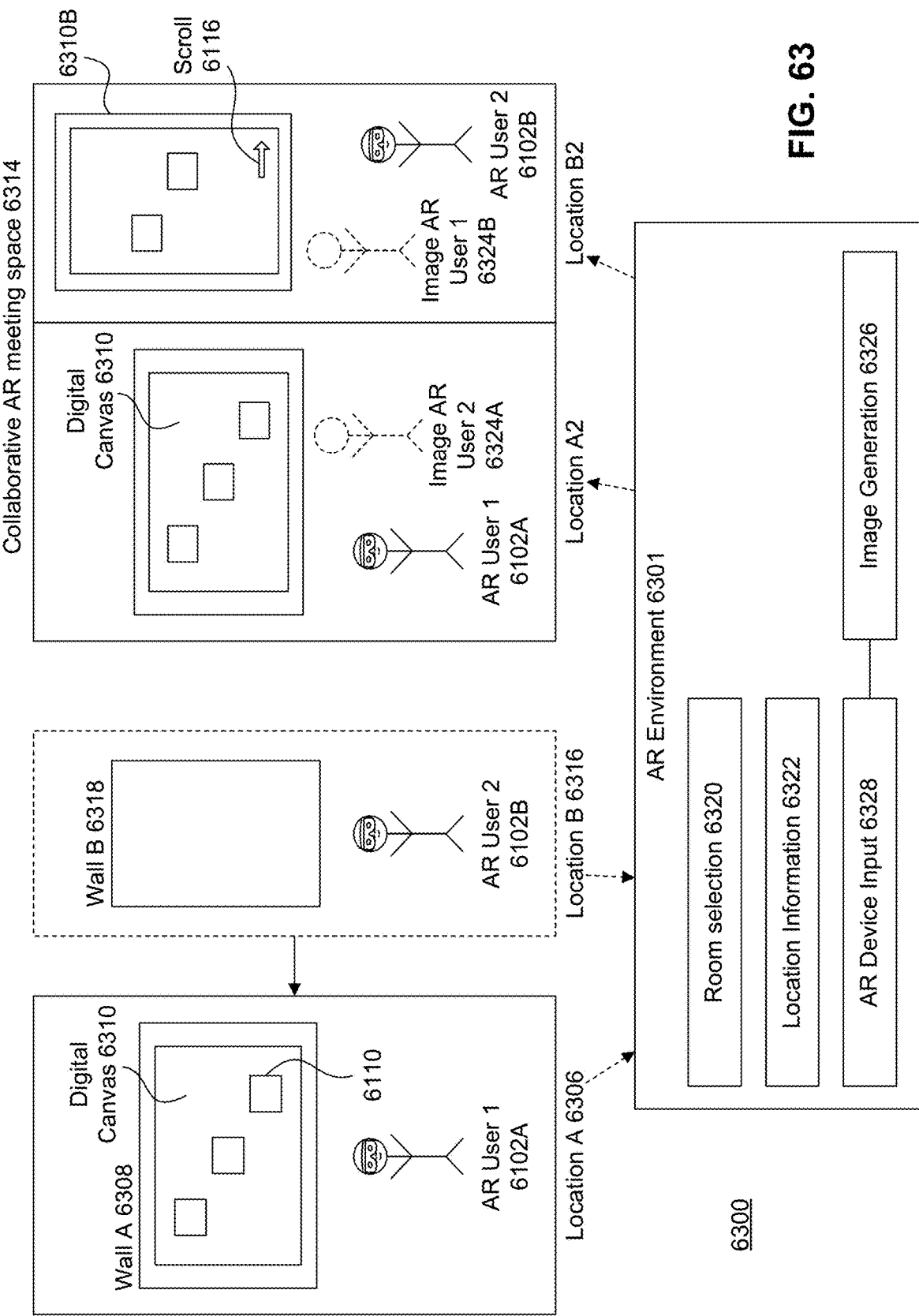

FIG. 63 illustrates another example diagram 6300 of how multiple, remotely located users may join the same augmented reality (AR) workspace or meeting space, according to some embodiments.

A first AR user 1 (6102A) may open or begin an AR meeting space in location A 6306, using an AR device similar to AR device 6103. The first workspace may include an ongoing AR meeting or different files of an application 6120 as described above.

Location A may include a first wall A upon which a digital canvas 6310 is displayed. As illustrated, in an embodiment, the digital canvas may not take up the entirety of the wall, but may include a border between the edges of the wall and the beginning of the canvas 6310. Digital canvas 6310 may be displayed within the context of the AR headset (6103) that AR user 1 is wearing. The AR headset (6103) may include goggles, a helmet, headset, contact lenses, or any other device or apparatus that is communicatively coupled to AR environment 6301 and is capable of rendering or displaying digital images and detecting or receiving user input for interaction with an AR workspace.

In the example shown, AR user 1 may select Wall A (6308) as the wall on which to render a digital canvas 6310 (which may or may not include one or more digital objects 6110). In an embodiment, the location A may include multiple walls or surfaces (e.g., table tops, desk tops, etc.) on which one or more digital canvases are displayed, each of which may include their own digital objects. In an embodiment, as described above, AR user 1 may select an anchor (6114) as being a primary wall A or point on wall A. In an embodiment, AR environment 6301 may track and store the location of various digital objects 6110, including AR users 6102, from the designated anchor point in a particular room or location. In an embodiment, the anchor 6114 may be the center of the largest wall in the room, or a place where a user wants to generate or display a first digital canvas 6310.

The digital canvas 6310 may be movable and adjustable, such that AR user 1 can move digital canvas 6310 (including any digital objects pinned or displayed to the digital canvas) to a different surface (e.g., ceiling, floor, desktop, or another wall) within Location A and change its size and/or shape. In an embodiment, AR environment 6301 may track the location of the movement of digital canvases in relation to anchor point and/or in relation to other digital objects or canvases. For simplicity sake, a single wall and a single digital canvas 6310 are illustrated in FIG. 63, however as described above with respect to FIG. 61, multiple walls or surfaces may be processed as described herein for various rooms or locations.

In an embodiment, AR user 2 (6102B) may join AR user 1 in the AR meeting space to create a collaborative AR meeting space 6314. For example, as described above with respect to FIG. 61, AR user 6102 may join an ongoing meeting space 6108. AR environment 6301 may generate a collaborative AR meeting space 6314 for various users who may be remotely located in different geographic areas or rooms.

In the collaborative AR meeting space 6314, both users 6102A, 6102B may interact with the various digital canvases 6310 and digital objects 6110 in the shared meeting space, but from their respective physical locations 6306, 6316. When one user moves, adds, edits, or deletes a digital object 6110 in collaborative AR meeting space 6314, the changes are rendered in real-time for the other(s) or attendees in collaborative AR meeting space 6314 by AR environment 6301 in their respective physical locations. For example, if user 6102A moves a digital object 6110 from a first wall to a second wall, user 6102B may see the digital object move from the same relative first wall to the same relative second wall in collaborative AR meeting space 6314.

In an embodiment, when moving digital objects 6110 around a room, AR environment 6301 may automatically group a number of closely spaced digital objects 6110 which may be arranged on the same digital canvas 6310. For example, if there are two slides displayed on a digital canvas 6310 within a distance threshold of one another (which may be measured in pixels), then when a user moves one digital object 6110 both or multiple digital objects may be moved simultaneously. A user may then select a smaller subset of the grouped digital objects to move, or move the entire group together (e.g., onto another digital canvas 6310, into a trash bin, etc.).

AR user 2 (6102B) may be located in a different geographic space at location B (6316), which may include a physical wall B (6318), on which an anchor area (6112) may be designated. AR user 2 may seek to join the AR meeting space of AR user 1. In order to generate collaborative AR meeting space 6314, AR environment 6301 may map location A and location B together to generate a common workspace (based on the designated anchors 6112, 6114). AR environment 6301 may generate this common workspace even though the room sizes at the various locations may be of varying shapes and sizes.

In an embodiment, the AR users 6102A, 6102B may make a room selection 6320. Room selection 6320 may indicate whether to use location A, location B, or a merging or blending of both locations A and B as the common digital meeting space or workspace for collaborative AR meeting space 6314.

In an embodiment, location 'A' may be selected 6320 as the primary room. Then, for example, AR user 2 may designate an anchor location (as described in FIG. 61). AR environment 6301 may then configure digital canvas(es) 6310 in location B based on a relative alignment with the designated anchor wall or location. In the example shown, location A is selected as room selection 6320 which causes AR environment 6301 to configure digital canvas 6310 for location B for AR user 2. In an embodiment, AR user 2 may select an anchor wall B (6318). Using location information 6322, AR environment 6301 may generate collaborative AR meeting space 6314.

In an embodiment, AR environment 6301 may store location info 6322 which may be used to configure collaborative AR meeting space 6314. Location info 6322 may include one or more scans of a location or room, as received from one or more AR headsets or other cameras in the room, including cameras from mobile phones, laptops, and independently mounted cameras. In an embodiment, location info 6322 may include the dimensions of the various walls within the different locations being merged. In other embodiments, more than two locations may be merged into a collaborative AR meeting space 6314. Using this location info 6322, AR environment 6301 may generate a rendering of digital canvas 6310 from location A as digital canvas 6310B in location B.

As illustrated, Wall B may include a different shape and/or dimensions relative to wall A. For example, Wall B may be taller and less wide than Wall A. As such, the same digital canvas 6310 arrangement of digital objects 6110 may not fit due to the size (e.g., width) limitations of Wall B. Further, reducing the size of digital objects 6110 may exceed a size threshold such that they may be too small for AR user 2 to read or interact with.

As such, AR environment 6301 may render a portion of digital canvas 6310B and digital objects 6110 on wall B. The partial digital canvas 6310B may include a scroll indicator 6116 that indicates that there are more objects on the digital canvas 6310B that are not currently visible. In the example shown, AR user 2 may select scroll 6116 to see the third digital object 6312.

In another embodiment, location A may include multiple different users (as illustrated in FIG. 42) and location B may include a single AR user 2 in a small office. Then, for example, the scroll 6116 may notify AR user 2 the location of various digital objects 6110 and/or the other individuals (or AR users) who are attending or participating in the collaborative AR meeting space 6314 but who may not be visible due to the space or size restrictions of location B. Or, in another embodiment, AR user 2 may be provided with a dollhouse view of the meeting. In another embodiment, may be arranged more vertically on wall B so they all fit on digital canvas 6310B.

In another embodiment, location B may be selected as the primary room 6320, and digital canvas 6310 may be adapted to Wall B and then the digital canvas 6310 of Wall A may be adjusted to as closely as possible mimic the digital canvas 6310B of Wall B. For example, the width of digital canvas 6310 in location A may be narrowed so that both users have the same viewing experience.

In another embodiment, room selection 6320 may include a blended workspace. In the blended workspace, the dimensions or features of both locations A and B may be taken into account and a composite or average digital canvas 6310 may be generated for both rooms such that the digital canvas 6310 appears the same in each location.

In another embodiment, a digital room or AR workspace generated based on the dimension of the first user's room may displayed in the second user's room as is, regardless of the relative sizes of the rooms and/or the workspace. In this case, part of the digital objects might appear to be behind physical objects or inside or behind a physical wall. This approach may save computing resources relative to resizing the AR workspace to the room of the second user.

In each user's respective collaborative AR meeting space 6314 (e.g., location A2 and location B2) may be an image 6324A, 6324B of the other AR users 6102 who are participating in the meeting. As described above, the images 6324 may include holographic images or avatars that represent the respective users. For example, AR environment 6301 may include an image generator 6326 which may generate the images 6324 in the collaborative AR meeting space 6314 (which may also be used in the preview of ongoing meeting spaces 6108 described above with respect to FIG. 61).

In an embodiment, a user may upload a picture of themselves or an image of their face may be selected from the user's social media profile. Image generator 6326 may create a holographic body for the user based on the gender of the user, or the user may pre-select, design, or pre-configure their own body type. In an embodiment, image generator 6326 may sample various portions of the image of a user's face for skin tone which may then be used to render the user's hands and other body parts in images 6324.

In an embodiment, image generator 6326 may receive AR device input 6328 to provide greater details in images 6324. For example, the AR devices or headsets may track the eye movements of a user wearing the headset (the direction in which eyes are pointed, when a user blinks, when the eyes are open, closed, etc.). Image generator 6326 may receive this eye tracking input 6328 and use that to generate more life-like images 6324.

In an embodiment, during the middle of an ongoing meeting 6314, a new room selection 6320 may be made so that the primary room may be switched between location A 6306 and location B 6316. For example, AR user 2 may be on the floor of a factory. By switching the primary room selection 6320 to location B, AR user 1 may be able to get a more virtual experience of what is happening on the factory floor. In an embodiment, AR environment 6301 may receive a live feed from the camera on the AR device of AR user 2 and may display this live feed for AR user 1 at location A. In another embodiment, the live feed may be taken from additional cameras that may be placed around the factory (e.g., location B).

Figure 64:
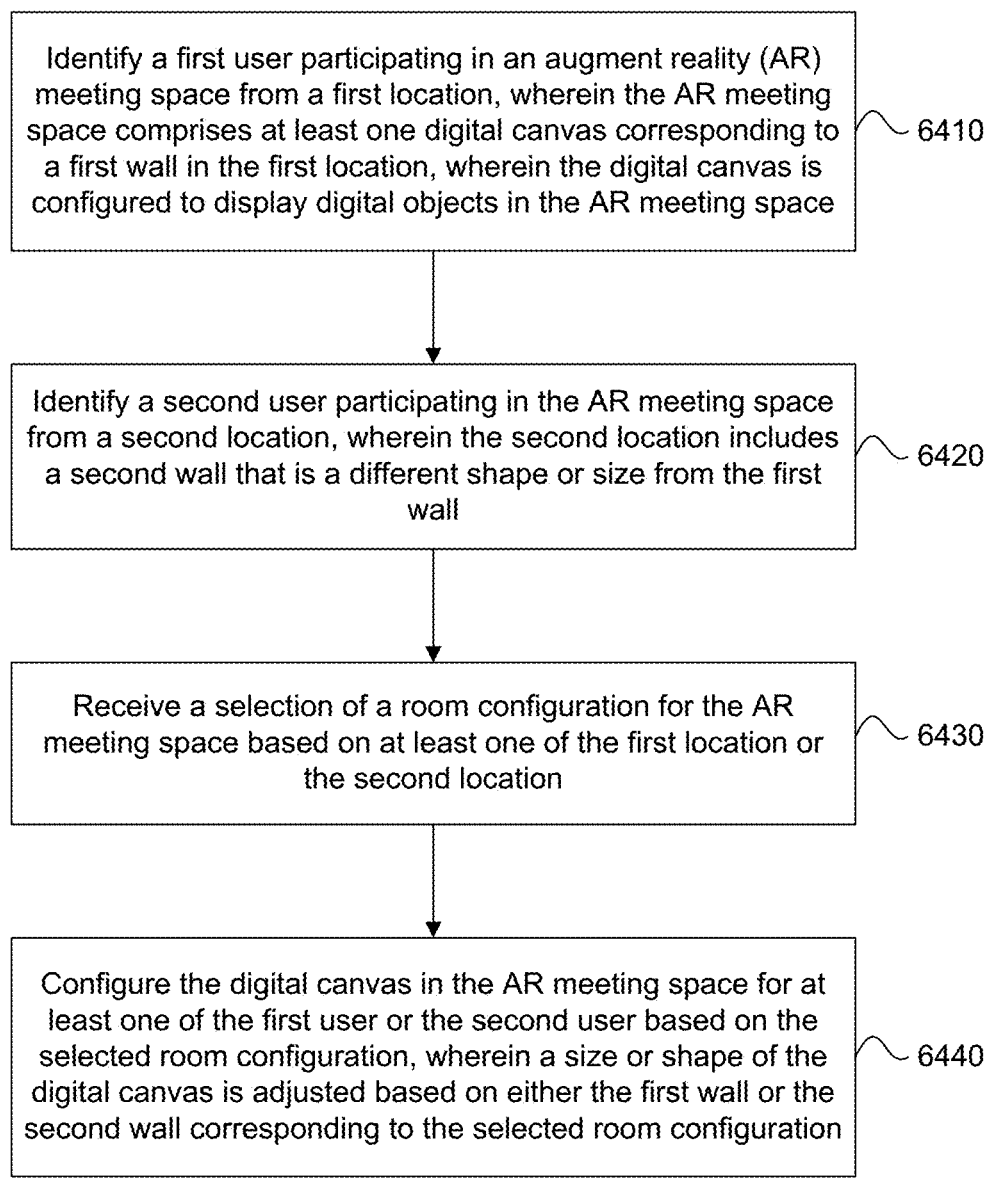

FIG. 64 is a flowchart 6400 illustrating example operations of AR meeting space load functionality, according to some embodiments. Method 6400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 63, as will be understood by a person of ordinary skill in the art. Method 6400 is not limited to the example embodiments described herein.

In 6410, a first user participating in an augment reality (AR) meeting space from a first location is identified, wherein the AR meeting space comprises at least one digital canvas corresponding to a first wall in the first location, wherein the digital canvas is configured to display digital objects in the AR meeting space. For example, AR environment 6301 may determine AR user 1 at Location A in which a meeting space includes a digital canvas 6310, including different digital objects 6110.

In 6420, a second user participating in the AR meeting space from a second location is identified, wherein the second location includes a second wall that is a different shape or size from the first wall. For example, AR user 2 may request to join the meeting space of AR user 1. In an embodiment, AR user 1 may grant permission (or permission may be granted based on a security level associated with AR user 2). AR user 2 may be remotely located in Location B which may be a different state or country from AR user 1.

In 6430, a selection of a room configuration for the AR meeting space based on at least one of the first location or the second location is received. For example, one of AR user 1 or AR user 2 may select a primary room for the collaborative AR meeting space 6314. The primary room may be location A, location B, or a blending of both locations.

In 6440, the digital canvas in the AR meeting space is configured for at least one of the first user or the second user based on the selected room configuration, wherein a size or shape of the digital canvas is adjusted based on either the first wall or the second wall corresponding to the selected room configuration. For example, if Location A is selected as the primary room, then the digital canvas 6310 may be resized or reshaped to fit on Wall B of AR user 2, while the digital canvas 6301 remains unchanged.

In a blending example, the digital canvases 6310, 6310B may be displayed based on the mean dimensions of the walls or surfaces of the rooms. For example, if Wall A is 5 feet×5 feet, and Wall B is 7 feet×3 feet, then a blended digital canvas 6310 may be 6 feet×4 feet. In an embodiment, any digital objects 6110 may be adjusted accordingly, stretched, or shrunk based on how digital canvas is adjusted. These adjustments may be made and provided to the AR devices of both AR user 1 and AR user 2. However, at any point, a new room selection 6320 may be made and the digital canvases 6310 may adjust accordingly.

In an embodiment, user 2 may be designated as a presenter or enter a presenter mode of operation within collaborative AR meeting space 6314. During presentation mode, AR user 2 may be able to dictate which digital objects 6110 are visible to user 1 (and other attendees) during the course of the meeting. This same designated digital object may also appear in any live preview of the meeting.

In an embodiment, a user (including a presenter) may activate a lightbox mode on one or more digital objects 6110 and/or a digital canvas 6310. When lightbox is activated on a digital object (such as an image of a jellyfish) the image remains in the established view of the user no matter which way they turn their head in the room. For example, if the jellyfish was arranged on the right side of an AR user's headset screen, and lightbox was activated, then even if the user is looking at the ceiling, the jellyfish picture would remain on the right side of the screen. In presenter mode, the user may arrange digital objects for other users in lightbox mode.

Mobile Device Join And Load

As discussed above, an AR system may fashion three-dimensional, AR meeting spaces for users to collaborate within using AR headsets or other suitable technologies. However, not all potential collaborators may possess such an AR headset or other similar device. Or a collaborator may be away from their desk, travelling, out of the office, or otherwise not have access to an AR headset. Collaborators may still wish to participate in an AR meeting space without an AR headset.

Accordingly, a need exists to provide a local scene recreation of an AR meeting space to a mobile device, laptop computer, or other computing device that allows remote users to participate and collaborate in the virtual space. By decoupling the AR meeting space from AR headsets, the user base expands to include users that could otherwise not participate in the AR meeting space.

Figure 65A:
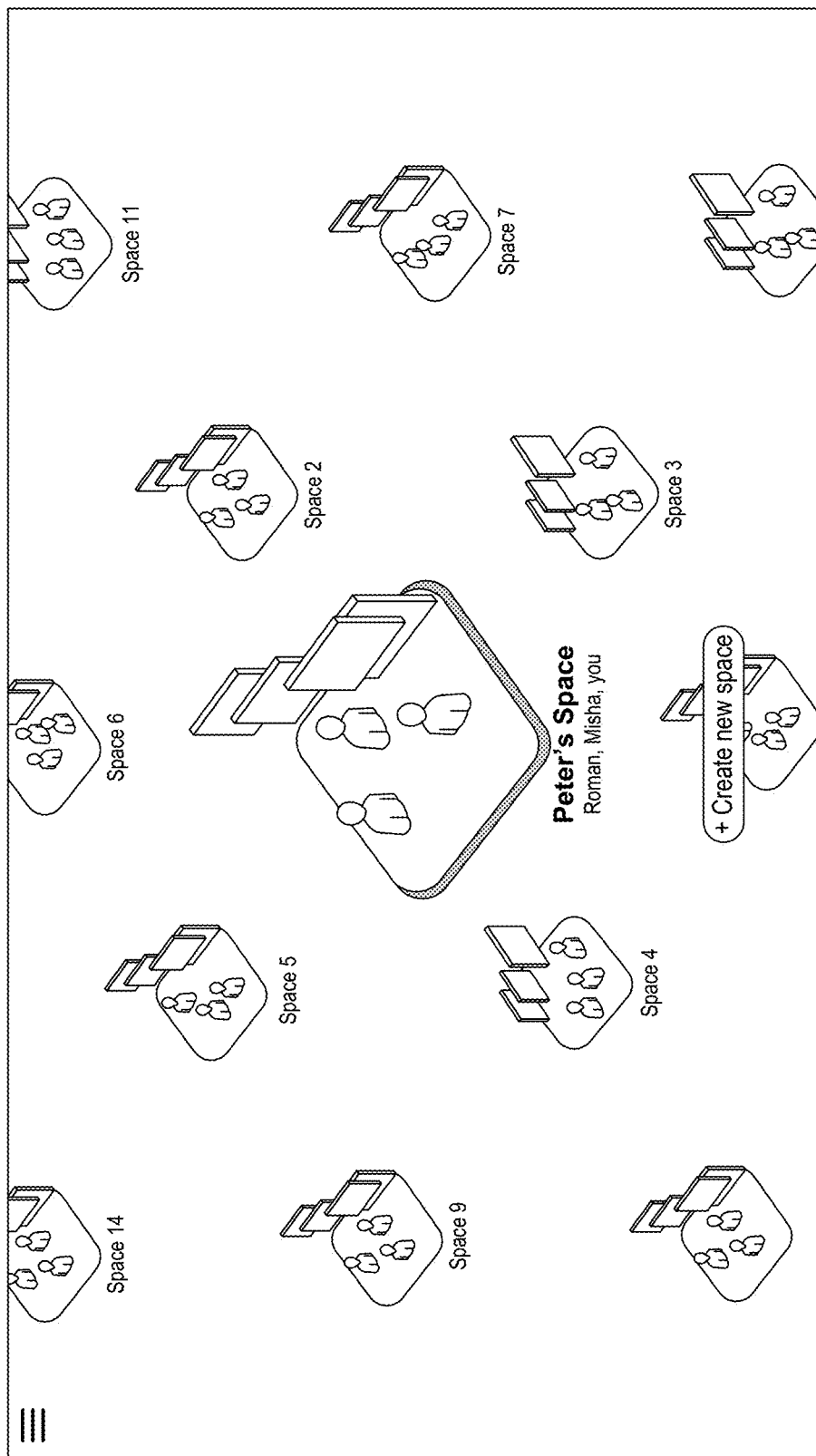

FIG. 65A is example screen display 6500A of a collaborative meeting space launcher that may be accessed from a mobile device or laptop computer, according to some embodiments. The screen display provided in FIG. 65A is merely exemplary, and one skilled in the relevant art(s) will appreciate that many approaches may be taken to provide a suitable screen display 6500A in accordance with this disclosure.

The collaborative meeting space launcher displayed in screen display 6500A may allow a user accessing an AR system from a mobile phone, laptop, or computing device to view accessible AR meeting spaces. The AR meeting spaces displayed may be limited to those rooms/spaces that the user has permission to access, that the user created, or another suitable filtering mechanism. In an embodiment, an at-a-glance view of each AR meeting space may be provided in the launcher, e.g., by displaying the avatars of users currently participating in the room and any digital objects within the room. A user may select a particular meeting room using a suitable input gesture, e.g., a click, a swipe, a touch, a keyboard entry, etc., to enter into the spectator view of the meeting room, which is discussed in further detail below with reference to FIG. 65B.

Figure 65B:
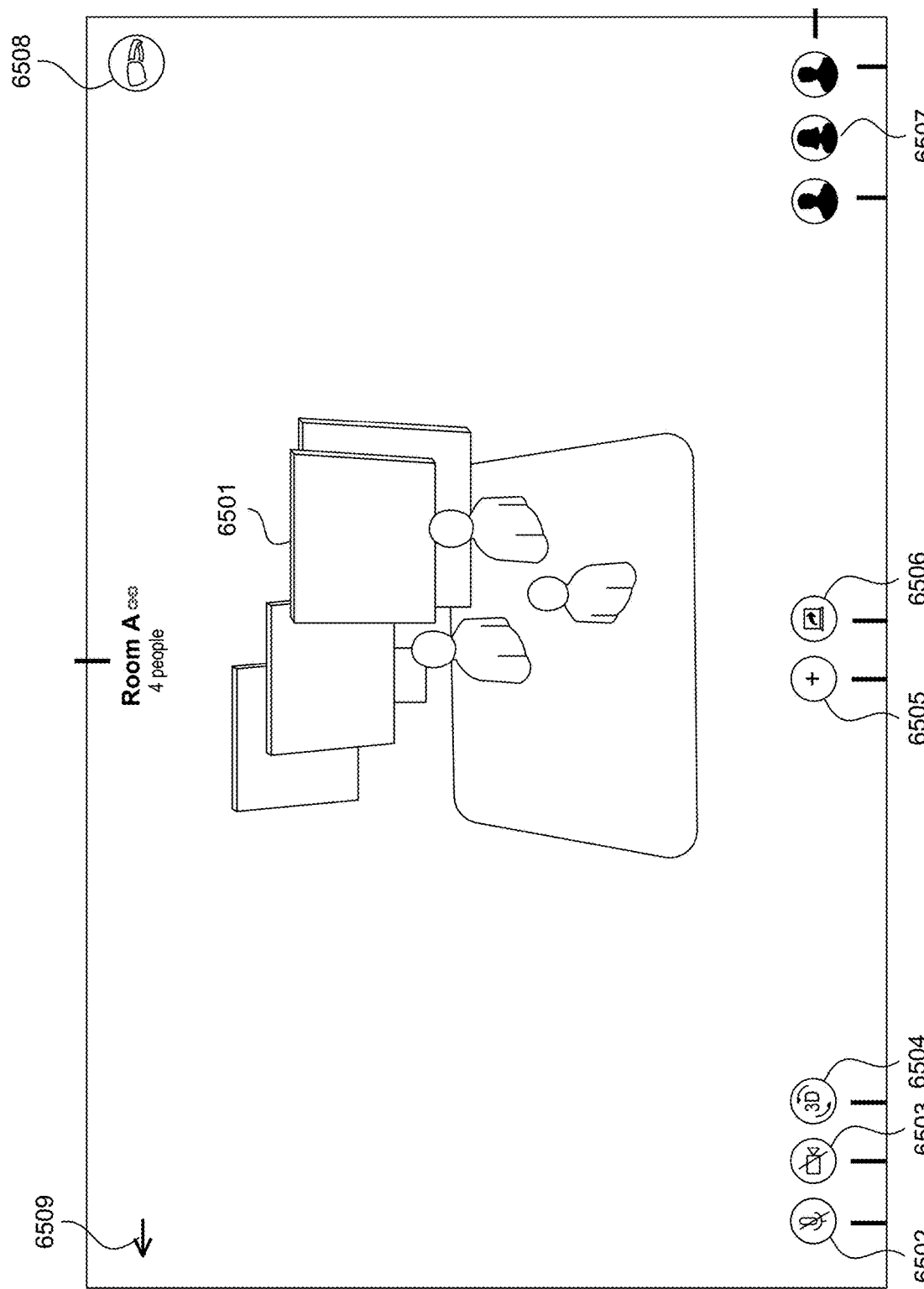

FIG. 65B is example screen display 6500B of a spectator view, according to some embodiments. Just by accessing spectator overview 6501, a user without an AR headset may participate in the meeting in a variety of fashions, e.g., by speaking, listening, adding content, sharing their screen, etc. The screen display provided in FIG. 65B is merely exemplary, and one skilled in the relevant art(s) will appreciate that many approaches may be taken to provide a suitable screen display 6500B in accordance with this disclosure. Screen display 6500B may include spectator overview 6501, mute button 6502, video button 6503, 3D button 6504, drop content button 6505, share screen button 6506, presence bar 6507, pair-hololens button 6508, and back button 6509.

Spectator overview 6501 may provide an overview of the users and digital objects within a selected AR meeting space. When the number of users and/or digital objects grows large, a subset of the users and digital objects may be selected and displayed in spectator overview 6501, e.g., by selecting the most active users/objects. In some embodiments, spectator overview 6501 may be a larger version of the thumbnails displayed in the launcher described with reference to FIG. 65A. Spectator overview 6501 may further display the avatars and digital objects in appropriate locations, based on current position information associated with each avatar/user and digital object.

Mute button 6502 may toggle, i.e., turn on and off, any microphone that is available on the mobile device or computing device viewing the spectator view. When the microphone is on, a user may be able to speak to other users in the AR meeting space.

Video button 6503 may toggle, i.e., turn on and off, any video feed, e.g., a webcam or mobile-device video camera, that is available on the computing device of the user viewing the spectator view. A user may capture a video feed for display in an AR meeting space, e.g., sharing footage of a factory floor for discussion within the AR meeting space. In some embodiments, when a video feed is enabled, users within the AR meeting space may see the video feed reflected as the avatar for the user on the mobile device.

3D button 6504 may trigger a three-dimensional mode for the viewing user. Such a three-dimensional mode may be an auto-switch view, manual mode, video-feed output, or other suitable approach to assembling a three-dimensional recreation of the AR meeting space to a mobile device. These approaches to providing a three-dimensional mode (i.e., a local scene recreation) will be described in further detail below with reference to FIG. 66.

Drop-content button 6505 may allow a remote user to add content to the AR meeting space, e.g., sticky notes, photos, and other digital objects. A possible screen display evidencing the consequences of selecting drop-content button 6505 and displaying various options therein are displayed in further detail below with reference to FIG. 65C.

Share-screen button 6506 may allow the user viewing the spectator mode to share their screen with other users in the AR meeting space. In one embodiment, the shared screen may be presented in the AR meeting space as a digital object or digital canvas that other users in the AR meeting space may examine. In another embodiment, selecting the share-screen button may result in the user's avatar being changed to the shared screen.

Presence bar 6507 may signal to a viewer the users currently active in a selected AR meeting space. Presence bar 6507 may represent the active users as avatars (e.g., avatars 6512) or using another suitable approach. If the number of users in an AR meeting space grows large, presence bar 6507 may display a sum of the number of users. Presence bar 6507 may display no users if the viewer is alone in an AR meeting space.

Pair-hololens button 6508 may allow the user to enable a coupled AR headset. By enabling the AR headset, the viewer may easily transition to viewing the AR meeting space using the AR headset.

Back button 6509 may return a user to the AR meeting space launcher, described above with reference to FIG. 65A.

Figure 65C:
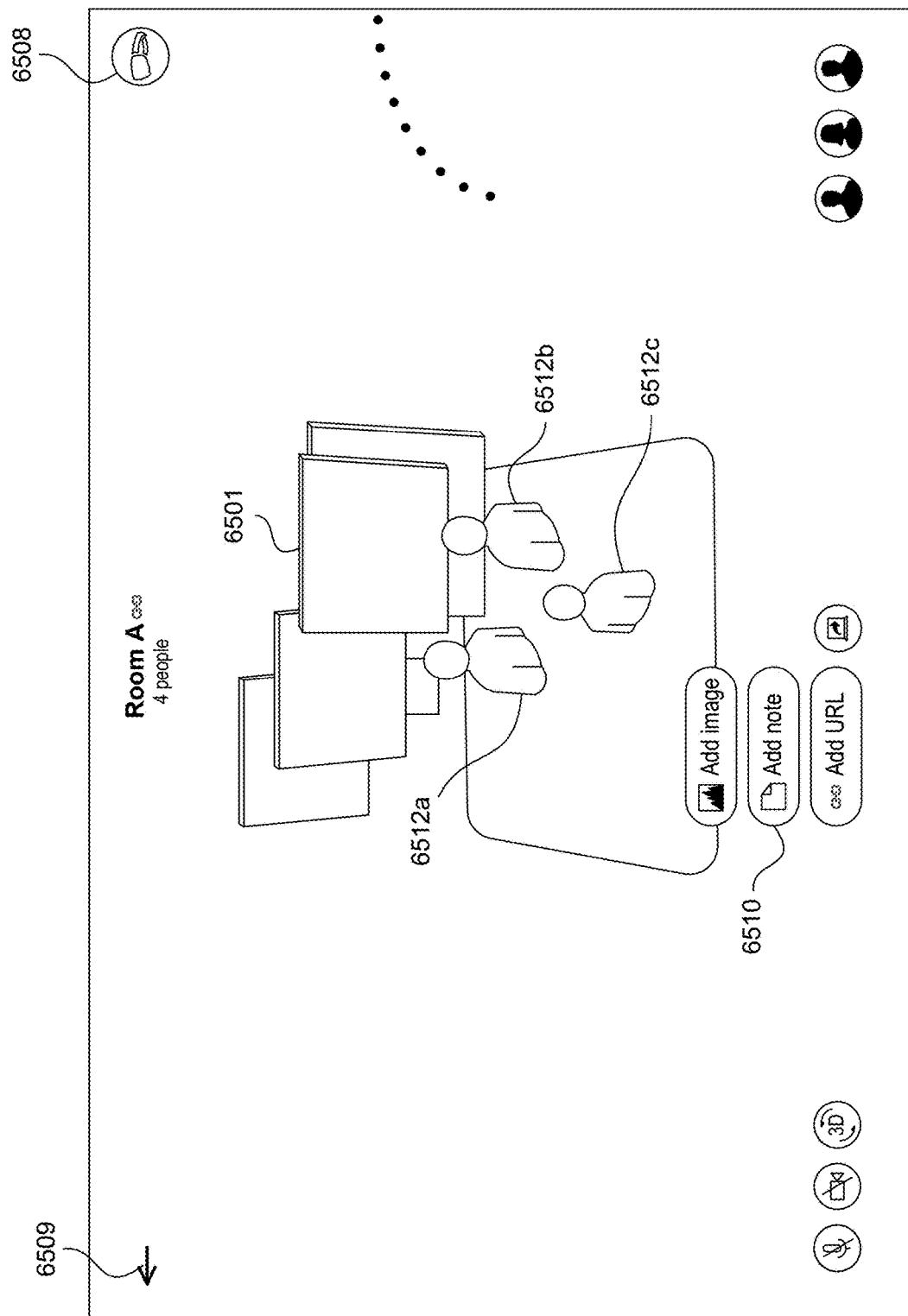

FIG. 65C is example screen display 6500C of a spectator view including a content-drop menu, according to some embodiments. The screen display provided in FIG. 65C is merely exemplary, and one skilled in the relevant art(s) will appreciate that many approaches may be taken to provide a suitable screen display 6500C in accordance with this disclosure.

Content menu 6510 may allow a user to upload content from their mobile device, laptop computer, or other computing device into the AR meeting space. Content menu 6510 may be accessed by a user engaging drop-content button 6505. For example, a user may add an image or photograph from their device, copy a link into the AR meeting space, or add a sticky note as a digital object into the AR meeting space.

Avatars 6512 may be representations of users active in an AR meeting space. Avatars 6512 may uniquely identify and distinguish a user in the system from other users, allowing the viewing user to easily determine the identity of the user in the AR meeting space, on the AR meeting space launcher, or elsewhere in the AR system. Numerous approaches may be taken to create an avatar in the AR meeting space. In one embodiment, a user may create an avatar manually that represents their digital selves. In another embodiment, a user may upload an image and the image may be displayed as the user in the AR meeting spaces. In another embodiment, a video feed may be captured, e.g., by a webcam or camera on a mobile device, and the video feed placed in the AR meeting space to represent the user. In another embodiment, a mobile device may use a real-time face capture, e.g., using infrared, and AR/VR cloud system 206 may assemble this into a digital representation in the AR meeting space that moves with the users facial expressions.

Figure 66:
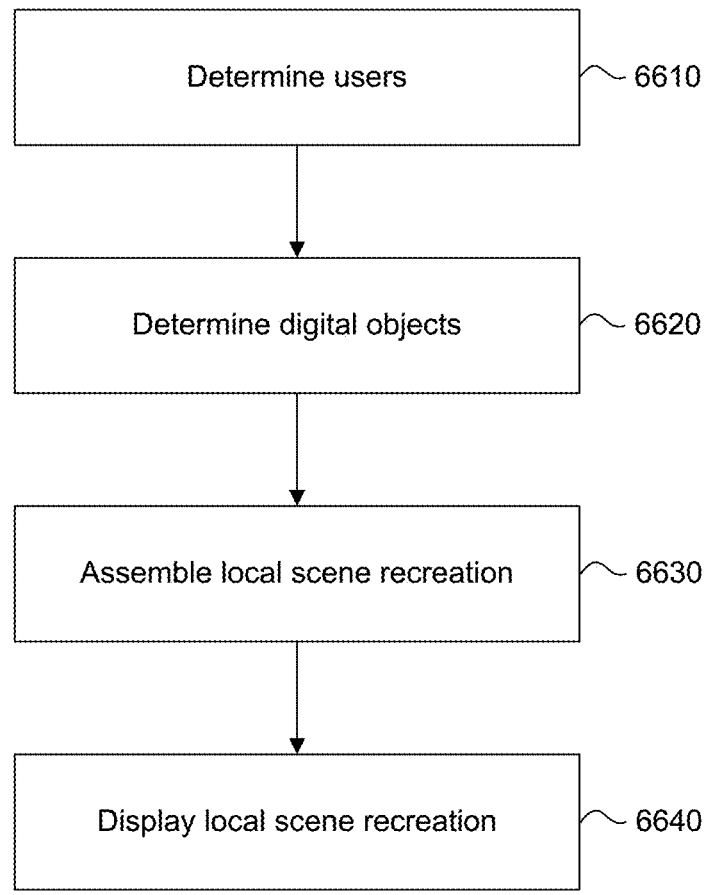

FIG. 66 is a flowchart illustrating method 6600 of providing a local scene recreation of an AR meeting space to a computing device. Method 6600 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 66, as will be understood by a person of ordinary skill in the art(s).

In 6610, a user, e.g., user 202, may choose to view a three-dimensional local scene recreation from a mobile device or laptop computer. For example, a user may select 3D button 6504 from within a spectator mode as described above with reference to FIG. 65. AR/VR cloud system 206 may determine other users currently participating in the AR meeting space. AR/VR cloud system 206 may retrieve three-dimensional position information about users to place the users in particular places in the room. AR/VR cloud system 206 may retrieve additional information about the users in the AR meeting space that is needed to create the local scene, e.g., information about what the users are doing, an avatar representing the user, an indication that the user is speaking, a length of time that the users have been in the room, etc.

In 6620, AR/VR cloud system 206 may determine digital objects that exist within the AR meeting space. AR/VR cloud system 206 may retrieve three-dimensional position information about the digital objects to locate the digital object in appropriate places within the three-dimensional meeting room. AR/VR cloud system 206 may gather further information about the digital objects needed to create the local scene recreation, e.g., text associated with the digital objects, modifications made to the digital object by users, etc.

In 6630, AR/VR cloud system 206 may assemble a local scene recreation. The local scene recreation may be a representation of the AR meeting space that is displayable on a mobile device, computing device, or other device. AR/VR cloud system 206 may assemble a local scene recreation with the users retrieved in 6610 and their associated three-dimensional position information, the digital objects retrieved in 6620 and their associated three-dimensional position information, and any other suitable information. AR/VR cloud system 206 may receive real-time or near real-time updates from the entities in the AR meeting space and update the local scene recreation in real-time or near-real-time based on the changing circumstances. To accomplish the continual provision of the local scene recreation to remote users, AR/VR cloud system 206 may adopt one of several approaches: (1) fixed perspective; (2) auto-switch mode; or (3) manual mode, or some suitable combination thereof.

For the first approach, a fixed-perspective local scene recreation, AR/VR cloud system 206 may select a particular position in the room and present a recreation of the AR meeting space from the perspective of that fixed position. For example, AR/VR cloud system 206 may affix the perspective of a viewing user to a wall in the AR meeting space. The viewing user can thus view the meeting space from that affixed point, as though the perspective was a camera mounted to the wall. Other users may move around the AR meeting space, but the viewing user may be constrained to that affixed location. The viewing user's avatar would be static within the room to any users viewing from an AR headset. This benefits of this approach are simplicity and minimal user-interaction being asked of a remote user. However, a remote user's level of engagement and ability to control a point of focus is limited in this approach.

In a second approach to assembling the local scene recreation, AR/VR cloud system 206 may harness an auto-switch methodology to build onto the fixed perspective approach. In this approach, the perspective of the viewing user may be fixed at any given time to a particular point, but this point changes over time. In the auto-switching methodology, AR/VR cloud system 206 may change perspectives for the remote user based on events occurring in the room. For example, the remote user may be auto-switched to view a user that is currently talking, to view a user that a majority of other users are viewing in the AR meeting space, to view an a digital object that is currently being manipulated, or to view a wide-angle shot if multiple users are speaking at once or multiple digital objects are being manipulated. In this fashion, a curated, streamlined view of the events occurring in an AR meeting space may be provided to a remote user without mandating interaction or navigation on the remote user's part.

In a third approach, AR/VR cloud system 206 may provide a manual mode to a remote user viewing an AR meeting space. In such an approach, suitable user inputs may be processed to allow the remote user to change their perspective in a variety of ways. In one example, a user may swipe right on the mobile device to turn to the right in the local scene recreation. Or a user may select a particular avatar in the room and view the AR space from the perspective of that user. Or appropriate controls for maneuvering through the three-dimensional space may be provided, as in a third-person video game (e.g., ability to strafe, turn, change camera angle, zoom-in, zoom-out, etc.).

In some embodiments, the manual mode may be further enhanced by deploying an AR kit on the mobile device and leveraging the AR kit to process AR-style inputs. Where such an AR kit is deployed, AR/VR cloud system 206 may receive AR-style inputs from the mobile device and display the AR meeting space in a similar fashion as would be displayed to an AR headset. For example, a user may tilt a mobile device upward to look upwards within the local scene recreation, turn the mobile device to the right to look to the right within the local scene recreation, etc.

In one embodiment, a video feed may be assembled in AR/VR cloud system 206 that represents the activities occurring within the room. In this embodiment, an actual video feed may be assembled in AR/VR cloud system 206 as opposed to the interactive local scene recreation. In this embodiment, the actual video feed may be embedded across platforms and applications.

In 6640, AR/VR cloud system 206 may display the local scene recreation for the viewing user. As described above, the local scene recreation may change in real-time or near-real-time according to changes in the AR meeting space, e.g., users changing positions, manipulating digital objects, etc. The viewing user may also interact with the local scene recreation in a variety of ways. For example, the viewing user may move about the AR meeting space when the local scene recreation displays in a manual mode, and the location of the user's avatar within the AR meeting space may update as the user moves. In another example, a user may select a particular avatar of another user and experience the AR meeting space from the perspective of that user. In another example, the viewing user may select a digital object within the AR meeting space and view an enhanced view of the digital object. For instance, if the digital object is a white board, the viewing user may receive a close up view of the white board. The viewing user may also upload content into the AR meeting space when viewing the local scene recreation, for example, by using content menu 6510 to upload a sticky note, photo, or link.

Thus, the local scene recreation allows users on mobile devices, laptop computers, or other computing devices to collaborate within the AR meeting spaces.

Immersive Media Browser

As discussed above, AR systems may incorporate a wide-array of media sources into AR meeting spaces. Such media sources may include social media, news feeds, web sites, email feeds, search results, and many other media types. By incorporating external media sources, an AR system may allow users to view and manipulate data using three-dimensional-interaction techniques while collaborating with other users in the shared spaces. Users interacting with the media in three dimensions have at their disposal techniques to sort, group, search, organize, view, etc. the data that exceed conventional 2D human-data interaction techniques.

Accordingly, a need exists to seamlessly integrate media sources into AR meeting spaces and to derive and display interactive three-dimensional representations of the media sources. By standardizing the integration of the media sources into the AR meeting spaces via an application adapter, the amount of data available to users in an AR meeting space expands dramatically. This gives users in the AR meeting spaces the ability to view, discuss, examine, manipulate, etc. data pulled from the media sources in three-dimensional representations.

The most effective three-dimensional representation to facilitate interaction and manipulation may vary according to the media type and/or the specific media source. Thus, an application adapter may be enhanced by including additional information about the structured data received from specific media sources (e.g., from a particular website, a particular social media feed, etc.). By creating a three-dimensional representation of data from a media source specific to the media source, an optimized three-dimensional-interaction technique may be provided to users for experiencing the data in the AR meeting space.

Figure 67:
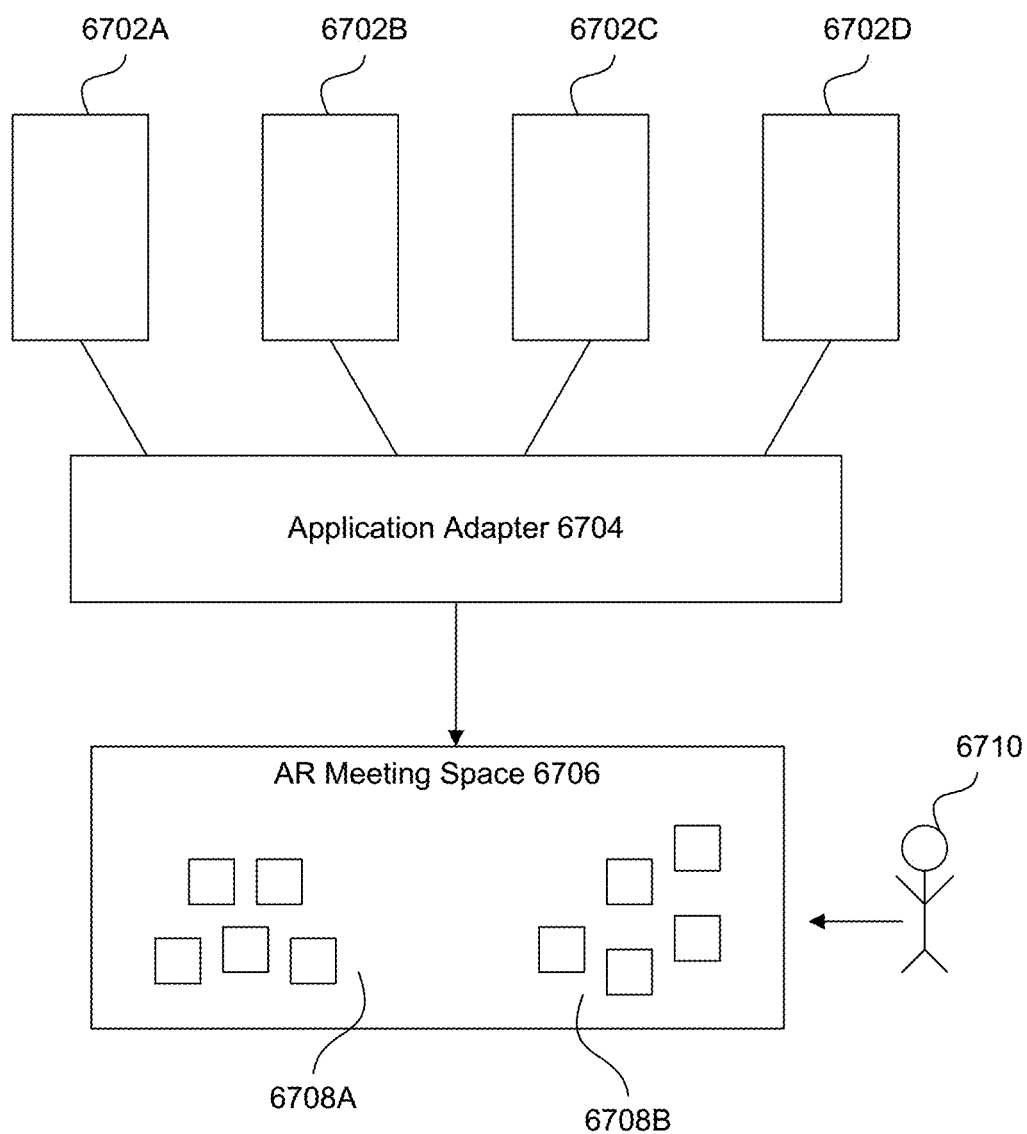

FIG. 67 is a block diagram of AR environment 6700, according to some embodiments. Any operation herein may be performed by any type of structure in the diagram, such as a module or dedicated device, in hardware, software, or any combination thereof. Any block in the block diagram of FIG. 67 may be regarded as a module, apparatus, dedicated device, general-purpose processor, engine, state machine, application, functional element, or related technology capable of and configured to perform its corresponding operation(s) described herein. AR environment 6700 may include media sources 6702, application adapter 6704, AR meeting space 6706, three-dimensional representation 6708, and user 6710.

Media sources 6702 may include social media, news feeds, web sites, email feeds, search results, and many other media types that are capable of providing structured data to AR/VR cloud system 206 for representation in an AR meeting space in three dimensions. Examples of social media may include feeds from FACEBOOK, INSTAGRAM, TWITTER, etc. Examples of web sites include news sites, such as THE WASHINGTON POST or THE NEW YORK TIMES, or any other web site available via the world wide web or other hypertext transfer protocol. Media sources 6072 may provide an RSS feed that may be accessed by AR/VR cloud system 206 to pull/retrieve information from the media source. Such an RSS feed may be filtered to include information relevant to a particular user or subset of users within the AR system. An email feed may be accessed through a suitable email protocol, e.g., SMTP, POP3, etc.

Application adapter 6704 may transform structured data received from the media source into a three-dimensional representation. Application adapter 6704 may identify a source of the media and deploy a customized, enhanced adapter if the source is known and such an enhanced adapter exists. Application adapter 6704 may employ a default adapter where the source and/or type is not known. A default adapter may provide baseline interaction techniques by representing the structured data in a simplistic fashion.

To transform the data, application adapter 6704 may identify content provided by the media source while dividing the content into appropriate sections or groups. For example, in an RSS feed, application adapter 6704 may divide information "<item>" tags into separate sections. For another example, for a web page, application adapter 6704 may break down a particular web page into sections based on <iframe> tags, <section> tags, etc. Application adapter 6704 may extract from the structured data images, videos, sound files, etc. to be associated/displayed with the determined content and/or sections.

By grouping the received data into manipulable sections, application adapter 6704 may select an appropriate three-dimensional interaction model to apply to the three-dimensional representation. For example, if the media source is a news feed, a three-dimensional representation may be displayed that is tailored to allow users to interact with news feed. In another example, if the media source is a WIKIPEDIA page, then an appropriate three-dimensional representation may be provided that is specific to WIKIPEDIA entries. Such an example is discussed above with referenced to FIG. 6A. The breadth and scope of functionality that is available to users when viewing the three-dimensional representation may vary according to the type of media source being viewed. Advanced techniques to sort, group, search, organize, view, etc. data may be available in three dimensions that are not available in two dimensions.

Application adapter 6704 may be further enhanced to apply particularized expectations about a specific media source to derive additional information to include in the three-dimensional representation. For example, a particularized adapter may be deployed to parse a NEW YORK TIMES news feed that differs from a particularized adapter deployed to a comparable WASHINGTON POST news feed. Such an enhanced application adapter may gather additional information from the structured data provided by the media source and render incorporate that information into the three-dimensional representation.

AR meeting space 6706 is an augmented reality meeting space, as described in detail above. Application adapter 6704 may provide a three-dimensional representation to AR/VR cloud system 206 to recreate in AR Meeting Space 6706.

3D representations 6708, such as 3D representation 6708A and 6708B may be displayed in AR meeting space 6706 to represent the structured data received from media sources 6702 and transformed by application adapter 6704. Various media sources are described throughout this disclosure specifically with respect to their representation in AR meeting spaces in three dimensions, e.g., as 3D representations 6708. For example, a three-dimensional representation of a social media feed is described with reference to FIG. 5 and with reference to FIGS. 50A, 50B, 50C, and 52. A three-dimensional representation of a web page is displayed in FIG. 6A and FIG. 31. A three-dimensional representation of search results is displayed in FIG. 36. These three-dimensional representations are merely exemplary, but provide suitable examples of three-dimensional representations of social media feeds, web pages, and search results. Additional three-dimensional representations may be developed to display other media sources, such as email feeds, tasklists, and any other suitable structured data that may be received from an external source and represented in three dimensions in an AR meeting space.

User 6710 may view three-dimensional representations 6708 in AR meeting space 6706 using an AR headset, or in other embodiments, a mobile device or laptop computer.

Figure 68:
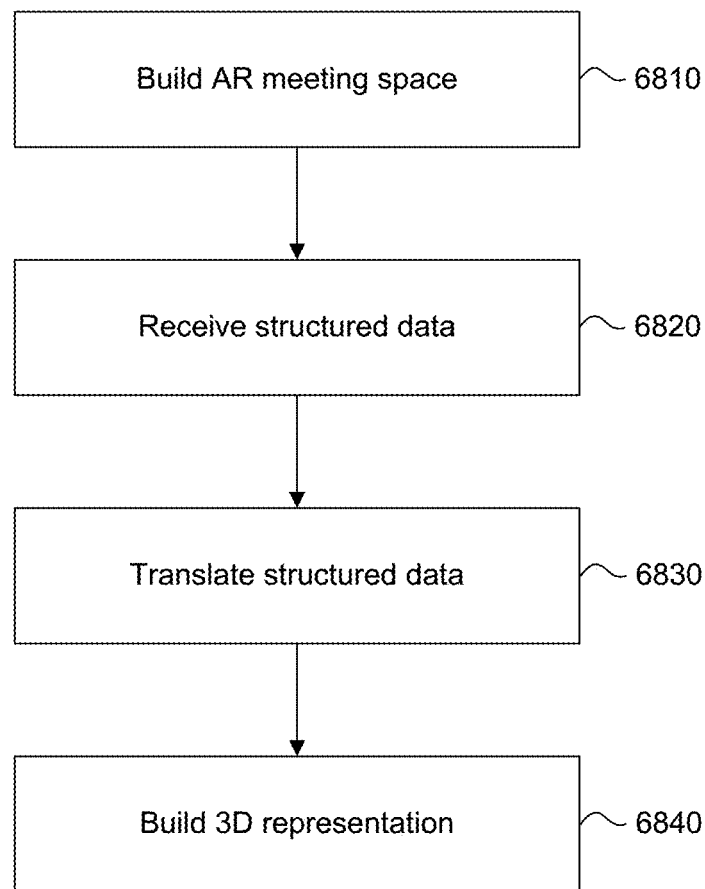

FIG. 68 is a flowchart illustrating method 6800 of displaying 3D representations of media sources in an AR meeting space. Method 6800 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 68, as will be understood by a person of ordinary skill in the art(s).

In 6810, AR/VR cloud system 206 may build an AR meeting space for a user joining on a AR headset. In other embodiments, the AR meeting space may be built for a user joining on a mobile device, laptop computer, or other suitable computing device. AR/VR cloud system 206 may determine users and digital content to display in the AR meeting space along with three-dimensional position information associated with the users and the digital content. This AR meeting space may update in real-time or near-real-time as changes to the AR meeting space occur. AR/VR cloud system 206 may determine that the AR meeting space includes data received from a media source.

In 6820, AR/VR cloud system 206 may receive structured data from a media source. The structured data may vary according to the type of media source from which the data is received and the specific media source sending data. For example, if the media source is a social media feed, AR/VR cloud system 206 may pull an appropriate batch of data using an RSS feed. If the media source is a web page, AR/VR cloud system 206 may access the HTML data comprising the web page via an appropriately formatted request, e.g., a GET request. Or if the media source is an email feed, AR/VR cloud system 206 may pull the data using an SMTP protocol. One skilled in the relevant arts will appreciate that the above list is merely exemplary and is not limiting. In some embodiments, because the AR meeting space updates in real-time or near-real-time, AR/VR cloud system 206 may periodically refresh the data, i.e., refresh/ receive the structured data from the media source(s) in the AR meeting space.

In 6830, AR/VR cloud system 206 may translate the structure data received in 6820 into content, sections, associated images, and additional information using application adapter 6704. For example, AR/VR cloud system 206 may identify items in an RSS feed and display all of items in an appropriately organized fashion or application adapter 6704 may break up a web page based on <iframe> tags, <section> tags, etc. An RSS feed may further contain an image which application adapter 6704 may pull and associate with the determined section for later display in the three-dimensional representation. AR/VR cloud system 206 may use enhanced information within application adapter 6704 to gather additional information that is specific to a particular media source. For example, an enhanced application adapter 6704 may be built for THE NEW YORK TIMES to further pull information about the topics provided on the page and organize received items in the feed by those topics (e.g., "Sports," "Weather," "World," etc.).

In 6840, AR/VR cloud system 206 may build a three-dimensional representation of the structured data and display the three-dimensional representation in the AR meeting space. AR/VR cloud system 206 may select an appropriate three-dimensional representation based on the type of media source being represented or the specific media source. For example, for a WIKIPEDIA page, AR/VR cloud system 206 may opt to display a three-dimensional representation resembling FIG. 6A, but for social media feed, AR/VR cloud system 206 may opt to display a three-dimensional representation resembling FIG. 50B. For some three-dimensional representations, AR/VR cloud system 206 may display the data as scrollable tiles, where a user may view one section as the main point of focus while switching to other tiles in an accordion reel, as displayed in the above FIG. 52. In other three-dimensional representations, different information may be displayed at different levels in the three-dimensional structure, as displayed above in FIG. 31.

One skilled in the arts will appreciate that there exist a myriad of three-dimensional design approaches that may be provided based on the nature of the provided structured data. By creating a three-dimensional representation of a media source specific to the media source, AR/VR cloud system 206 may select an optimized three-dimensional-interaction technique for users to experience the data.

Figure 69:
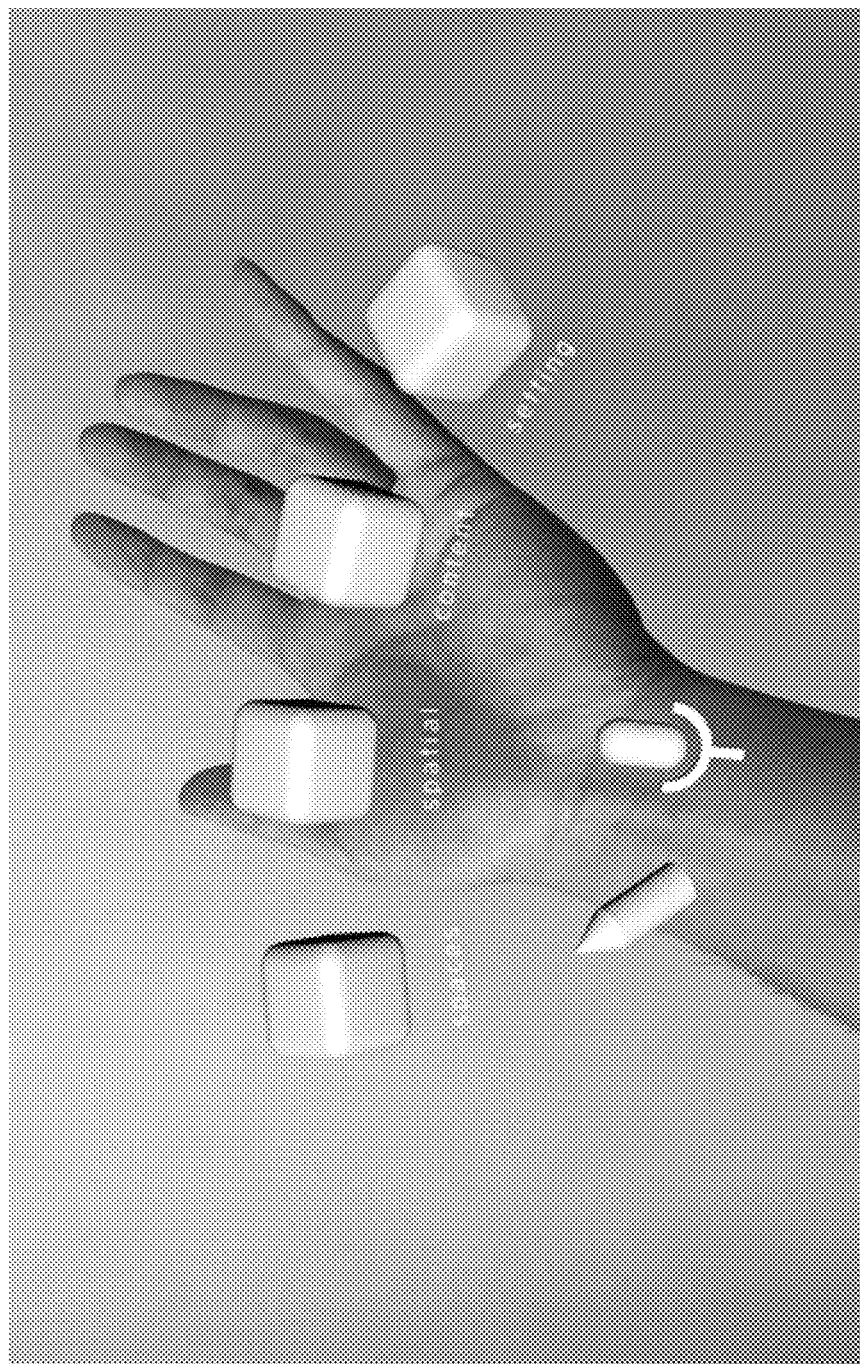

FIG. 69 illustrates an example of an operation that may be used in the example AR and/or VR meetings described herein, according to an embodiment. In an embodiment, an AR user may identify their hands as being dominant and non-dominant. For example, the default dominant hand may be the right hand, but may be flipped for different users at different times.

In an embodiment, when a user performs a hand gesture, such as flipping their identified non-dominant hand, this gesture may be captured by the AR device, and processed by an AR environment to invoke dock menus as well as other toggle options (e.g., such annotate or mute). These men options may include adjusting various settings, joining different meetings, activating modes (e.g., such as presenter or lightbox) and other options.

With the dock menu visible, the user may then use their dominant hand to scroll through the menus or toggle something on/off or select an option. In an embodiment, when something is toggled on they are displayed in the heads-up-display screen space with tag-along gestures. In an embodiment, a first menu selection may produce a second menu to appear. The user flipping their non-dominant hand back over may cause the dock menus to disappear.

What is claimed is:

1. A method comprising:
receiving a request to open an augmented reality (AR) meeting space in a current physical location, wherein the AR meeting space comprises a plurality of holographic representations each corresponding to a digital object arranged within a three-dimensional space on a plurality of surfaces configured based on a size of a remote physical location different from the current physical location;
determining an arrangement of the plurality of holographic representations of the one or more digital objects of the AR meeting space relative to a remote anchor area in the remote physical location;
identifying a current anchor area within the current physical location that corresponds to the remote anchor area;
determining that a variance between a size of the current physical location and the size of the remote physical location exceeds a threshold, wherein the threshold indicates whether the arrangement of the plurality of holographic representations is to be modified based on the variance;
modifying the arrangement of the plurality of holographic representations of the one or more digital objects of the AR meeting space in the current physical location on the plurality of surfaces in the current physical location based on an alignment of the current anchor area with the remote anchor area and the determination that the variance exceeds the threshold; and
displaying the modified arrangement of the AR meeting space, including the holographic representations of the one or more digital objects, in the current physical location.

2. The method of claim 1, wherein the modifying comprises:
determining that the current anchor area corresponds to a first wall of the current physical location that is smaller than a second wall corresponding to the remote anchor area of the remote physical location;
determining a digital canvas corresponding to a size of the second wall, wherein at least one or more of the plurality of digital objects were arranged on the digital canvas;
reducing a size of the digital canvas to fit on the first wall; and
changing at least one of a location or a size of one or more of the digital objects, that were arranged on the digital canvas corresponding to the second wall, on the reduced size digital canvas aligned with the first wall.

3. The method of claim 2, wherein the changing comprises:
reducing the size of one or more of the digital objects on the reduced size digital canvas based on a relative size of the first wall to the second wall.

4. The method of claim 3, further comprising:
determining that a subset of the one or more digital objects are not visible on the reduced size digital canvas aligned with the first wall; and
providing scrollability on the reduced size digital canvas via a scrollability icon, wherein the subset of the one or more digital objects that are not visible on the reduced size digital canvas are visually accessible via a selection of the scrollability icon on the reduced size digital canvas.

5. The method of claim 1, wherein the modifying comprises:
determining that the current anchor area corresponds to a first wall of the current physical location that is smaller than a second wall corresponding to the remote anchor area of the remote physical location;
determining a digital canvas corresponding to a size of the second wall, wherein at least one or more of the plurality of digital objects were arranged on the digital canvas; and
displaying the digital canvas in the AR meeting space, wherein at least a portion of the digital canvas including one or more of the plurality of digital objects are displayed as extending through the first wall.

6. The method of claim 5, further comprising:
receiving an AR command to access one of the digital objects on the portion of the digital canvas displayed as extending through the first wall, wherein the displayed digital objects on the digital canvas, including the one or more plurality of digital objects on the portion remains accessible to a user within the AR meeting space.

7. The method of claim 1, wherein one or more of the plurality of digital objects correspond to one or more shared files of an application, wherein content of a first one of the shared files is displayed on a digital canvas in the AR meeting space.

8. The method of claim 7, further comprising:
detecting a change to the content of the first one of the shared files, wherein the change is associated with functionality performed by a non-AR computing device; and
providing the change to content as it is displayed on the digital canvas.

9. The method of claim 1, wherein the modifying the arrangement comprises:
comparing a scan of the current physical location to the remote physical location; and
modifying the arrangement based on the comparison of the scans.

10. A system comprising:
a memory; and
at least one processor coupled to the memory and configured to:
receive a request to open an augmented reality (AR) meeting space in a current physical location, wherein the AR meeting space comprises a plurality of holographic representations each corresponding to a digital object arranged within a three-dimensional space on a plurality of surfaces configured based on a size of a remote physical location different from the current physical location;
determine an arrangement of the plurality of holographic representations of the one or more digital objects of the AR meeting space relative to a remote anchor area in the remote physical location;
identify a current anchor area within the current physical location that corresponds to the remote anchor area;
determine that a variance between a size of the current physical location and the size of the remote physical location exceeds a threshold, wherein the threshold indicates whether the arrangement of the plurality of holographic representations is to be modified based on the variance;
modify the arrangement of the plurality of holographic representations of the one or more digital objects of the AR meeting space in the current physical location on the plurality of surfaces in the current physical location based on an alignment of the current anchor area with the remote anchor area and the determination that the variance exceeds the threshold; and
display the modified arrangement of the AR meeting space, including the holographic representations of the one or more digital objects, in the current physical location.

11. The system of claim 10, wherein the at least one processor that modifies is configured to:
determine that the current anchor area corresponds to a first wall of the current physical location that is smaller than a second wall corresponding to the remote anchor area of the remote physical location;
determine a digital canvas corresponding to a size of the second wall, wherein at least one or more of the plurality of digital objects were arranged on the digital canvas;
reduce a size of the digital canvas to fit on the first wall; and
change at least one of a location or a size of one or more of the digital objects, that were arranged on the digital canvas corresponding to the second wall, on the reduced size digital canvas aligned with the first wall.

12. The system of claim 11, wherein the at least one processor that changes is configured to:
reduce the size of one or more of the digital objects on the reduced size digital canvas based on a relative size of the first wall to the second wall.

13. The system of claim 12, wherein the at least one processor is further configured to:
determine that a subset of the one or more digital objects are not visible on the reduced size digital canvas aligned with the first wall; and
provide scrollability on the reduced size digital canvas via a scrollability icon, wherein the subset of the one or more digital objects that are not visible on the reduced size digital canvas are visually accessible via a selection of the scrollability icon on the reduced size digital canvas.

14. The system of claim 10, wherein the at least one processor that modifies is configured to:
determine that the current anchor area corresponds to a first wall of the current physical location that is smaller than a second wall corresponding to the remote anchor area of the remote physical location;
determine a digital canvas corresponding to a size of the second wall, wherein at least one or more of the plurality of digital objects were arranged on the digital canvas; and
display the digital canvas in the AR meeting space, wherein at least a portion of the digital canvas including one or more of the plurality of digital objects are displayed as extending through the first wall.

15. The system of claim 14, wherein the at least one processor is further configured to:
receive an AR command to access one of the digital objects on the portion of the digital canvas displayed as extending through the first wall, wherein the displayed digital objects on the digital canvas, including the one or more plurality of digital objects on the portion of the digital canvas, remains accessible to a user within the AR meeting space.

16. The system of claim 10, wherein one or more of the plurality of digital objects correspond to one or more shared files of an application, wherein content of a first one of the shared files is displayed on a digital canvas in the AR meeting space.

17. The system of claim 16, wherein the at least one processor is further configured to:
   detect a change to the content of the first one of the shared files, wherein the change is associated with functionality performed by a non-AR computing device; and
   provide the change to content as it is displayed on the digital canvas.

18. A non-transitory computer-readable device having instructions stored thereon that, when executed by at least one computing device, cause the at least one computing device to perform operations comprising:
   receiving a request to open an augmented reality (AR) meeting space in a current physical location, wherein the AR meeting space comprises a plurality of holographic representations each corresponding to a digital object arranged within a three-dimensional space on a plurality of surfaces configured based on a size of a remote physical location different from the current physical location;
   determining an arrangement of the plurality of holographic representations of the one or more digital objects of the AR meeting space relative to a remote anchor area in the remote physical location;
   identifying a current anchor area within the current physical location that corresponds to the remote anchor area;
   determining that a variance between a size of the current physical location and the size of the remote physical location exceeds a threshold, wherein the threshold indicates whether the arrangement of the plurality of holographic representations is to be modified based on the variance;
   modifying the arrangement of the plurality of holographic representations of the one or more digital objects of the AR meeting space in the current physical location on the plurality of surfaces in the current physical location based on an alignment of the current anchor area with the remote anchor area and the determination that the variance exceeds the threshold; and
   displaying the modified arrangement of the AR meeting space, including the holographic representations of the one or more digital objects, in the current physical location.

19. The device of claim 18, wherein the modifying comprises:
   determining that the current anchor area corresponds to a first wall of the current physical location that is smaller than a second wall corresponding to the remote anchor area of the remote physical location;
   determining a digital canvas corresponding to a size of the second wall, wherein at least one or more of the plurality of digital objects were arranged on the digital canvas;
   reducing a size of the digital canvas to fit on the first wall; and
   changing at least one of a location or a size of one or more of the plurality of digital objects, that were arranged on the digital canvas corresponding to the second wall, on the reduced size digital canvas aligned with the first wall.

20. The device of claim 19, wherein the changing comprises:
   reducing the size of one or more of the plurality of digital objects on the reduced size digital canvas based on a relative size of the first wall to the second wall.

* * * * *